United States Patent
Demos

(10) Patent No.: US 9,773,471 B2
(45) Date of Patent: *Sep. 26, 2017

(54) SYSTEM FOR ACCURATELY AND PRECISELY REPRESENTING IMAGE COLOR INFORMATION

(71) Applicant: Gary Demos, Perris, CA (US)

(72) Inventor: Gary Demos, Perris, CA (US)

(*) Notice: Subject to any disclaimer, the term of this patent is extended or adjusted under 35 U.S.C. 154(b) by 186 days.

This patent is subject to a terminal disclaimer.

(21) Appl. No.: 14/754,107

(22) Filed: Jun. 29, 2015

(65) Prior Publication Data

US 2016/0189672 A1    Jun. 30, 2016

Related U.S. Application Data

(63) Continuation of application No. 14/072,722, filed on Nov. 5, 2013, now Pat. No. 9,105,217, which is a (Continued)

(51) Int. Cl.
*G09G 5/02*    (2006.01)
*G01J 3/02*    (2006.01)
(Continued)

(52) U.S. Cl.
CPC ............... *G09G 5/02* (2013.01); *G01J 3/02* (2013.01); *G01J 3/0205* (2013.01); (Continued)

(58) Field of Classification Search
CPC ........... H05K 13/0069; H05K 13/0076; H05K 13/08; H05K 13/0061; G06T 5/007; (Continued)

(56) References Cited

U.S. PATENT DOCUMENTS 6,137,494 A   10/2000  Nin
6,160,576 A * 12/2000  Higuchi ................ G06T 5/001
                                                                348/62

(Continued)

OTHER PUBLICATIONS

Demos, Gary, U.S. Appl. No. 60/921,644, filed Apr. 3, 2007 entitled "Flowfield Motion Compensation for Video Compression", 141 pgs.

(Continued)

*Primary Examiner* — Ke Xiao
*Assistant Examiner* — Kim-Thanh T Tran
(74) *Attorney, Agent, or Firm* — Jaquez Land Greenhaus LLP; John Land, Esq.

(57) ABSTRACT

A method and system for accurate and precise representation of color for still and moving images, particularly sequences of digitized color images. Spectral and/or extended dynamic range information is retained as images are captured, processed, and presented during color adjustment. Using this extra spectral information, various methodologies for further presenting or processing the color within these images can be optimized. Presentation-device independence is achieved not by attempting to discover a device-independent intermediate representation, but rather by deferring the binding and mapping of color representation onto a presentation device until its actual use.

45 Claims, 27 Drawing Sheets

Accurate and Precise Color Reproduction System for Displays and Projectors

Related U.S. Application Data continuation of application No. 12/319,932, filed on Jan. 14, 2009, now Pat. No. 8,593,476.

(60) Provisional application No. 61/065,615, filed on Feb. 13, 2008.

(51) Int. Cl.
| | | |
|---|---|---|
| *G01J 3/28* | (2006.01) | |
| *G01J 3/46* | (2006.01) | |
| *G01J 3/50* | (2006.01) | |
| *H04N 9/67* | (2006.01) | |
| *G06F 3/01* | (2006.01) | |
| *G06T 5/00* | (2006.01) | |
| *G06T 7/90* | (2017.01) | |

(52) U.S. Cl.
CPC ........... *G01J 3/0218* (2013.01); *G01J 3/0229* (2013.01); *G01J 3/2823* (2013.01); *G01J 3/46* (2013.01); *G01J 3/462* (2013.01); *G01J 3/465* (2013.01); *G01J 3/50* (2013.01); *G06F 3/013* (2013.01); *G06T 5/007* (2013.01); *G06T 7/90* (2017.01); *H04N 9/67* (2013.01); *G09G 2340/0407* (2013.01); *G09G 2340/06* (2013.01)

(58) Field of Classification Search
CPC ................. G06T 7/90; Y10T 29/53191; Y10T 29/53174; Y10T 29/49119; G01J 3/46; G01J 3/462; G01J 3/465; G01J 3/50; G06F 3/013
USPC .......... 345/629, 589, 597, 600, 604
See application file for complete search history.

(56) References Cited

U.S. PATENT DOCUMENTS

| | | |
|---|---|---|
| 6,956,702 B2 | 10/2005 | Pate |
| 7,536,514 B2 | 5/2009 | Barrett et al. |
| 9,105,217 B2 | 8/2015 | Demos |
| 2002/0044279 A1* | 4/2002 | Khoury ..................... G01J 3/28 356/300 |
| 2002/0130975 A1* | 9/2002 | Yang ....................... G09G 5/003 348/674 |
| 2003/0011563 A1* | 1/2003 | Wada ....................... H04N 9/73 345/156 |
| 2003/0103677 A1* | 6/2003 | Tastl ....................... G06T 15/00 382/240 |
| 2003/0164927 A1* | 9/2003 | Tsukada ............. H04N 5/44513 353/31 |
| 2005/0219472 A1* | 10/2005 | Matsumoto .............. H04N 5/74 353/69 |
| 2006/0087517 A1 | 4/2006 | Mojsilovic |
| 2006/0227346 A1 | 10/2006 | Starkweather |
| 2007/0013871 A1 | 1/2007 | Marshall et al. |
| 2007/0103491 A1 | 5/2007 | Moriya et al. |
| 2007/0139644 A1 | 6/2007 | Lekson et al. |
| 2007/0146502 A1 | 6/2007 | Ahn |
| 2007/0229923 A1 | 10/2007 | Itagaki et al. |
| 2008/0123944 A1* | 5/2008 | Xiao ............... H04N 21/440263 382/162 |
| 2008/0123956 A1* | 5/2008 | Cernasov ........... G06K 9/00597 382/173 |
| 2008/0132420 A1* | 6/2008 | Lubomirski ............ G06F 19/20 506/8 |
| 2009/0086324 A1 | 4/2009 | Saita et al. |
| 2009/0174638 A1 | 7/2009 | Brown Elliott et al. |

OTHER PUBLICATIONS

Demos, Gary, U.S. Appl. No. 60/758,490, filed Jan. 12, 2006 entitled "Efficient Bit-Exact Lossless Image Coding Residual System", 37 pgs.

Tran, Kim Thanh Thi, Office Action received from the USPTO dated Sep. 26, 2014 for U.S. Appl. No. 14/072,722, 29 pgs.

Demos, Gary, Amendment filed in the USPTO dated Jan. 22, 2015 for U.S. Appl. No. 14/072,722, 11 pgs.

Tran, Kim Thanh Thi, Notice of Allowance received from the USPTO dated Apr. 3, 2015 for U.S. Appl. No. 14/072,722, 29 pgs.

* cited by examiner

*Accurate and Precise Color Reproduction System for Displays and Projectors*

Common Broad Spectrum (White) Radiators, Showing Tungsten, Daylight D55, White Carbon Arc, High Pressure (2kW) Xenon Arc Lamp, and Theoretical Equal Energy White (E) (Note: A Light Source's Spectrum Typically Varies With Time, e.g. as the lamp ages)

SYSTEM FOR ACCURATELY AND PRECISELY REPRESENTING IMAGE COLOR INFORMATION

RELATED APPLICATIONS

This application is a non-provisional application which claims priority of provisional application Ser. No. 61/065,615, filed on Feb. 13, 2008.

This application is a continuation of application Ser. No. 14/072,722, filed Nov. 5, 2013, entitled "System For Accurately and Precisely Representing Image Color Information", which is a continuation of application Ser. No. 12/319,932, filed Jan. 14, 2009, now U.S. Pat. No. 8,593,476, issued on Nov. 26, 2013, entitled "System For Accurately and Precisely Representing Image Color Information".

OTHER RELATED APPLICATIONS

"High Quality Wide Range Multi-Layer Image Compression Coding System", U.S. patent application Ser. No. 11/225,655.

"Film and Video Bi-Directional Color Matching System and Method", U.S. Patent Application Ser. No. 60/198,890 and Ser. No. 09/648,414.

BACKGROUND

This invention relates to accurate and precise representation of color for still and moving images, particularly sequences of digitized color images, including digital motion pictures and digital video.

CIE 1931 Standard Colorimetric Observer

During the period 1928 through 1931, J. Guild and W. D. Wright in England developed the CIE 1931 XYZ and xyz colorimetric system. The fundamental elements of this color representation are spectral mapping curves called x_bar, y_bar, and z_bar. These functions are based upon a transformation from human vision color matching measurements using amounts of relatively pure red, green, and blue. The red, green, and blue amounts were determined in 2-degree color patch matching experiments using a mixture of amounts of these red, green, and blue primaries to match arbitrary colors (other than red, green, or blue). The functions of the amounts to match arbitrary colors are embodied in spectral functions r_bar, g_bar, and b_bar. These functions have negative amounts in certain wavelength regions. The x_bar, y_bar, and z_bar spectral color matching functions are a linear transformation of Guild's and Wrights independent r_bar, g_bar, and b_bar measurements, taking into account the fact that the wavelengths of the red, green, and blue primaries were different between Guild and Wright. The x_bar, y_bar, and z_bar functions have all positive spectral amounts, unlike r_bar, g_bar, and b_bar. For general reference, see *Color Science, Concepts and Methods, Quantitative Data and Formulae*, $2^{nd}$ Edition 1982, by Gunter Wyszecki and Walter Stanley Stiles, John Wiley and Sons; *Color Appearance Models*, $2^{nd}$ Edition 2005, by Mark Fairchild, John Wiley and Sons; and *Fundamental Chromaticity Diagram with Psychological Axes—Part* 1, CIE 170-1:2006 (International Commission on Illumination, Commission Internationale De L'Eclairage, CIE) ISBN 3 901 906 46 0.

A discussion of this original color model work can be found in Wszecki and Stiles (W&S) in section 3.3 and section 5.5.6. It is significant to note that this work pre-dated computers and spectral-radiometers (which directly measure spectra digitally). The data for x_bar, y_bar, and z_bar are specified with four decimal digits, and at 5 nm intervals between 380 nm and 780 nm (see W&S Table II (3.3.1), page 736). This precision and accuracy is actually much higher than was implied by the original color examinations performed by Guild and Wright. Although the x_bar, y_bar, and z_bar spectral matching function data can accurately represent a theoretical color observer, these data do not represent actual people, but rather an average over a group of people (7 people tested by Guild, and 10 people tested by Wright). A problem with this testing approach is that there are substantial variations between individuals, and even variations for a single individual over time. There is theoretically an infinite number of different visible spectra which can integrate with x_bar, y_bar, and z_bar to yield the same value of CIE 1931 X, Y, and Z. This transformation of different spectra to the same CIE XYZ color, and the degree to which a different perceived color also sometimes results, is known as "metamerism". Colors with identical spectra are called "isomers", and such colors will always be perceived by each viewer as identical. However, even though two spectrally-identical colors are perceived as identical to each other, it is not possible to know how the color will appear in the mind's visual field of various individuals. There is variation from one individual to another, since each person essentially has his or her own individual spectral sensing functions at any given time. There may also be differences between individuals in the neural processing in the path between the retina and the visual cortex, and the resulting perceived color image. Further, there is evidence that people who need to carefully specify and distinguish colors, such as painters, cinematographers, and interior designers, may learn to improve their ability to distinguish and interpret colors compared to people who have not been trained in careful color distinction. Moreover, it is not known the degree to which color vision is hereditary due to human DNA codes, the degree to which it is neurologically developmental during early childhood, and the degree to which it can be further developed subsequently.

The CIE 1931 y_bar curve, which is based upon photopic luminance, is known to be incorrect based upon more accurate measurements done subsequent to 1931. This is significant in the CIE 1931 XYZ color model, since it affects color accuracy and not just luminance perception. The original photopic luminance work was performed by Judd in the early 1920's, and Judd later made a substantial correction in 1950 (see W&S Section 5.7.2), which became the basis of the 1970 Vos version of the XYZ color model (W&S section 5.5.2).

CIE 1964 Supplementary Standard Colorimetric Observer

In 1964, partly due to Judd's correction of y_bar, and also due to the discovery that a 10-degree color patch matched differently from a 2-degree color patch, the CIE added the CIE 1964 10-degree Supplementary Standard Colorimetric Observer (W&S section 3.3.2). The difference in average spectral functions between 2-degrees and 10-degrees is primarily caused by the yellow tint over the "macula latea" portion of the fovea of the human eye (the macular yellow pigment). This structural difference in the eye means that smaller patches of color are more yellow-filtered than larger patches.

There are thus a number of x_bar, y_bar, z_bar spectral color matching functions representing human color vision, with significant differences between them. FIG. 1 is a graph showing several existing x_bar, y_bar, z_bar color matching functions: the CIE 1931 (2-degree) version, the Vos 1970 version, and the CIE 1964 10-degree version.

Currently, CIE 1931 XYZ (and associated x_bar, y_bar, z_bar) is prominent (e.g., in the ICC color standard) as an engine for device-independent colorimetry. RGB representations are also the norm in color work, along with other three-primary (also called "tri-chromatic") color representations, such as YUV, YPrPb, YCrCb, YIQ, LAB, and LUV. All of these tri-chromatic representations are fundamentally specified using CIE 1931 xy chromaticity coordinates for the color primaries, and associated matrix and gamma transforms, or are specified directly in terms of a transformation from CIE 1931 XYZ. Thus, at the present time, every common color system is specified in terms of the CIE 1931 x_bar, y_bar, z_bar spectral mapping.

Human Vision

In addition to color differences between various photopic x_bar, y_bar, z_bar trichromatic color matching functions (shown in FIG. 1), other factors affect color sensing, such as low light levels in common color viewing environments (e.g., motion picture cinema theaters).

The human eye is composed of "rods" and "cones". Cones operate in high light levels, and see in color. This is known as "photopic". Rods operate in low light, and see without color. This is known as "scotopic". Movie projection operates in "mesopic" vision, such that the lower brightnesses are scotopic and higher brightnesses are photopic. The scotopic-luminance center wavelength is broadband centering in cyan, and is thus substantially bluer than photopic luminance which centers in yellow-green. Wyszecki and Stiles discuss "Tetrachromatic" color matching functions in section 5.6.2 as a means of dealing with mesopic vision. There is also some evidence that a small percentage of women have two slightly different wavelengths of red cones (in addition to green and blue), and can therefore potentially distinguish colors more finely than people with a single type of red cones. These women are thus somewhat "tetrachromatic" at high brightness, and thus potentially have five spectral wavelengths active in mesopic vision. It is further common for several percent of the male population to be somewhat color deficient (degrees of color blindness). This usually takes the form of two high-brightness cone colors instead of three, but there are other forms of color deficiency as well. All of these inter-personal variations make the goal of person-independent color difficult (or perhaps impossible).

It is also worth noting that tiny pigment wafers exist within cones which are gradually bleached by light during each day. These pigment wafers are gradually absorbed at the base of each cone during sleep each night, while new pigmented wafers are created at the top of each cone on the retina. A lack of sleep, especially when combined with the pigment-bleaching effects of high light levels (such as being outdoors), can therefore directly affect color perception. It is also likely that a better understanding will also develop over time with respect to these effects, particularly the affect of sleep and lack of sleep on color perception. Also, given the nature of this pigment-wafer cycle, it is likely that there may be a difference in color perception in the morning versus the middle of the day versus the evening. This is particularly interesting in light of the common practice of seeing movies and television in the evening, sometimes watching until late, just prior to sleep.

CIE170-1:2006 Modified CIE Colorimetric Observer

The CIE 170-1:2006 document, published by the CIE in January of 2006, allows "cone fundamentals" to define color mapping functions as a function of both age and angle of view to yield a "Modified CIE Colorimetric Observer". For example, FIG. 2 is a graph of variation of cone fundamentals in CIE 170-1:2006 as a function of viewing angle (1 deg, 2 deg, 4 deg, and 10 deg) for age 35 years, and FIG. 3 is a graph of variation of cone fundamentals in CIE 170-1:2006 as a function of age (20 yrs, 40 yrs, 60 yrs, and 80 yrs) for a 2 degree viewing angle. As shown in FIG. 2 and FIG. 3, the average cone fundamentals (called l for long, m for medium, and s for short) vary significantly with viewing angle and with age. Further, sensitivity in certain wavelengths changes much more than at other wavelengths. Note for example the substantial variations near 500 nm and near 600 nm. The relative proportions of l, m, and s fundamentals can be seen to show large variations at these and at other sensitive wavelengths.

To quote Section 1.2 of CIE 170-1:2006: "Since observers, even within the same age bracket, may differ, a fundamental observer must be a theoretical construct based on averages. Any "real observer" will be different from the "Modified CIE Colorimetric Observer". The starting functions are average colour-matching functions from a large sample (about 50 observers). An important inter-observer source of variability is the polymorphism of the photopigments, showing up as small, probably hereditary, variations of a few nanometers in peak wavelength of the cone fundamentals. Additional parameters such as the lens optical density, or macular pigment optical density, are given as average figures."

The variations become particularly significant in light of the human visual ability to perform color matches at substantially less than 1%. It can be seen that the affects of age and viewing angle result in color determination variations which are more than an order of magnitude larger than 1% at sensitive wavelengths. Thus, any system for presenting precise and accurate color must take into account age and viewing angle, as well as inter-observer variations.

Note also that the CIE 170-1:2006 Modified CIE Color Matching Functions are based upon the 1959 Stiles and Burch data, as shown in FIG. 3 (5.5.6), FIG. 4 (5.5.6), and FIG. 5 (5.5.6) of Wyszecki and Stiles. This data shows variations on the order of several percent (and sometimes significantly more) between the 49 observers. Similar variation plots (which are clearly approximate) are shown in FIG. 1 (5.5.6) for the CIE 1931 observers used by Guild and Wright (7 and 10 observers, respectively) used in 1928-1929.

It should further be recognized that visual science is still actively investigating many relevant issues, and that there will likely be significant further refinements and improvements in visual spectral sensing models in the future. Further, there is likely to be a gradual improvement in understanding with respect to inter-personal variations in color matching functions, as well as factors related to heredity, ethnicity, age, gender, and viewing conditions. There may perhaps even evolve a better understanding of cultural preferences and biases in color appearance, as well as factors affecting color distinction including whether accurate color perception is used in one's employment (such as the work of a cinematographer, who is highly trained in the creation, management, and distinction of color).

The Use of Logarithmic Printing Density from Film Negative

Heretofore, movie masters have been film negative (or film duplicates thereof), a digital representation of film negative (using printing density units), or a reduced-range digital representation such as a digital television distribution master. For digital representations, there may also be many intermediate versions, but none of these is considered a master. Usually, only the reduced-range digital version embodies the final intended appearance, but it does so at the sacrifice of colors and brightnesses which are out of range for the digital television or digital cinema representation (as determined during mastering).

In 1990, the present inventor presented a paper at the Society of Motion Picture and Television Engineers (SMPTE) conference (see "The Use of Logarithmic and Density Units for Pixels" by Gary Demos, SMPTE Journal, October 1991, pp 805-816), proposing the use of logarithmic and density units for pixels. Based upon this paper, and the present inventor's request to SMPTE for a standardization effort, the SMPTE DPX (Digital Picture Exchange) file format was created to represent film negative density for motion pictures. As part of the SMPTE specification, a density representation known as "Printing Density" is used, which is the density of the film negative as seen by printing film (positive film for projection). However, printing density is not defined according to any industry-wide standard, and is thus difficult to use accurately or precisely. The more common standardized densities, known as "Status M" for film negatives, and "Status A" for print film, provide moderate accuracy for use in film developing consistency, but are insufficient for full spectral characterization.

In addition, negative films vary in their spectral sensitivity functions with exposure and color. Cross-color terms, such as variations in the amount of red in red, versus the amount of red in white or yellow, are also significant in negative film. Some of these effects occur due to inherent film light sensitivity spectral functions, and some occur due to chemical processes and dye-layer interaction during developing, and some occur due to dyes interacting with light spectra during the making of print film or scanning in a digital scanner. A further set of issues arise with the exposure, developing, and projection of motion picture print film, which is exposed from film negative. This process becomes more complex when camera photography uses one film negative, which is developed and scanned by a digital printer, and then manipulated digitally and recorded to another film negative in a digital film recorder (which is then printed to print film for projection). Copy film negatives and positives, known as film intermediate elements (internegative and interpositive) are also needed to provide thousands of film print copies for movie theater distribution.

When projected, a film print's dye spectral density is concatenated with the spectrum of the light source (usually xenon) and the spectral reflectance of the screen, to produce the spectrum which reaches the eye of the movie viewers. See FIG. 4, which is a graph of projected film spectra for red, green, blue, yellow, cyan, magenta, and white. Print film uses cyan, magenta, and yellow film dye layers to modulate red, green, and blue, respectively. The spectral transmittance of the various densities of dyes do not vary linearly, but rather alter their spectra shapes as a function of amount of density in that and other dye layers.

In addition to all of these film-based issues, the digital information from scanned and processed film and digital camera input may also be directly digitally output to a digital projection release master (which usually also involves compression). Often this master contains a simulation of the film printing process, and its color peculiarities. See, for example, FIG. 5, which is a graph of typical red, green, and blue primaries for digital cinema projectors.

It should be noted that the greatest success in precise color matching has come from side-by-side projected or displayed color images, with human-controlled adjustment of color to create a match. One such approach to the color matching task system is described in the U.S. Patent Application No. 60/198,890 and Ser. No. 09/648,414, "Film and Video Bi-Directional Color Matching System and Method" in the name of David Ruhoff and the present inventor. In that application, two images were placed side by side (or one above the other) on the same Cathode Ray Tube (CRT) screen. One image came from a digital film scan (such as using "printing density" units), the other image came from an electronic or digital camera. Both images were taken of the same scene, and were presented on the same screen. The colors of the side from the film scan were given a print simulation, and were adjusted to achieve a match. Therefore, subject to screen uniformity, both images utilized identical spectra during the matching process. An inverse was created from the film image's adjustment and print simulation process, which was then applied to the electronic/digital image. The data from the inverse process, applied to the electronic/digital image, then matched the digital film scan. The digital film scan and the inverse processed data were both output to a digital film recorder, which then received identical RGB input values (in "printing density" units in this example). The recorded negative film could then be optically printed and projected. Since the RGB values from the electronic/digital camera inverse process were very near the RGB values of the original digital film scan as a result of the matching process, the electronic/digital camera image would match the film-scanned image of the same scene. The film recorder RGB values were output to a laser film recorder, which used identical wavelengths of laser red, green, and blue primaries to record the intermediate film negative. Accordingly, the printing color process which followed was the same whether the original was from digitally scanned film or from the inverted electronic/digital camera. Since the spectra of the film recorder was the same in both cases, and the spectra of film developing and printing were the same (if done at the same time on the same roll of film), the projected film print results were identical. Again, the spectra of the digital film scan, when recorded on the film recorder, and the inverted electronic/digital camera image, were identical. Thus, nowhere in this color matching process was a color matching function used, nor was it needed. Further, there was no attempt made to match the projected film with its color gamut, white point, gamma function, and spectrum, to the video image on the Cathode Ray Tube (CRT), with its color gamut, white point, gamma function, and spectrum. However, color matching functions, based upon a standardized colorimetric observer, are needed when identical colors are desired from differing spectra.

In U.S. patent application Ser. No. 11/225,665, "High Quality Wide-Range Multi-Layer Compression Coding System" by the present inventor, efficient compression coding technology is described which maintains a wide dynamic range, and which can preserve the original image information by ensuring that coding error is less than the noise floor of the image itself. The system and method of U.S. patent application Ser. No. 11/225,665 can efficiently (via compression) preserve an extended color gamut range using negative numbers (for example, in red, green, and blue channels), and numbers above 1.0 (the most common logical presentation maximum in a mastering room context) using internal floating point processing. Additional channels (more than three) can also be coded. Further, a small amount of bit-exact (lossless) compression is available in the OpenExr 16-bit floating point representation, although the TIFF-32 standard does not currently offer useful compression. Without compression, a high resolution movie master is usually impractically large (many terabytes), even using today's large digital storage capacities. U.S. Patent Application No.

60/758,490, "Efficient Bit-Exact Lossless Image Coding Residual System" by the present inventor describes how to modestly compress moving images while retaining bit-exact original pixel values.

Color Printing on Paper

Another application where there is a need for accurate and precise control of color is color printing on paper. Color printers for home computers are becoming ubiquitous. There is a wide variation in the colors being produced by various color printers, however. One interesting example concerns some models of color printers which use additional color primaries (via additional colors of inks). Normal color printing modulates red, green, and blue light by using cyan, magenta, and yellow inks (or dyes), respectively. Sometimes black ink is also used for efficiency and black quality, although black typically does not carry any color information. In addition, some printers also use red and green as well as low-saturation photo-magenta and photo-cyan inks (or dyes). Some printers also utilize deep blue or violet, as well as orange, deep red, and other colors. In a typical image with red, green, and blue color channels (in addition to yellow, cyan, and magenta), there is little or no information on how to manage amounts of these additional colors. Other specialty inks (or dyes) are also sometimes used including "day-glow" fluorescent colors, which often convert invisible ultra-violet light into visible hot-pink, hot-green, and hot-blue, often with spikes in the resulting spectra. Some printers have other specialty inks having silver or gold metallic appearance. Some papers utilize "optical brighteners", which convert invisible ultra-violet light into increased whiteness, sometimes also with spectral spikes (like day-glow inks and dyes).

The current practice for device-independent color representations for digital cameras and color computer printers is to use the ICC color standard, which is based upon CIE 1931 x_bar, y_bar, z_bar spectral mapping (via CIE XYZ or CIE LAB). This provides only approximate device-independence, and provides no information about how to use additional ink colors (beyond cyan, magenta, and yellow). It should be noted that the mapping between trichromatic images and display or printing devices with more than three color primaries is non-unique. There are thus numerous possible mappings from three primaries to more than three. Further, no such predetermined mapping is likely to accurately and precisely recreate all of the intended colors.

Color printing on film requires the use of a light source for presentation, with the light source having its own spectral characteristics. Color printing on paper requires the paper to be illuminated by light, which light will have its own spectral properties. While the film or color paper print can attempt to reproduce color with a specific spectrum of light, it cannot adapt to other light spectra.

Another significant issue is that the perception of color, brightness, and contrast is greatly affected by the color and brightness of the surrounding environment when viewing a color print or a displayed or projected image. The film or color paper print can attempt to correctly reproduce perceived colors in a single anticipated viewing surround, but cannot be made surround-independent. Further, there is no mechanism which could provide for variations between viewers, or within a single viewer (such as one's gradual adaptation to changing color and brightness perception when going from bright daylight to a darker indoor room).

The goal of precise and accurate device-independent color will remain illusive as long as such systems (such as the ICC color standard) are primarily based upon CIE 1931 x_bar, y_bar, and z_bar. Further, observer variations, and variations in image brightness and in surround color and brightness conspire to further complicate the task of accurate and precise reproduction of all of the colors in an image.

Use of CIE 1931 Chromaticity in Specifying File RGB Primaries

In the "High Quality Wide Range Multi-Layer Image Compression Coding System" patent application by the present inventor, a compression system is described which can retain extended range image representations using a floating point numerical representation. Publicly-available floating point image formats such as TIFF-32 and OpenExr can be directly supported as inputs and/or outputs for compression or other processing. However, these systems either do not define the spectral mapping of primary colors, or else specify color primaries using CIE xy chromaticity coordinates (which spectrally map using CIE 1931 x_bar, y_bar, and z_bar). The color precision and accuracy of these formats is therefore limited by the inherent limits of CIE 1931 x_bar, y_bar, and z_bar spectral mappings.

Differences in Spectral Sensing Functions of Cameras with Respect to Color Matching Functions Another significant aspect of common color imaging systems is the spectral sensitivity function of color electronic cameras (usually these are digital cameras). Most color cameras use red, green, and blue spectral sensitivities which differ significantly from human color vision. The red spectral sensitivity of cameras, in particular, usually peaks at a much longer wavelength (deeper color of red) than does human vision. This has the affect of increasing color saturation for some colors. However, it also has the affect that some of the colors seen by a digital camera will not correspond to colors seen by the human eye (and cannot be unambiguously transformed into colors as seen by the human eye).

Camera films (usually negative films in motion picture use) similarly have spectral sensing functions which cannot be mapped into human vision. Camera film spectral sensing functions for the color primary channels (usually RGB) further vary with film exposure level, with amounts of the other color primary channels, and with other photo-chemical factors.

It is currently common practice to alter the original scene colors using a reference digital display or projector. This process has long been called "color timing" for the process of balancing and adjusting colors within film prints made from film negatives for stills and movies.

Such alteration can also be regional (such as in photo-retouch programs), and may be applied as moving image region color alteration (sometimes called "power windows" or "secondary colors" by the terminology of telecine color correction systems). Often these color adjustments are applied "to taste" and thus bear no relationship to the accurate nor precise reproduction of colors.

It can easily be recognized that the emission spectrum of the color reference display or projector is unlikely to match the sensing spectra of digital cameras, which in turn is unlikely to match the way colors are seen by the human visual system. Further, home viewing and home paper prints operate using yet different spectra.

There currently exists no practice for usefully reconciling the various sensing and emission spectra, outside of systems such as the ICC color standard (and similar systems) which are fundamentally based on the CIE 1931 x_bar, y_bar, and z_bar system, and thus do not take into account any of the common spectral variations in a typical imaging process (from camera to display, projector, color paper print, color transparent film, or video screen).

It is also useful to note that television systems in past decades relied upon a relatively consistent spectra due to consistent use of Cathode Ray Tubes (CRT's), with relatively consistent emission spectra. Reference CRT color monitors were commonly used to set reference color for scenes. Since nearly all end-user presentation in past decades was also via some form of CRT, the use of CIE 1931 chromaticities to specify the spectral mapping of colorimetry and primaries was adequate to a modest degree (although many displays differed substantially from color and gamma-curve calibration specifications). However, at present, most displays are no longer CRT's, and have a wide variation in emission spectra at mastering and at final presentation. Common current computer displays and television displays use LCD's, UHP lamps (metal halide) with projection LCD or DLP modulators, and plasma panel displays, each having significantly different emission spectra. Thus, at present, many systems rely much more heavily on CIE 1931, within which the red, green, and blue chromaticities are specified, to perform the spectral transformations necessary for reasonable color representation.

Of greater significance to the present invention is the current practice of discarding spectral information (both sensing and emission, especially the emission spectra of mastering displays and projectors) as images are processed and distributed. This is true for digital movie masters (which are relatively recent), digital television, web-based computer color image presentation, and color photography and color paper printing for personal and professional use.

In the case of digitally-scanned film negative, it is common practice to discard the filmstock information, which would identify the spectral sensing functions (although these vary with film emulsion batch), and which would identify the dye transmission spectra (which similarly vary), as well as the inter-layer interaction and exposure versus color interactions. Further, the spectral sensing functions of the digital film negative scanner, and perhaps the spectrum of its light source, are also discarded. What is ubiquitously provided is the RGB data, with unspecified spectral properties. This "raw" color digital negative is then color "timed" on a reference color projector or display, the spectra of which are similarly discarded.

It is easily seen that accurate and precise control and reproduction of color has heretofore proven elusive. Thus, an on-going technical challenge is attempting to accurately and precisely specify color in a manner that is device-independent, person-independent, color-patch-size independent, and time-independent.

SUMMARY

The present invention describes methodologies whereby spectral information and/or extended dynamic range is retained as images are captured, processed, and presented during color adjustment. Using this extra spectral information, various methodologies for further presenting or processing the color within these images can be optimized. Presentation-device independence is achieved not by attempting to discover a device-independent intermediate representation, but rather by deferring the binding and mapping of color representation onto a presentation device until its actual use. In this way, future means can be developed, as technology becomes available, of determining essential information needed for accurate and precise presentation of color. For example, future image presentation devices may be able to determine the image surround, and/or develop knowledge of the specific viewer(s), and possibly their state of adaptation, and/or the size and brightness of the presentation, and/or the white-point of the presentation, and numerous other presentation-time-specific issues affecting precise and accurate color. Further, existing available color models can be selected when appropriate. For example, a 10-degree CIE 1964 color model can be used for large areas of color, whereas a 2-degree CIE 1931 color model might be used for small areas.

A few color perception models have been developed in recent years which utilize surround, brightness, and white point information for some presentation environments. Such models can be utilized in conjunction with the present invention when appropriate. Color models which embody low-brightness mesopic color perception can also be applied for appropriate low brightness portions of presentations, such as motion picture projection. The present invention is likely to aid in the development of more accurate and precise presentation models, since many such models are presently hindered by being limited to tri-chromatic inputs specified in terms of the CIE 1931 2-degree XYZ color model and the many systems based upon it (including television systems, which have red, green, and blue primaries defined in CIE 1931 xy chromaticity coordinates).

Some of the more significant new aspects of the present invention for improving the accuracy and precision of presented color include the following, which may be used alone or in combination:

One aspect of the present invention is to defer the "binding" of color matching functions and optimal spectral composition (if more than three primaries are used, e.g., a white channel) by sending (to and from storage, or by transmission) the mastering spectra (three or more primaries) along with the corresponding image (whether coded or uncompressed), or by knowing the mastering spectra implicitly. Note that this aspect allows the present invention to take advantage of future advances in the understanding and modeling of human vision.

Another aspect is to incorporate scene understanding, both of where a typical viewer will be looking (e.g., using eye-tracking data), as well as the nature of what is being seen (e.g., knowledge of the extent of regions of color) to adjust for the yellow macular pigment, and to affect the viewing angle aspect (e.g., 1 deg to 10 deg) of selecting the color matching functions.

Another aspect is varying the color matching function with every pixel in a gradual regionally-varying manner, and/or varying the color matching function as a function of the color of each pixel (with a knowledge of relationship of each color to the color within its immediate surround).

Another aspect is to understand inter-observer variations, and that it is feasible and practical to determine and functionally characterize these variations. These variations can then be incorporated into the presentation of still and moving images (either to averages of actual viewers, or optimized for one or more specific viewers or families of viewers).

Another aspect is that it is practical and feasible to take into account the viewing surround when presenting images, and to include this information along with the other information generated in accordance with the above aspects to improve the accuracy of perceived color, as well as the accuracy and precision of presented color.

The details of one or more implementations of the invention are set forth in the accompanying drawings and the description below.

BRIEF DESCRIPTION OF THE DRAWINGS

FIG. 8A shows an example of a mastering room with a viewing screen on which an image is projected. FIG. 8B shows an example of a presentation room with a viewing screen on which the presentation image from the mastering room source is displayed or projected. FIG. 8C is a diagram showing the types and flow of data for accurate and precise reproduction of color in accordance with the present invention.

Like reference numbers and designations in the various drawings indicate like elements.

DETAILED DESCRIPTION

Rich-Content Moving Image Masters

Figure 1:
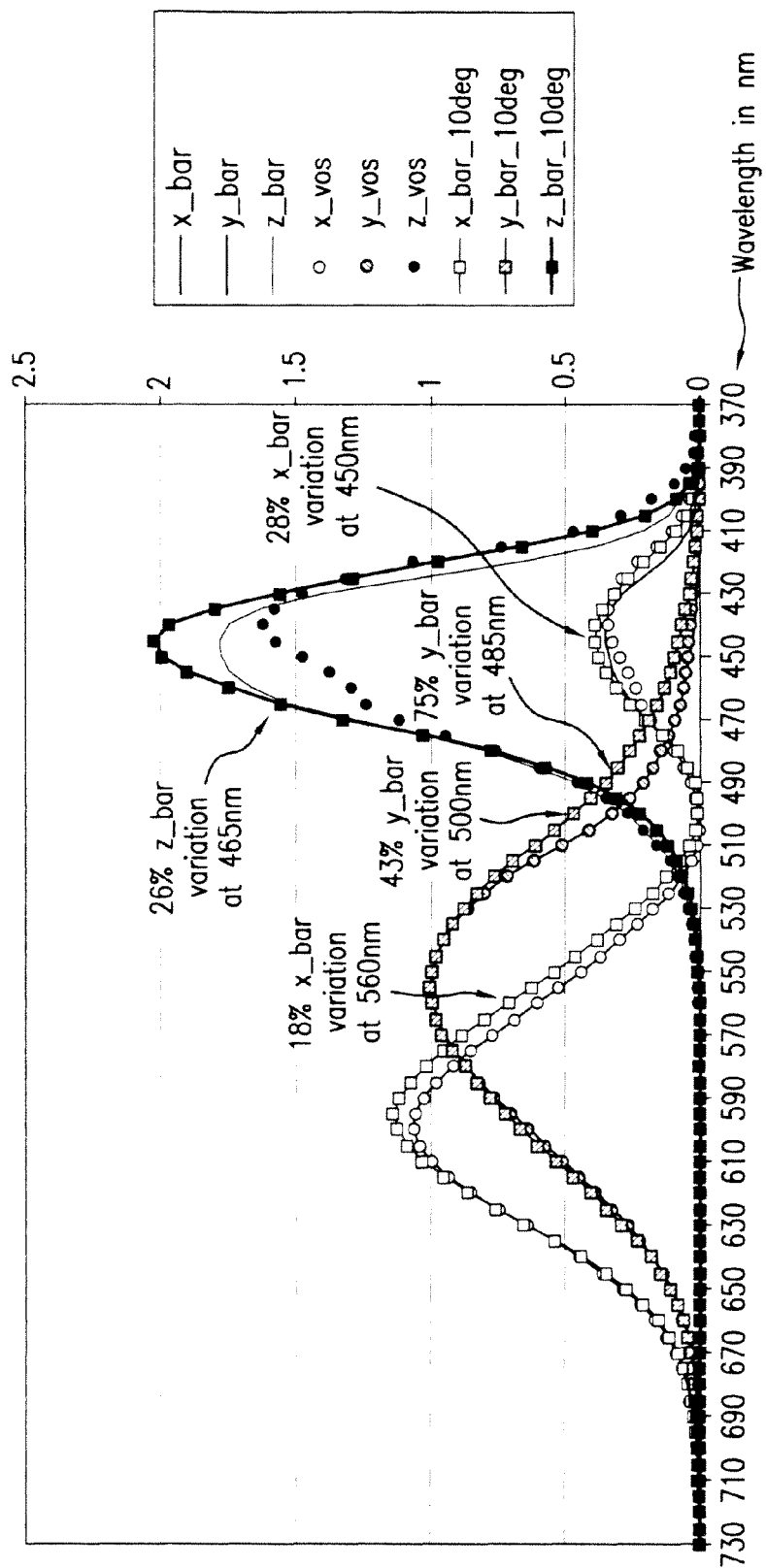
FIG. 1 is a graph showing several existing x_bar, y_bar, z_bar color matching functions: the CIE 1931 (2-degree) version, the Vos 1970 version, and the CIE 1964 10-degree version.
Figure 2:
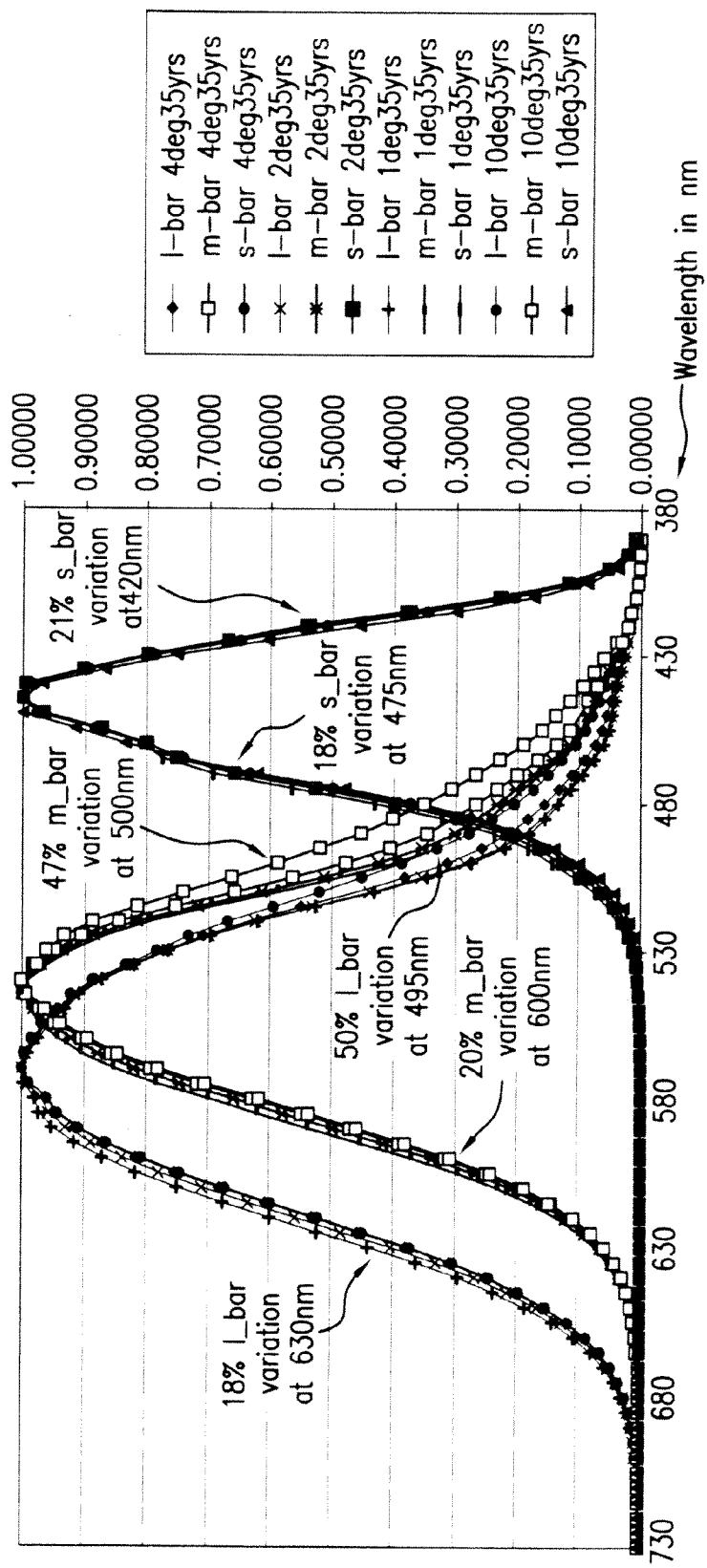
FIG. 2 is a graph of variation of cone fundamentals in CIE 170-1:2006 as a function of viewing angle (1 deg, 2 deg, 4 deg, and 10 deg) for age 35 years.
Figure 3:
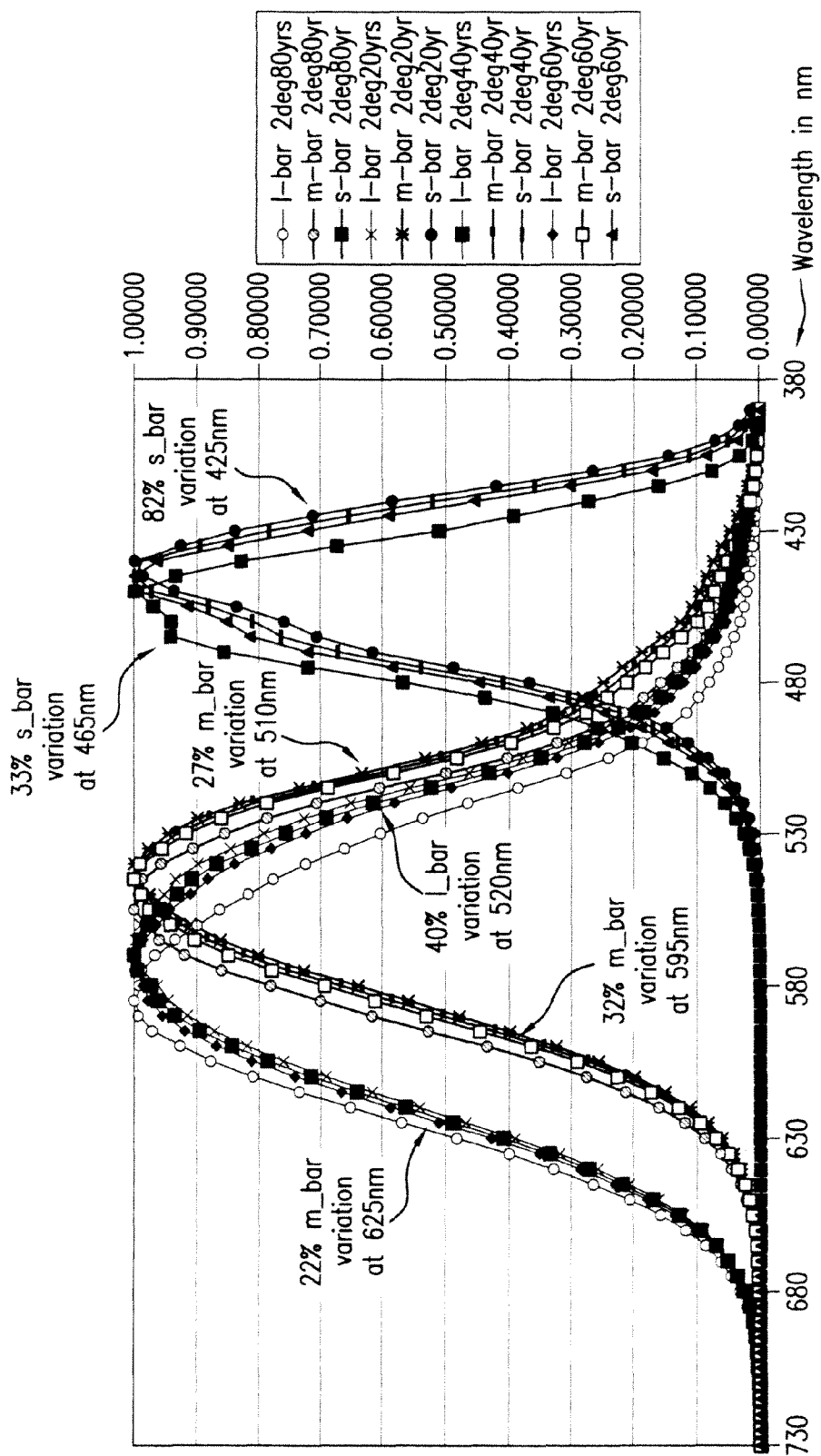
FIG. 3 is a graph of variation of cone fundamentals in CIE 170-1:2006 as a function of age (20 yrs, 40 yrs, 60 yrs, and 80 yrs) for a 2 degree viewing angle.
Figure 4:
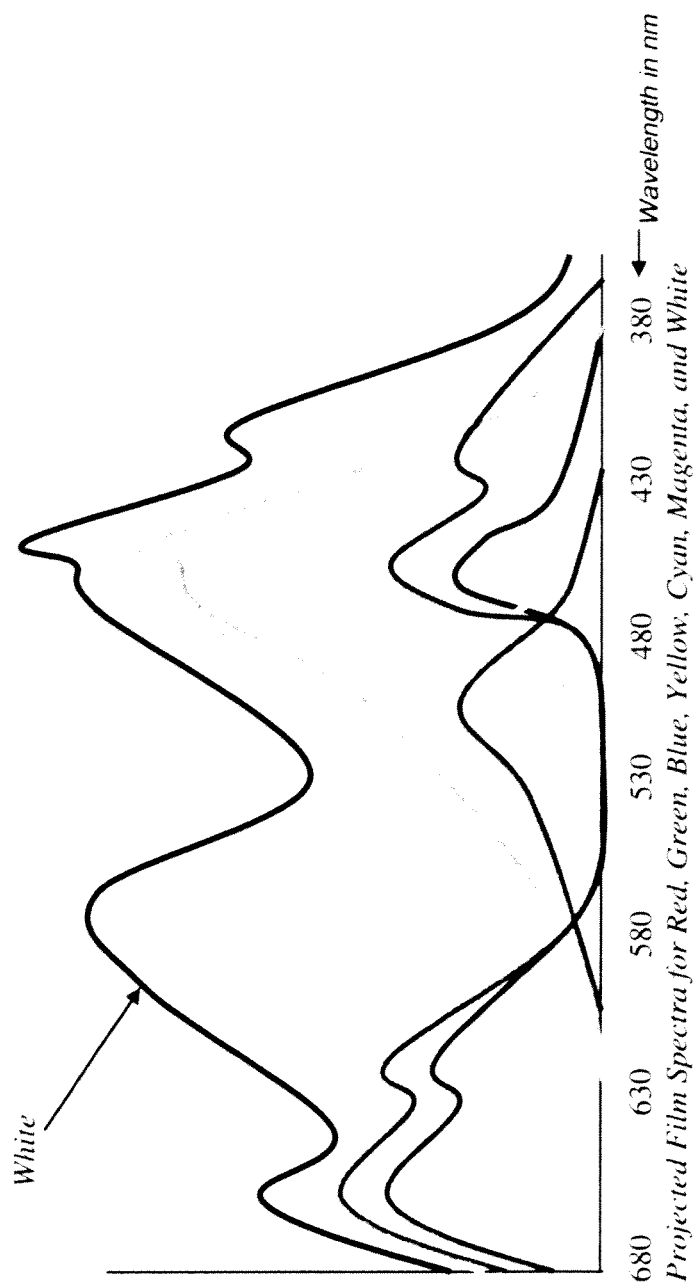
FIG. 4 is a graph of projected film spectra for red, green, blue, yellow, cyan, magenta, and white.
Figure 5:
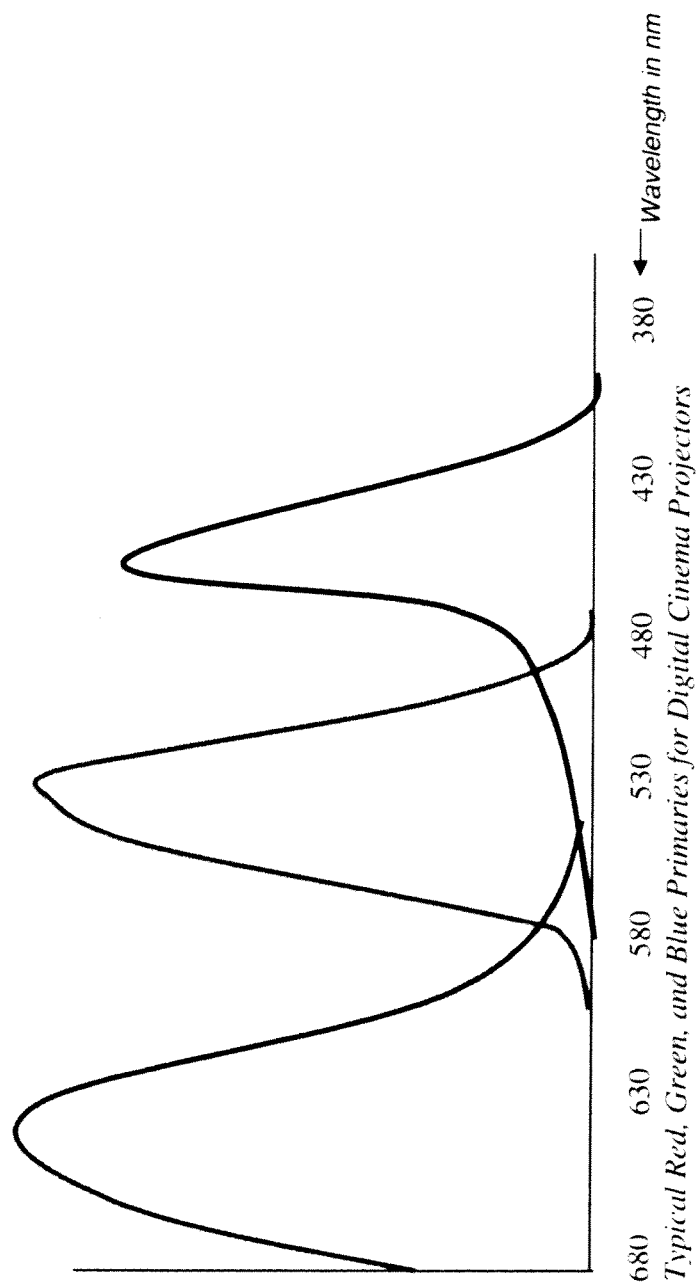
FIG. 5 is a graph of typical red, green, and blue primaries for digital cinema projectors.

It would be useful to create a system which can:

(1) Preserve the full range of the original image data;

(2) Accurately and precisely specify the intended color as mastered;

(3) Provide all colorimetric and spectral information available about the image, and optionally the intermediate elements which comprise that image, to support future improvements in color representation and color presentation;

(4) Accurately and precisely specify intended color in alternate useful presentation environments (such as home television, digital projection for cinema, home and office computer displays, laptop computer displays, color paper prints, etc.);

(5) Communicate the presentation appearance of an image on future displays, future transparent film prints, future paper prints, and/or future projectors, when dynamic range and/or color range can be extended beyond that available at the time when the image was mastered;

(6) Provide optional compression;

(7) Provide for one or more versions and/or one or more digital intermediate elements along with the master image;

(8) Adapt and optimize images to one or more viewers; and (9) Minimize inter-observer variation in perceived color and appearance of images.

A fundamental premise of the present invention is that relevant spectral and/or dynamic range information about images should not be discarded, even if there is no way at present to use many aspects of such information in display or projection (although potentially useful as a source of re-mastering or re-interpretation, as with film negative). It is likely that such information will be valuable for display and projection as color science advances in both theory and practice, and as displays and projectors expand their capabilities.

Another fundamental premise of the present invention is that trichromatic pixels (e.g., rgb or xyz or yuv/yPrPb) specified via the CIE 1931 x_bar, y_bar, z_bar standard are inadequate as a precise or accurate color representation (although adequate as an approximate color representation). Current knowledge of color science is still somewhat approximate. It is therefore beneficial to defer the commitment to mappings into device-independent representations, since current versions of such device-independent representations (e.g., CIE 1931 x_bar, y_bar, z_bar spectral mappings) are known to be only approximate (and thus provide only limited accuracy), and are known to apply only to certain useful cases (e.g., 2-degree color matching for some people in their 20's in a dark viewing surrounding).

Additionally, there is known to be substantial variation in color perception between individuals. The CIE 1931 x_bar, y_bar, z_bar two-degree and the CIE 1964 x_bar_10, y_bar_10, z_bar_10 10-degree standards, as well as the CIE 170-1:2006 color matching functions, are based upon an average over a number of test viewers. Each individual viewer will vary from the average, and the variation is significant for most viewers. Further, color perception changes significantly with age, such that people in their 20's see color quite differently from people in their 50's or 80's. The amount of blue light that impinges on the eye's sensing retina is reduced with each decade, due primarily to yellowing of the lens. No single device-independent tri-chromatic representation, such as the CIE 1931 XYZ standard, can take into account such interpersonal variations. The CIE 170-1:2006 standard does account for age and viewing angle variation for the average viewer. However, CIE 170-1:2006 standard represents a continuous function of age and viewing angle, and thus represents a whole family of color matching functions (unlike CIE 1931 XYZ, which only represents the average for a single age, being researchers having ages in the 20's, and for a 2-deg viewing angle).

An aspect of the present invention is the understanding that whenever the presentation spectrum matches the mastering spectrum, all colors will be an exact match for all viewers, since identical spectra have no inter-personal variation, and are not affected by variations in color matching functions. However, today's displays and projectors exhibit widely varying spectra, having very much greater differences than did Cathode Ray Tubes (CRTs) which were the dominant display type for televisions and computers a decade ago.

Therefore, this invention retains much more information about spectral mapping (both sensing and emission) through the image processing steps from camera (or synthesis) to presentation, with particular emphasis on the mastering display or projector.

It is a further premise of this invention that it is best to retain whatever information is available about spectral mapping of color data, rather than attempting to collapse such data into any current form of "device independent" representation such as the trichromatic CIE 1931 XYZ system. Thus, the present invention avoids premature imposition of a single (and often limited) color representation.

For example, some portions of an image, such as sky or lawn, may occupy more than 10 degrees in the field of view, and may better utilize the CIE 1964 10-deg XYZ standard than the CIE 1931 2-deg XYZ standard (if the pixel data is tri-chromatic). Further, the use of the CIE 170-1:2006 standard allows the color matching functions to be a continuously variable function of viewing angle between 1 degree and 10 degrees. As another example, dark regions of an image may be creatively interpreted using mesopic vision emphasis or de-emphasis (more or less color than rod-vision would indicate). Similarly, the interpreted presentation of an image may be intentionally desaturated (low amounts of colorfulness) and/or warm (reddish or yellowish) or cool (bluish or cyanish) tints, without requiring that the pixel data itself be desaturated, or color biased.

As another example, representations, color vision models, or presentation devices, may be able to utilize spectral mapping information to support more than three primaries (e.g., more than trichromatic). For instance, a commonly available and affordable computer paper printer currently uses five primary colors (red and green are added to the normal yellow, cyan, and magenta as well as neutral black). Also, a number of common small computer presentation projectors use a white/clear segment in a rotating color filter wheel along with red, green, and blue, in order to provide more white brightness. The white segment provides a neutral white primary, in approximately the same spectrum as the projector's white lamp.

Another fundamental concept of the current invention is that pixel values, whether tri-chromatic or more than three primaries, can be used as indices and weightings into spectral functions (which will always have more than three wavelength weights, and which may have dozens or even hundreds of wavelength weights). Further, optional additional information, either associated with each pixel, or applied regionally, can select between spectral functions or weight which spectral functions are to be applied to yield colors in a given situation. Further, optionally there may be more than one such selection and weighting, with recommendations about when to use them (e.g., such as with low-dynamic-range displays, or with high ambient light presentation). For example, a color image comprising pixels representing at least a primary colors can be transformed by mapping the pixels of the a primary colors to b spectral weights, where b equals at least a+1, and then integrating the b spectral weights with c sets of m presentation and n perceptual weights, where c equals no more than b−1 but is at least 3, resulting in c presentation primaries.

Current practice can be seen to be a degenerate case of this concept, without regional attributes (the entire screen being a single uniform region) wherein tri-chromatic colors are spectrally interpreted according to fixed, non-varying spectral weightings of primaries which are specified in terms of the fixed spectra of the CIE 1931 x_bar, y_bar, and z_bar standard (via xy chromaticity coordinates as the specification method of the three color primaries, usually red green and blue).

Use of the Word "Primary" in the Present Invention

In general usage, the primary colors of an additive primary color system (e.g., RGB) are visually and mathematically independent of each other's amounts, making it possible to usually just sum the independent amounts of each primary's spectra to determine the resulting summed multi-primary spectrum. For color paper prints, transparency prints, and other subtractive-color primary systems (most such systems having cyan, magenta, and yellow primaries to modulate red, green, and blue respectively), all independent color modulating spectra channels are also generally (and in the context of this invention) called primaries. However, subtractive primaries generally alter each other's spectra and alter each other's amount of color transmission, and are thus inter-dependent. This characteristic usually requires cross-color corrections via 3-D (or more than three dimensions if more than three primaries are used) cross-color lookup tables and interpolation. The results of the cross-color lookup and interpolation might best be entire spectra, although independent weights of a small number of spectra will often be sufficient.

In the present invention, the word "primary" refers to any independent color channel of a digital projector or digital display, and not just red, green, and blue. Such primary colors, as used here, may include white, and numerous colors other than red, green, and blue. Further, if there are two independent channels for red (or green or blue) with two independent spectra (perhaps one narrow and perhaps one wide), then these are also considered independent primaries, even though they both may be perceived as the same color (e.g., variations of red).

Spectral Characterization of Mastering Displays, Projectors, and their Environment In the present invention, there is no need to precisely assign a specific trichromatic (or more than three primary) device independent system, such as the CIE 1931 2-deg XYZ standard, at the time of mastering, since the trichromatic (or more than three primary) device-independent representation can be deferred. For example, a given transformation might only be applied by the manufacturer of an alternative projection or display device at the time of presentation (or sub-distribution to venues having that device). The essential enabling requirement for specifying a specific color representation for an image is that the three or more color primaries of the mastering display or projector be known in terms of their emission spectra. If a particular primary is set to its maximum value, and all other primaries are set to their minimum value, the spectrum of such primary can be measured using a spectral radiometer. Typical spectral radiometers measure to a spectral accuracy of between 1 nm and 5 nm over the visible range between 380 nm and 780 nm and typically have an energy accuracy of approximately one percent.

If there is a known transfer function (such as an exponentiation by a defined value, typically called gamma), then the linear amounts of each spectra from the corresponding linear amounts of each primary can be summed to know the spectrum of a given color on the mastering screen or display.

Of course, the above scenario is overly idealized. The main confound is the interaction of colors on a screen in a particular room. For example, there may be red seats in a mastering theater, and light scattered back from such seats will affect the colors on a screen. As another example, a 2000:1 contrast range may shrink to a 200:1 contrast range in the presence of large bright areas on the screen, due to light spill coming from the projector lens, the projector booth window glass, and from light scattered back onto the screen from the room.

Thus, in order to improve the above scenario, a full characterization of light-bleed interactions would also be useful in the mastering suite. Importantly, having that additional information, it would be possible to determine, for each frame, via an integration of the light and color over the entire image, the actual spectral-radiometric color emitted by a region of a given size in the presence of the rest of the scene, and in situ in a theater. In this way, red seats in a theater would become indirectly part of the calibration, since their affect on the colors (which the colorist and/or cinematographer may have nulled out) could be taken into account. This step also implicitly measures spectral energy interactions between primary channels, if present. Such interactions can be characterized by sweeping all possible combinations of values of the primaries (using high order bits, and 3-D cross-color lookup, or more than three channels, and then interpolation). Such methods are required for film due to the existence of substantial inter-color interactions. However, for digital projectors and displays, often the (three or more) color primary channels will be fully independent of each other as they exit the projector or display screen.

When this color-interaction information is applied to the re-transformation of an image for presentation on an alternative projector or display device, the same full characterization would be useful, including the specific room interactions. In this way, the future alternative projector or display device, in situ, could reproduce the image as originally seen in the mastering suite, using whatever metameric transformation best suits that projector or display device.

Further, this concept can be generalized to mastering and alternative-device-presentation using more than three primaries. Thus, a heterogeneous mixture of tri-chromatic and multi-chromatic (four primary, six primary, seven primary, etc.) projectors and displays can be used in both mastering and presentation, taking full advantage of the extra color channels to reduce metameric disparities (i.e., to reduce interpersonal variations).

Note that a digital cinema master can simply be RGB in its own input primaries, with no transformation, and the rest of the inventive system would still work. Further, it would not matter if the digital cinema master were specified as being under the CIE 1931 XYZ standard (with or without a gamma exponent), if the transformation back to original projector and/or display primaries (typically RGB primaries if trichromatic) is known, since the linear RGB values can be reconstructed and utilized as weights for the spectra of each such primary.

In this light, when the mastering projector or display is trichromatic it would be simpler just to master in the RGB input space of the specific mastering projector or display being used. However, if the particular display or projector were not calibrated in its specific environment (its specific room), this would not work perfectly (due to the need to characterize room affects on the mastering display or projector). However, a neutral characterization, typical of a similar quality mastering room with a similar display or projector could be applied, especially if the specific primary spectra were measured (e.g., at maximum value for each primary) from the actual projector or display. It is reasonable to anticipate that mastering rooms would be motivated to fully calibrate their displays and projectors within their actual room environment, however.

See below for a detailed description for how to optimize the use of more than three mastering primaries.

Basic Mastering Room Characterization Using RGB

A basic characterization of any mastering room, whether projection or display, can be obtained by determining the spectra for full amplitude of each primary (usually R, G, and B).

In addition, it is important to understand the mapping between digital pixel values of the image and the light that is emitted from a projection screen or an image display. It is often possible to ignore most inter-pixel effects, and determine an effective pixel-value-to-light mapping, which is often intended to be close to a "gamma" exponent, with a gamma of approximately 2.2 being common (although the entire range between 1.6 to 2.6 is utilized for various displays and projectors).

If the primaries vary differently in their pixel value to light function, then each primary must be measured or approximated (e.g., by its approximate gamma) independently. If the function is not gamma (i.e., not an exponent), then a lookup table (possibly created or implemented with interpolation) can be used to yield the appropriate pixel value to light function. Gamma, log, quasi-log, linear, and other mappings from pixel values to light are also useful and may be implemented via lookup tables (possibly with interpolation) or by using the appropriate functions.

Note that some types of display and projection devices do not exhibit significant inter-primary interactions, whereas others can have significant interactions. When such interactions are present, a more complex characterization is required which can appropriately account for these interactions (see discussion below).

Note that current practice is to assume a pure gamma function, and a complete absence of inter-primary affects. It is also current practice to ignore the spectra of the primaries, and only to utilize CIE 1931 xy chromaticities during calibration when calibration is possible, and to ignore any actual variation from color primary xy chromaticity calibration otherwise.

One key concept of the present invention is that the determined mastering room display or projector primary color spectra be retained and conveyed with each group of images mastered with those primary spectra. An additional key concept is that such spectra be utilized for presentation (see discussion below).

This differs from current practice, wherein the mastered RGB values are referenced to their CIE 1931 xy chromaticities (whether the mastering display or projector was properly calibrated or not). Any subsequent color transformations, such as RGB to YUV (or to YPrPb, to YCrCb, to XYZ, etc.) are performed as matrix operations (either 3×3 or 3×4 matrices), without further reference to mastering spectra. Note that the matrix multiplies in current practice are often applied to non-linear (e.g., gamma) pixel values (which is common practice in television, but is an incorrect practice). The SMPTE DC-28 specification for matrix processing of pixels for digital cinema projection utilizes CIE 1931 XYZ with a 2.6 gamma applied, which is removed (yielding correct linear pixel values) prior to applying the 3×3 matrix transformation to RGB for projection. This still is dependent upon having collapsed the RGB mastering spectra into the CIE 1931 XYZ representation.

Note that calibration chromaticities may not be achievable for every situation. In such cases, current practice is to get as close as possible, and then to ignore the remaining difference in chromaticity. Even this could be improved by conveying the actual CIE 1931 xy chromaticities which were achieved during calibration, rather than ignoring the difference. However, a better practice is to send the resulting primary spectra (as is proposed by the present invention), since this eliminates any dependency upon CIE 1931 xy chromaticity, and does not depend upon whether the projector or display can achieve the calibration chromaticities.

Note also that this aspect of the present invention (conveying mastering room display or projector primary color spectra with each group of images mastered with those primary spectra) can be implemented entirely as matrices, if the integrals with color matching functions and spectra during mastering and presentation are known a priori, as well as possibly other viewing and mastering conditions. A set of matrices, corresponding to the known conditions, can be used. When adjustments for various attributes (such as viewing angle, see discussion below) are made, these adjustments can be implemented via interpolation (and possibly renormalization) between the matrices within the set.

Thus, although the present invention requires the use of the integration of spectra for mastering and presentation, such integration can sometimes be performed a priori, resulting in an implementation entirely using matrices. This differs from current practice, which uses a single matrix for any given display, where that matrix is based solely on CIE 1931 x_bar, y_bar, z_bar integrations (computed via either xy chromaticities resulting from these integrations, or XYZ tristimulus values resulting from these integrations).

More than Three Primaries

Use of more than three primaries in the mastering room is a simple linear extension of the above method. For example, four primaries or more can also have their spectra measured by giving a maximum value solely to each color channel.

Note that there is no current practice with respect to more than three primaries, nor for primaries other than red, green, and blue.

Idealized Concept Approach for Mastering Room Characterization

A known concept can be utilized in conjunction with the present invention, which is to set an idealized black at "zero" light, even though total lack of light almost never exists (e.g., the blackest black of a projector still emits some light, and room light spill on a display or projection screen lightens "black" areas). Thus, a zero pixel value is intended to make perfect black, even if it does not actually do so on the mastering screen.

Another known concept can be utilized in conjunction with the present invention, which is to define an idealized uniform screen, such that a particular RGB value is intended to produce the same color, spectrum, and brightness everywhere on the screen, even if it does not actually do so on a real mastering screen.

Addition of Light Level at Black

The idealized zero-light black concept can be improved if the light actually emitted from a screen can be measured spectrally for those pixels that are supposed to be true black. Further, this "black spectrum", if measured, should be conveyed along with the measured primary spectra (e.g., R, G, and B or more than three primary spectra). Note that light level at black can be measured with common sensitive light meters, although the chromaticity and/or spectra of black may require long measurements or specialized high-sensitivity chroma meters or spectral radiometers.

As an alternative, a black spectrum can be deduced from low light level (e.g., 1% and 2% of white) spectral differences of three or more primaries and gray (gray being all primaries at the same value) if the available spectral radiometer is not sufficiently sensitive. This is done by measuring at the lowest possible light level which is practical for the spectral radiometer, and then a light level above that lowest level (e.g., one stop higher, which is a factor of two brighter). The amount that the spectra is altered for the primaries and gray values allows the inference by extrapolation to the amount of light, and its spectra, when the pixel value goes to zero (i.e., black). For example, if a given pixel value is intended to yield half the light (in linear units) but in fact yields ⅔ as much light, then the ⅙ difference (between ½ and ⅔) is the inferred amount of light from projection screen black or display black. Similarly, this concept can be extrapolated to the spectra, by noting, for each wavelength, the amount of light above half, to yield the spectrum of projection screen black or display black via inference. For example, if the energy at 470 nm falls to ¾ (instead of ½), then ¼ of the energy at 470 nm is coming from the display at black or projection screen at black. At 580 nm, if the energy falls to ⅝ (instead of ½), then ⅛ of the energy at 580 nm is coming from the display at black or projection screen at black. If this methodology is applied to all wavelengths, the spectral energy at black can be determined for projection screens or displays.

Under the normal condition where the black spectral energy is a negligible fraction of the full-on-primary spectra, the spectra emitted from the screen for any pixel brightness can be determined by summing the black spectral energy with the linear amount of energy from the linear weight (thus without gamma) of each of red, green, and blue (and more primaries, if more than three). To the degree that the values are truly linear, this will accurately yield the spectra emitted from the screen for each possible value of RGB (or more than three) primaries.

Numerous Non-Idealized Corrections are Also Feasible

If the pixel values in an image are not truly linear, and/or if there are inter-pixel interactions, then additional corrections must be applied to better achieve display accurate colors. The model used for such corrections must match the nature of the issue being corrected. For example, light spill from one area of the screen to another must model the amount of light emitted by each area of the screen. As another example, if a screen dims under the load of a large amount of light, then the amount of total light emitted from the screen must be considered in order to make a correction. As another example, if the spectra or color balance alters when viewing the screen from different angles and different locations, the correction must take into account the viewer's position with respect to the screen. For example, in some cases, a high-gain non-uniform screen (e.g., a silver screen used for 3-D stereoscopic polarization preservation) should not be modeled with respect to mastering, since the "hot spot" near the image center is entirely an artifact of the screen's high gain, and does not represent the intended image. However, such a hot spot artifact could be corrected during mastering presentation, and/or during final display or projection presentation. A uniform field of each primary color and of white can be utilized, as well as the viewing location, to determine a correction. Such a correction can even account for spectral alteration if the primaries and white are measured spectrally from a particular location for each region of the screen. In such a case, the spectra would need to be known, and possibly conveyed, for each region of the screen for each primary and for white and for black, for each useful viewing location. If the spectra alter in broad spectral balances, a few spectral weights can be applied across the spectra. For example, a smoothly varying spectral weight might simply have a red, green, and blue adjustment amount which smoothly interpolates across the visible (e.g., 380 nm to 780 nm) spectra, to weight the primary spectra with respect to viewing location or screen position. If the spectral alteration is complex, then measurement and conveyance of the entire spectrum for each image location and/or viewing location may be required.

Elaborate characterizations, as described above, become feasible under the spectral-retention and conveyance concepts of the present invention.

How to Apply Mastering Room Characterization Information for a Given Presentation As noted above, under the present invention, spectral characteristics of an image display (directly or via projection) in a mastering room are determined and conveyed with each group of images mastered in such room. Presentation use of such conveyed characterization information involves a similar procedure, described below, whether the screen is a display (like a computer monitor) or a projector and screen. Any or all of the above mastering room characterizations can be applied to a presentation room and display or projector plus screen.

The first step will usually be to correct image pixels for gamma and brightness issues.

The next step is to determine the presentation spectra of the presentation display's or projector's primaries using the maximum of each primary (with all others set at minimum).

Conceptually the mastering black spectrum is then optionally summed with the mastering primary spectra, weighted by their linear-representation RGB (and other primary) values to yield the spectrum of each pixel at the time of mastering (assuming no idealized black). Then the presentation system spectrum of black is subtracted (since it is already present in the presentation environment), and the resulting spectra are integrated with the appropriate (which could vary per pixel) color matching functions (e.g., 1 ms cone fundamentals from CIE 170-1:2006) to yield the amount of RGB, or more than three primaries, to utilize for presentation (see below for a description of the use of more than three primaries in mastering and/or presentation). Thus, this aspect of the invention can be summarized as (1) determining the color spectra and the black spectrum (and optionally the white spectrum) of the mastering room image display characteristics, (2) conveying the determined spectra along with the mastered image to a presentation system, (3) determining the black spectra of the presentation system, (4) correcting the mastered image as function of the conveyed determined spectra to yield the spectrum of each pixel at the time of mastering, (5) subtracting out the black spectra of the presentation system from the corrected mastered image, and (6) mapping the resulting corrected master image to a display system color space to utilize for presentation.

Using 1 nm wavelength resolution intervals over the range 380 nm to 780 nm, only 401 multiplies and 401 adds are needed for a given integration for each primary. With today's personal computers and display graphics cards, as well as with today's digital televisions, such an integration can be performed thousands or more times per frame to provide regional, viewing angle, regional angular size of various colors, and personal variations. With high end personal computers, high end graphics cards, and high end high definition televisions, it is even feasible to perform such integrations independently for each pixel. However, since emission spectra and color matching functions, and their use, should vary smoothly over regions of the image and should continuously vary smoothly as a function of color, it is usually not necessary to perform the integration for each pixel. Instead, deltas to color matrices for various parameters can be determined once per frame (or per scene or group of frames). A weighted sum of such deltas can be utilized when they are linearly independent. If they are interdependent, then a weighted sum of the resulting matrices (possibly with renormalization), with matrices at several non-linear key parameter values, can be used to model and process all of the attributes described in the present invention.

It is perfectly feasible to compute everything needed to build functionally variable matrices at the start of any new show (image sequence), and even practical at the start of each scene or even each frame.

Conceptually, the use of weighted matrices or deltas to matrices is a computational expedient. If one conceives of a single intended spectrum for each pixel, an effective viewing width angle associated with the color of that pixel (determined by the regional size of the given color, and the relationship of that color to the viewing center), and the age of a viewer (or average age of a group of viewers), a color matching function can be selected to integrate with that spectrum according to CIE 170-1:2006, or any other appropriate color vision model (and its associated functionally variable color matching functions). The concepts in this paragraph are described in detail below. The presentation primary spectra can then be integrated with the same color matching functions and matrix inverted to yield the matrix to apply to the pixel color for presentation (with the addition of gamma, or other function which converts pixel values to linear light).

Note that the integrations and matrix operations described here should utilize linear pixel energy (or equivalently linear pixel photon quanta, although energy is common practice and is generally more convenient), primarily because matrix operators are linear operators and are intended for use with pixel values which are expressed in terms of linear light (i.e., proportional to foot-lamberts or $cd/m^2$ of emitted energy).

If more than three primaries are used in mastering and/or presentation, it is optimal to maximize the broad spectral emitters (see discussion below). Conceptually this can also be done on a per-pixel process, but can use the same computational expedient of deltas or weighted matrix sums (with possible renormalization) since the function should be smoothly varying by color and region, as with trichromatic (usually RGB) presentation and/or mastering.

One possible practical implementation method might be to send some or all of mastering room characterization information to a digital processing system which is driving the presentation display or projector. The digital processing system can then use this data when preparing the pixels for display or projection.

Note that these are just some of the ways to use the mastering room spectral characterization. There are additional issues, related to size of the screen in the field of view at the time of mastering versus at the time of presentation, the absolute brightness and color gamut of presentation, where the viewer is looking (and whether the eye is likely to wander), viewer age or average viewer age, inter-personal-variation issues, etc.

With current processors and graphics systems, it is perfectly practical to apply varying matrix values to every pixel depending on the location of the pixel, the color of the pixel, the location of the viewer and size of the screen, and where the viewer is looking (and whether their eye is likely to wander the particular scene), plus specific viewer or average viewer information.

A color and/or brightness compensation can be computed for different brightness levels at the time of presentation versus when mastered. A color and/or brightness compensation also can be computed for a different ambient surrounding environment (e.g., amount of ambient light spill, color of the room, etc.) at time of presentation versus when mastered.

Application of Color Matching Functions to Mastering and Presentation

There are two points at which color matching functions are applied in cases where the spectrum of the reference projector/display does not match the presentation projector display. The first point is the mapping of the spectra used for reference mastering to one or more color matching functions. Ideally, the reference viewer(s), which is typically the colorist, the cinematographer, and/or the director, are characterized at least by age, and possibly also (preferably) by a specific color matching function. If the reference projector and/or display has more than three primaries, such as a broad-spectrum white, it will be optimal to utilize as much of the broad-spectrum primaries as possible in order to minimize inter-observer variation. Also, the angular size of the image when performing the mastering is valuable, such that wide areas of color can use 10-degree matching functions for the reference viewer, small areas of color can use 1-deg matching functions, and intermediate areas can use an "in-between" angular matching function. The master can be trichromatic, preferably in the spectra of the mastering primaries, or it can have more than three primaries, again in the mastering spectra of each primary. For example, for a broad-spectrum white channel, in addition to red, green, and blue, the amounts of the white channel and red, green, and blue channels can all be conveyed as four color primary channels. Alternatively, a known function to convert mastered RGB values into the four color channels (including the broad spectrum white) can be utilized so that the four channels can be reconstructed unambiguously from the RGB three channels being conveyed.

The second point of application of color matching functions is when the mastered color, whether trichromatic or more than three primaries, is presented to a viewer for final presentation on a monitor or projector. Using color matching functions aimed at the viewer, or at an average of a population of viewers (such as a movie audience), and taking into account the angular width for the viewer or the average of viewers, a color matching function can be chosen for presentation. If a fourth broad-spectrum white is also included, maximizing its use will minimize inter-observer variation. Further, to the degree that more than three spectra can be adjusted to match the mastering spectra, this will minimize the difference from the reference viewing (adjusted for age and viewing angle). Further, when mixing more than three primaries, it is useful to minimize the use of primaries which place increased energy (such as spectral spikes) at points of maximum inter-observer variation, such as deep red (>690 nm), yellow (near 590 nm), cyan (near 500 nm), and blue-violet (<440 nm).

Example Full Mastering Room Characterization

One possible methodology to achieve a full mastering room spectral characterization is described as follows:

(1) Select and maintain a consistent calibration methodology for the display or projector which is being used as the reference display in the mastering room. It does not matter what calibration methodology is used, as long as the image is repeatable.

(2) Select and maintain an unchanging input representation and an unchanging reference setting (associated with any presentation transformations normally used) within the mastering display or projector. For trichromatic (usually RGB) displays and projectors, any tri-chromatic input representation (RGB, XYZ, YUV, etc.) should be satisfactory, but it is likely that RGB will most naturally fit the display or projector, since most such devices emit red, green, and blue primaries. If more than three primaries are used, then each primary should be characterized.

(3) Measure the mapping between all possible primary input values, using high order bits (with the number of bits being selected based upon the number of practical measurements). This measurement should use a small field, such as a 2-degree square or circle, with a black surround. The measurement should be made using the best spectral radiometric wavelength resolution (usually between 1 nm and 5 nm) over the wavelength range between 380 nm to 780 nm. This set of measurements becomes the primary characterization of the mastering room, providing the mapping of tri-chromatic (or more than three primary) projector pixel input values to displayed spectra.

(4) Measure the light spill onto the small field, using a series of small regions (such as 2-degree squares or circles) at various positions on the screen. (for example, the upper left, upper middle, upper right, middle left, middle right, lower left, lower middle, and lower right). Using these positions, one at a time, measure the affect on a neutral gray patch (such as 18% of peak white), and on a near-black patch (such as 1% of peak white) of every possible tri-chromatic color (again sweeping high order bits). Each measurement should be made using a spectral radiometer, as in step (3) above. The neutral gray and near-black patches should also be measured with a black surround. A true black measurement would also be beneficial, if the spectral radiometer has sufficient sensitivity. The black measurement measures not only the minimum emitted light from the display or projector, but also the ambient spill light in the room (such as from an exit sign onto a screen). Note that this black-surround measurement of the gray patch would establish the reference projection/display white point, and its entire spectrum. Note also that this white point may be insufficiently characterized by a color temperature, and may be insufficiently characterized by a CIE 1931 2-deg xy chromaticity value, since the full definition of this white-point (using the 18% gray patch) is only provided by the spectra when it is measured in this step. If trichromatic, the white point will be the maximum values, usually RGB, or the 18% gray values. See below for a description of how to optimize the use of more than three primaries with respect to all colors, but the white point in particular. For this step, when there are more than three primaries, the 18% gray patch will not have a unique set of values, and will further be dependent upon the choice of color matching functions. In this case, it is best to measure the 18% gray patch using several color matching functions. Then each primary should be maximized and minimized as well as one or more values in between, while maintaining the intended neutral gray under each color matching function. Note that there will usually be an infinite number of combinations of amounts of more than three primaries which will yield the 18% gray patch, and that each color matching function will require a different balance of the amounts of these (more than three) primaries in order to yield 10% gray (for a given "color" of 18% gray, such as tungsten at 5500K). However, in practice, according to the principles of this invention, gray will generally utilize a maximum amount of one or more of the broadband spectral primaries, and such configuration may be sufficient (although it is probably best to still use a number of color matching functions). Note that the maximization of broad-spectrum primaries, especially broad-spectrum whites and grays, minimizes inter-observer variation, as well as variations with respect to differences in color matching functions. As will be described below, a primary corresponding to the equal-energy illuminant "E" will show no variation with respect to color matching functions (since they are all normalized to equal area according to the theoretical "E" illuminant).

(5) Repeat step 4 with the gray patch and near-black patch moved to each of the screen edge locations, and adding the middle of the screen to the set of locations for the spill-emitting regions. The set of measurements from steps (4) and (5) become the secondary characterization of the mastering room, providing important information about the spectral alteration due to spill from the surrounding image area, as well as inter-color effects that may be present within the electronic projector or display (if any).

(6) Illuminate a single pixel in the center of the screen, sequentially in gray, yellow, cyan, magenta, red, green, and blue, as well as in the color of any other primaries which might be present, and all possible maximum value combinations of primaries. Using a precision wide-dynamic-range camera (such as the Thomson Viper™ or an appropriate digital still camera), align the pixel raster from the projector with a known number of pixels in the camera. The camera preferably has a specified high-precision mapping to linear light. The lens used on the camera preferably should have low near-field and wide-field flare, and preferably the lens used (in the actual camera, since other optical elements in the camera may also have an affect) is itself spectrally characterized, so that camera optical near-field spill can be nulled out of the measurement. Capture one frame for each primary and combined primary color at the center location. Repeat the procedure for the upper left, upper middle, upper right, left middle, right middle, lower left, lower middle, and lower right. Using this data, the near-field spill for each pixel can be modeled.

Using the above methodology, a characterization is achieved for the spectral emission from a given pixel value. Further, a characterization is achieved for the alterations to that spectra due to all sources of spill in that mastering room. Using the projector's or display's input pixel values of each actual image subsequently mastered in that room, it is then possible to compute the actual screen emission spectra for every region of the screen. This emission spectra can then be used to provide optimal matching information in support of device independence. Each alternate device would then have the target spectra for each color, and could apply whichever transformation (often involving a set of color matching functions) optimally matches the re-creation of a color having that spectral emission.

This display and projector characterization should allow exact or near exact matching of every color in every reference frame if a spectra-reproduction projector or display (although none are commercially available at present), which would then exactly reproduce the image. Also, an increase in the number of emission primaries above three (i.e., more than tri-chromatic) would be supported in a straightforward way using this characterization and the methodologies described below. A presentation device population having a heterogeneous mixture of numbers of emission primaries would be also naturally supported by these methodologies. In this way, there would be a natural path to new display technologies, supporting any pace whereby there evolve increasing numbers of primary colors beyond the initial three (the three typically being RGB).

These mastering room characterization procedures can be further improved by re-measuring the room regularly, perhaps using an automated or semi-automated measuring system having a computer-controlled spectral-radiometer. It is feasible to continuously measure the display or projection system by measuring the colors being presented versus the pixel values being used to make those colors. If a spectral radiometer where used for every pixel in a camera (e.g., a spectral-radiometer moving image camera, although none are commercially available at present), one could continuously measure the emitted spectrum for the entire displayed or projected image by examining the spectra of the pixels seen by such a spectral camera.

This above methodology assumes pixel-independent behavior in the projector or display. If an inter-pixel-dependent behavior is present, such as a reduction in the brightness of a given pixel value under the load of making an entire screen bright, then a more complete characterization will be required to model such conditions. Note that this problem occurs intentionally in some plasma displays to lengthen useful life (by darkening the screen when there is a high percentage of white or bright colors in the image), and that this problem occurs in CRT displays when there is insufficient power supply regulation for stability (again, darkening the screen under the load current required to display large areas of white or bright colors).

Regional Variation on the Screen

Note that the mapping of digital values to light energy, typically called video gamma or transfer characteristic, varies with location on the screen and direction of viewing. This is exhibited as a change in apparent contrast and/or colorfulness at different regions of the screen, and further changes if one moves one's head (or changes seat in a viewing room).

Note that CRT's exhibited some directional color and brightness and gamma alteration behavior, as do plasma and other displays. Retro-reflective large-screen televisions, which represent a large portion of existing televisions, have many directional and screen-location variations that would benefit from these techniques.

Regional Variations Affecting 3-D Stereoscopic Viewing

For 3-D stereoscopic viewing, it is often the case that brightness and color differ between each eye, and with viewing location within the viewing room. Color and brightness maps of the screen (either displayed or projected) for any given viewing location can be created for each eye, either spectrally or via a simplified chromaticity and brightness map. Such maps can then be utilized to correct for color and brightness for each eye for all regions on the corresponding portion (i.e., left or right eye) of the 3-D display from that viewing location. For multiple viewers, an average map, either uniform or favoring one or more viewers, can be utilized. With multiple viewing locations, such as multiple seats, or even positions within seats for small scenes, it is necessary to measure or approximate the differences in spectra and/or color and brightness for each such seat, over all regions of the screen (either displayed or projected). Accurate color and brightness can then be provided to at least one seat, and perhaps to many seats near each other (e.g., the center of a theater, or the center of a living room). Again the knowledge of viewing center (when available) can be utilized with various angular-determined (e.g., 1 deg to 10 deg CIE 170-1:2006) color matching functions, which vary smoothly regionally (and optionally also over time) as applied to 3-D stereoscopic viewing.

Note that some 3-D stereoscopic displays require glasses, either polarized or density modulated back-and-forth between the two eyes. The properties of the glasses may be affected by where the head is oriented, and thus which part of the glass is being looked through at a given part of the screen. For this purpose, a characterization of the specific glasses, their affect on color and brightness, and optionally spectra as well, plus head orientation, can be added to the information needed to make a thorough correction of color and brightness.

For 3-D displays not requiring glasses, such as small-directional-filters (such as vertical "lenticular" bar screens), the location viewed-from and looked-at may be a sufficient characterization of brightness and color, optionally via spectra. However, some such micro-directional filters are so sensitive to viewing position that it may not be possible to precisely characterize and correct such a display. However, an approximate characterization is feasible for nearly all types of display technologies including all types of 3-D display technologies.

3-D systems using polarizers or shuttered glasses (often liquid crystal, which also involves polarization) generally provide the full spectrum of the screen or display. However, in recent years, a spectral band-split means of separating the left and right eye images has sometimes been used. This is done with a deep (longer wavelength) red green and blue for one eye, and a shallow (shorter wavelength) red green and blue for the other eye. Such spectral band-split systems rely more heavily on color matching functions, since the color seen by each eye will differ if correct color matching functions are not applied independently to each eye based upon spectra received for red, green, and blue primaries by each eye. The methods of the present invention allow more thorough, accurate, and precise application of color matching functions to perceived color, given the necessary spectra. Note that such methods are much more sensitive to inter-personal and color matching function variation. When colors on an object do not match between eyes, the artifact is sometimes perceived as "iridescence," as is common on butterfly wings and when seeing thin film coatings on glass or plastic (or even thin oil film on water). This conveys a very different impression than an object having the same perceived color in each eye.

Intentional Idealization

It will sometimes be the case that idealization is intentional. For example, it may be the intent that the black pixels produce zero light, or at least as dark as any display or projector can produce, even though a given projector or display will emit light from the screen when black pixels are specified. Also, it may be the intent that the screen be uniform, even though it is not actually uniform, such that a given value of pixel is intended to produce the same amount of light everywhere on the screen, independent of all other factors. It may also be the intent that a given object (e.g., a flower) be as colorful as possible, even when the mastering display or projector has a limited range of color.

Such intentions can be optionally specified, and should be sufficiently specific that the meaning is as clear as possible with respect to presentation. For example, if a zero pixel value in all primaries means black, but a given presentation screen produces 0.1% of white for its darkest black, what should be done with a pixel representing 0.1% of white? Several choices might be that a) it remains at 0.1%, or b) it becomes 0.2% (in effect adding it to the "base" black value of the presentation screen), or c) it becomes an in-between value at 0.15% (which is probably the best choice). At some point above this "interpreted" presentation black, the pixel value should be smoothly adjusted such that the pixel is again precisely tracking, such as above 0.4% (i.e., so that values above 0.4% of screen white emit light based precisely upon the image pixel values, but below 0.4% follow the specified rules for presentation of black, with such rules taking into account various anticipated black values of various anticipated presentation displays). To the degree that such intentions can be given specific rules for how to implement them in various situations, such intentions can indicate precise implementation rules, and therefore yield specific intentional results in various presentation situations.

Note that current practice in moving images is to provide no "intentions" nor rules for implementing any intentions. For still images, the ICC color standard provides for intentions such as "colorimetric accuracy", "idealized black", or "best presentation", but without providing any specific rules for how to implement these intentions. Such implementations are left to each manufacturer of color printers to implement, and nearly all such implementations are undocumented. It is often the case that all such vaguely specified intentions within "ICC profiles" yield unintentional and/or unpredictable results.

To avoid this problem, intentions should be implemented according to specific rules. Such rules should either be conveyed explicitly, or conveyed by using pre-arranged and pre-specified rules and identifying which known rules to utilize (possibly according to presentation device and/or viewing conditions).

Note that several key people may have different specific intentions during mastering. For example, the director, the cinematographer, and the colorist may all have differing specific intentions for the presentation of black. In such a case, all of the different intentions may be conveyed, with an identification of each "intender" being associated with each intention. Note also that a key person may change their intention after a time, such as a director or cinematographer changing their colors or scene gamma when re-mastering for video as a minor re-interpretation. The various intentions, and their associated time and context, can each be conveyed. When presenting the mastered images (either still or moving) on a projector or display, a choice can be made between the various intentions for a given feature (such as the treatment of black), if more than one intention is provided for that feature. Such a selection can be made by the preference of the viewer or group of viewers, or by selection of a specific key person's intent (for example, choosing the cinematographer's intent versus director's intent).

Other Uses of Intent

Intent may have numerous other uses besides forms of idealization. For example, the location, viewing angle, and screen brightness may be known for a key person during mastering, such as the cinematographer or director. However, it may be their intent that this screen brightness and viewing angle are merely a convenient expedient, and may not represent their intended image angular size and/or image brightness. It can therefore be useful for key mastering personnel to indicate their intent with respect to their mastering viewing conditions, if such viewing conditions are conveyed. For example, mastering viewing might subtend a 20 degree horizontal angle, but the intent might be for ideal viewing to subtend a 40 degree horizontal angle for the width of the screen.

Further, there may be more than one intentional alteration of a mastered image which is acceptable to each of the key personnel. For example, a cinematographer and/or directory may indicate the specific treatment of black and dark gray when being viewed in high ambient surround lighting, and a different specific treatment of black and dark gray when being viewed in a low ambient surround. A cinematographer and/or director may indicate the specific color saturation intended for those who wish to view a given show with more or less colorfulness, such that the low saturation colors are specified accurately and precisely for those choosing low saturation viewing, and that alternatively the high saturation colors are specified accurately and precisely for those choosing high saturation viewing.

Another approach would be that a show is intended to be viewed in a dark surround, with a specified intent for the treatment of black. However, if the show is seen in a high ambient surround, the specifics of black and dark gray processing are provided by one or more of the key personnel. Thus, the intended viewing environment is conveyed, but also the presentation is intentionally and accurately and precisely specified even when the viewing environment does not correspond to the preferred intent. A mastering environment may be intentionally altered, such as by adding substantial ambient room light, including shining some light on the projection screen or display screen, when setting the black and dark rendering specific parameters for such altered high-ambient viewing intent.

When feasible, intent can also be conveyed with respect to alterations in presentation brightness, colorfulness, ambient surround brightness, white point, presentation contrast, maximum black-to-white ratio, viewing angle, off-angle viewing, and numerous other common alterations in the presentation environment with respect to the mastering environment.

There are likely to be many useful ways in which key personnel during mastering can convey their intent with respect to one or more alternate viewing conditions and/or viewing preferences.

In the absence of such preference information from key personnel, various common adaptation transformations can be applied. For example, it is common to use a "von-Kries" transformation when altering the presentation white point with respect to the mastering white point. Much of the function of "color appearance modeling" deals with attempting to automate many alterations of common presentation with respect to the idealized mastering presentation. Correcting for alterations in the white point is one of the most significant aims of color appearance models.

Accordingly, in one aspect of the invention, rules specifying the intent of various content creators are clearly and unambiguously conveyed with each image being mastered for use in a presentation system to alter the presentation display of such content in a pre-defined way, according to presentation context and/or viewer choice.

Correction for Linear Light

It is beneficial to specify correction for linear light to cause pixel values to have a defined mapping to linear light, or to send a description so pixel values can be corrected to linear light at the presentation display or projector. Current common practice is to use an implicit gamma exponent, or a linear-black-adjusted gamma exponent (called a "transfer characteristic" in video system specifications). Alternatively, the projection system can be calibrated to make a known function (or linear representation) of the pixel values into linear light. As a hybrid, it is useful to calibrate as much as possible, and convey the remaining information where calibration could not accomplish the full extent of the required correction(s). The goal is to provide a defined mapping from pixel values into the linear light that was used at the mastering display or projection screen, so that the same amount of light may be accurately reproduced during subsequent display or projection.

Alternatively, if adjustments such as gamma increase or decrease, color saturation increase or decrease, brightness increase or decrease, or other alternation is desired, it will usually be best to begin such alteration with an accurate linear light representation. For example, a 1.1 gamma increase will produce a predictable presentation if the pixel values begin with a known transformation to exact linear light. Note that linear light is an implicit gamma of 1.0 (i.e., this means that a unity exponent is the same as no "gamma" exponent).

Brightness of Mastering Screen

The current specification of white (maximum) brightness for a movie mastering screen is 14 fl, which is 40 cd/m$^2$ in metric. There is currently debate about the correct digital cinema white point. For film projection, the white point has been defined by SMPTE (Society of Motion Picture and Television Engineers) as being 5400 degrees Kelvin color temperature with an asymmetric tolerance of +600 degrees and −400 degrees.

For television mastering reference, the television screen white level is specified to be 30 fl (85 cd/m$^2$), although 22 fl (63 cd/m$^2$) is the typical brightness used. Television mastering is still done mostly using a reference direct-view Cathode Ray Tube (CRT) display, usually about 30" (76 cm) in diagonal using a D65 correlated color temperature for white. Note that D65 is a daylight 6500 Kelvin equivalent, and has a defined spectrum. However, D65 is also defined as a "correlated color temperature" in terms of CIE 1931 xy chromaticity. It is this CIE 1931 xy chromaticity-dependent definition that is used to calibrate the reference white of digital television mastering displays.

It is common practice to adjust the red, green, and blue primary gains to achieve the desired white, as specified using CIE 1931 xy chromaticity. Thus, the "native white" of displays and projectors, with all gains at maximum, does not, in general, yield the intended white balance. Efficiency concerns for display and projectors attempt to optimize the red, green, and blue primary adjustments required for the white balance such that they are as near as possible to their maximum values. In practice, one or two of the three primaries will usually be between 80% and 90% of whichever primary is set at maximum.

Digital cinema masters are usually ignored when re-mastering for digital video, although there is no good reason that a proper transformation could not be defined which would directly yield digital video. The methods of the present invention yield such a proper transformation for most scenes.

One embodiment of the present invention uses (see below) a fourth primary (if there are four or more) as a broad-spectrum white. This is often beneficial to efficiency as well as being beneficial to color accuracy (as described below).

Aesthetic White Point

The aesthetic white point for a display or projection system can be different from the calibration white point. For example, the SMPTE DC-28 specification for white point for projector calibration for digital cinema defines a greenish white point, defined in terms of CIE 1931 xy chromaticity, to the green side of the daylight and black-body curves. However, the intent is that a mastering white near D60 be utilized. Further, there is discussion of allowing white points along the daylight curve in the range of D55 through D60 up to D65, all at full 14 fl (40 cd/m$^2$) brightness.

If the maximum projector or display brightness criteria are ignored, it is clearly possible to have a very wide range of "aesthetic" white points, independent of the calibration white points. Further, it would be useful to use a broad spectrum white (see discussion below) to provide the desired aesthetic white and gray, which will be less sensitive to the choice of color matching function, and therefore less dependent upon CIE 1931 xy chromaticity.

The human eye is highly adaptive to a wide range of white points. However, a "partial adaptation" mechanism of human vision will still have some approximate sense of the white point being used. This will be true of the cinematographer, the colorist, and the director. Thus, once an aesthetic white point is determined, it is useful to minimize drift in individual adaptation to the white point by providing a small region of reference white. One technique useful in conjunction with the present invention is to provide a small white border around an image, in the desired reference white, to help provide the white reference necessary for proper color adjustment. Note that "windows" borders on typical personal computers provide this function (since window boundaries typically provide a small white border around an image), although their white point is typically not adjustable. In addition to white, for dark scenes it will also be useful to utilize a darkened version of gray, having the same white color balance, to provide the neutral-gray color sense for the reference viewers. In this way, both white reference for bright scenes, as well as gray reference (at various brightnesses) can be present in the mastering room, preferably directly on the image, such as a small border, to provide a white balance/gray balance neutral visual reference. Thus, by maintaining this always-visible white or gray reference, a consistent relationship to the intended white balance/gray balance can be maintained.

Note that typical grays of 18% of peak white, and 10% of peak white, are commonly used as a neutral (having the intended white point) color reference.

Figure 6:
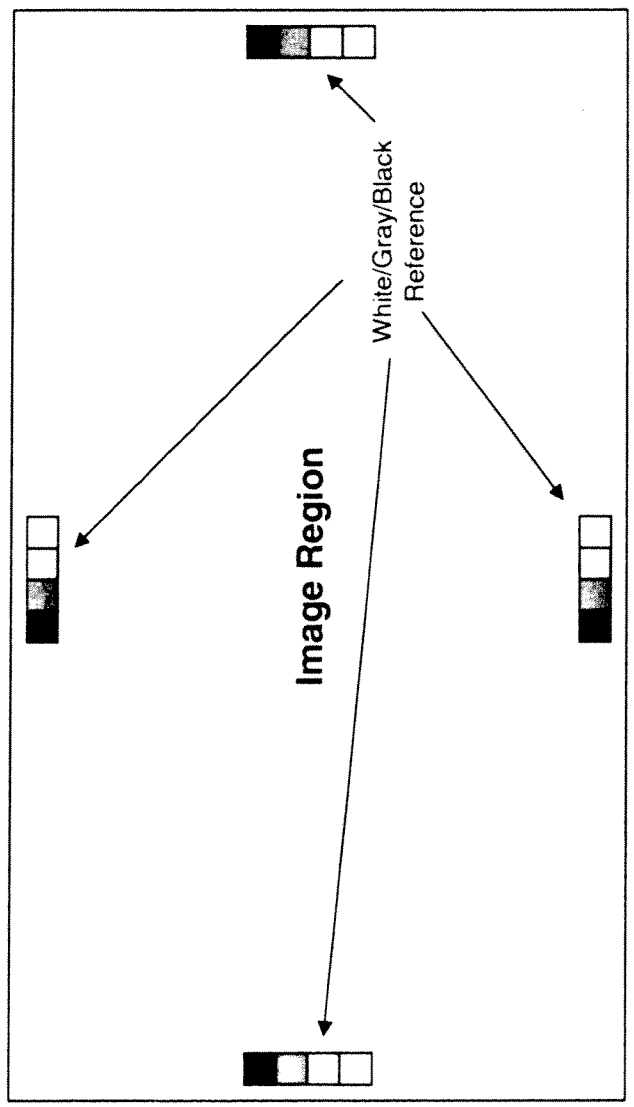
FIG. 6 is a diagram showing positions for black-to-white gray intensity ramps around an image, which provide a white, gray, and black reference simultaneously.

It may also be useful to have various black-to-white gray intensity ramps around an image, which provide a white, gray, and black reference simultaneously. If such ramps have a defined gamma or a logarithmic ramp function, they also help define the scene gamma, since the entire black-to-white range is given across the ramp. If several such ramps are provided on each edge (left, right, top, and bottom), it provides both a white balance as well as a reference for white, gray, and black, while mastering; an example of such an arrangement is shown in FIG. 6.

Note that when mastering in a darkened room, the absolute white sense is gradually lost via adaptation. For this reason, it is useful to have a small presence of reference white, at the proper white point, somewhere on the display or projection screen at all times. Since such a patch of white around the screen may interfere with the perception of the scene, it may also be useful to toggle the white patch (or gray or black-gray-white ramp) on and off during mastering, to both provide a reference as well as minimizing its interference with the aesthetics of mastering scenes of still or moving images.

It is also possible to provide dark gray walls with proper color, and/or a white reference of the correct white point color, which are not part of the projection screen. However, the spectra are likely to be different, and thus the choice of color matching functions would likely also be different. A wide angle set of color matching functions, such as CIE 1964 10-degree, or the 10-degree settings of CIE 170-1: 2006 (see discussion below) might be best, since off-screen white and gray reference colors are well outside the macular yellow pigment. Use of on-screen white and gray reference provides the same white and gray reference spectra as is used within the image.

Regional Characterization

It can be useful to measure and spectrally characterize a screen at various locations for any or all combinations of primaries (although the maximum of each primary separately and together (white) will provide a substantial portion of the necessary regional characterization). For example, most screens roll off in brightness near the edge; color and even spectra may regionally alter for each primary and for white; and gamma may alter regionally (and/or linear and/or non-linear light function of linear pixel values). The determined characterization may then be conveyed to a presentation system to adjust display colors in accordance with the present invention.

Some mastering projectors plus screens or displays attempt to correct for regional variations. In such cases, the remaining lack of achieved correction may still be conveyed.

A measure of the regional black can also be beneficial, although this may often best be done by inference (e.g., using 2% of white compared to 1% of white in each region, as described above).

The measured information can be conveyed or provided as regional weights, which are smoothly blended (e.g., using a 16 horizontally×8 vertically grid of rectangles). However, if the spectra is regionally altered, then the spectra for each such region can be conveyed or provided, and then blended via similar weights.

Regional Black

Most displays, and projectors with their associated screens, attempt to calibrate for uniform black. However, this is generally difficult in practice, since the ambient "black" of a display can vary regionally over the display, both in terms of brightness and spectra. Accordingly, it is useful to convey or otherwise provide a measurement of the regionally-varying black. This can be conveyed spectrally, or via a simplification such as a regional amount of a common spectrum or via a more comprehensive regionally-varying spectral representation. Such regionally-varying spectral representation can usually be conveyed adequately via spectrally-specified regions with smooth blending between them. For example, a 16 horizontal by 8 vertical rectangular representation of the black spectrum can be smoothly interpolated to yield the black spectral energy (corresponding to a zero pixel value) at every point on the screen or display.

Directionality Characterization

In addition to regional characterization, with some types of displays (such as liquid crystal displays) and some times of screens (such as high-gain screens) there are also directional characteristics. Such characteristics depend upon the angle of the screen to the viewer. Since the distance to the viewer affects the angle to various parts of the screen, the absolute distance to the screen is also usually a factor in directional characterization.

If there are multiple viewing locations, and the director sits in one seat, the cinematographer in another, and the colorist in another, any directional affects will potentially alter the image as seen by each person. It may be useful, if there is much directional affect, to identify the directional characteristics with respect to each key person who is present during mastering any given scene.

Directionality with LCD displays is significant, affecting and altering color, gamma (or pixel value function of linear light), and spectra, as well as altering secondary affects (like room spill amount). Directionality with high gain or silver-3D-polarization-preserving screens is also very significant. Thus, a measurement of the directional characteristics, especially with respect to key viewers during mastering and/or any given presentation, is potentially valuable in properly rendering accurate color.

Light Reflections on Projection Screens or Displays (Specular+Lambertian)

Light spilling from a room onto displays or projection screens is a combination of diffuse (lambertian) and reflective (specular) light scatter back onto the viewer(s).

Reflections of light areas of the room are a factor (e.g., an exit sign showing up in the upper left of the screen as a faint green reflection) affecting what is seen on the screen. With high gain projection screens, or with the reflective cover glass (or plastic) of display screens, room environment light can be directionally reflected, varying by region on the screen.

On high gain screens and on reflective displays, colored specular reflections of objects and lights in the room also form a factor. For example, a high gain silvered polarization-preserving screen (typically used for 3-D projection) will reflect a brightly-colored shirt or blouse at the reflection location (which is usually the equal-angle reflection, as in minors, but dispersed somewhat by the screen). Use of low gain (between 0.8 and 1.3) mastering screens and matte unreflective displays for mastering can help minimize such specular reflections.

Lambertian (smooth) light spill often occurs in both projection and display environments. One common mastering theatre has bright orange seats, for example, which spill orange light back onto the screen (further, the bottom of the screen receives more orange spill than the top). Someone wearing a brightly colored shirt or blouse (such as yellow or green) sitting in front of the projection screen or the display is also likely to spill any color light, including white, from the screen back onto the screen in their shirt's color.

Note that there may be changes over time, such as someone turning on a small desk lamp while mastering, even though the calibration was made with the desk lamp off.

Optimum viewing occurs when the environment is dark neutral gray or black, although most viewing environments are gray or beige in order to provide pleasant surroundings. Thus, room spill is a substantial issue. Note that room light spill back onto the screen is partially a function of who and what is in the room, and is also partly a function of what colors are on the screen, what their spectra is, and how bright they are. Such issues are also a function of where on the screen the light is being emitted, and where in the room, the bright colors (like the blouse or shirt) are located.

Note that such issues will also be a factor in home viewing, office viewing, and theater viewing.

Note that mastering and presentation display or projector+screen lambertian and specular light spill and reflections are generally ignored in current practice, but it is better to characterize them, and possibly attempt to remove them, if feasible.

Accordingly, it is best to control such issues by either including measurements of such changes as information about the mastering room, or by not allowing variations in the room lighting environment during mastering compared to when calibration of the room was measured. For example, wearing dark clothing while mastering is desirable.

Flare Correction

Most displays and projectors spill light from each pixel onto other regions of the screen, with most light being spilled into nearby pixels. The ratio of black to white is often specified in terms of "sequential" contrast, where an entire screen of black is followed by an entire screen of white, or alternatively by "simultaneous" contrast, where white and black checkerboard squares appear on the screen together. Typical sequential contrast is anywhere from 200:1 up to 2500:1, whereas simultaneous contrast is typically around 100:1. Thus, light spill from bright image areas onto adjacent dark image areas is significant.

The light spill concept is sometimes called "flare", and algorithms for "flare correction" attempt to correct for this localized regional light spill.

Lambertian diffuse light spill into a white room will illuminate the entire screen, whereas localized light spill due to glass reflections within a display screen will only spill onto nearby regions. Thus, any correction for flare must take into account the proportions of both localized (regional) and wide area light spill.

Mastering and presentation display or projector+screen flare is generally ignored in current practice, but it is better to characterize it, and possibly attempt to remove it, if feasible.

Note that flare correction can affect the pixels in the master if applied to the mastered pixels. Alternatively, a characterization of mastering display or projector flare can be sent with the image, such that the pixels are not "pre-processed" with flare correction. If the mastering display or projector has relatively low flare, characterizing the flare, but not correcting for it, is likely to be most useful. Upon presentation, if a given display's or projection screen's flare differs substantially from the flare present in the mastering room (such as being much greater), then it will often be desirable to attempt to reduce or remove the flare during such presentation using flare correction based upon the conveyed characterization of mastering room flare and measurement of the presentation room flare.

Screen-to-Room-to-Elsewhere-On-the-Screen

Light displayed on one portion of a screen affects other portions of the screen, For example, a bright white patch on a screen's upper right illuminates the middle with some amount and spectra, as well as the lower left, and upper left, and lower right, etc. This effect is generally ignored in current practice, but should not be. This is one of the components of flare, as well as being a component of lambertian (non-reflective) light spill. Accordingly, conveying a measurement of this effect for later use to correct a displayed image is useful.

Inter-Pixel Bright-Image Darkening Influence

Historically, with CRT's, often there was poor high voltage power supply regulation when large areas of high brightness were displayed, such that a particular pixel value would generate less light if large regions of the screen were bright. This affect is also active with some plasma displays, which use dedicated circuits to reduce overall brightness when large amounts of the screen are bright, in order to better preserve the life of the display unit.

This affect is generally ignored in current practice, and may usefully be ignored with some display technologies, such as DLP projectors and LCD direct-view displays, which do not exhibit this effect. However, with displays or projectors which have this issue, small patches of color, white, or gray on a dark surround can be used for making measurements of this effect. The affect of large areas of high brightness can then be modeled independently, and would not otherwise interfere with necessary measurements of spectral energy from various pixel values (inside small patches).

Ambient Surround During Mastering

In addition to light spill back onto a screen, the eye is influenced by the colors within the surrounding room. There will be influence from the color of walls, furniture, ceiling, etc., around the screen. The colors of walls behind or surrounding a screen may not result in light on the screen, but will provide light into the eye. While motion picture projection for mastering and exhibition intends use of a dark surround, television systems intend the use of a gray background during mastering (although background brightness and color varies widely in the home and office viewing environment). For example, there are television mastering specifications for image surround brightness and color which specify D65 correlated color temperature (i.e., using CIE 1931 chromaticity for D65) background at 10% of peak white as the standard for video mastering at 30 fl (although 22 fl is typical in practice).

If there is such a known ambient surround during mastering, its color can usefully be measured and conveyed along with other mastering specifications. The color and brightness are most useful when conveyed as spectral energy, but can also be usefully conveyed using luminance and chromaticity. Given that ambient surround will image well outside the macular yellow pigment, the use of CIE 1964 10-degree color matching functions, or the CIE170-1: 2006 cone fundamentals set at 10-degrees, are more appropriate than CIE 1931, which is based upon 2-degree color patch matching. Providing the spectral energy for the surround provides the most useful information. Given that the surround is likely to not be uniform, a measurement of regions (such as 16 regions surrounding the screen) will be more useful than an average surround result, although there are as yet no models for regional variations in surround color and brightness. A general model of a relatively constant surround does exist within some Color Appearance Models, but it is most often modeled using CIE 1931 luminance and chromaticity, or equivalently using CIE 1931 XYZ tristimulus values. As such color appearance models improve, it is likely that they can begin to take advantage of spectral energy and possibly regional variation information for the visible surround.

Concept of Mastering Beyond Available Gamut and/or Dynamic Range

It may be the intent for a master to create more saturated colors than are available on the mastering display or projection screen. It may further be the intent for the master to create brighter whites and brighter colors than are available on the mastering display or projection screen. Such intent can be conveyed with the master, and applied appropriately when the presentation projector or display provides for an extended color and brightness range.

Levels of Characterization

Levels of characterization apply not only to the mastering room, but to any presentation environment having a display or projector.

As described above, at the most basic level of characterization, just RGB values as a function of linear light and their spectra can be determined and conveyed.

A useful next level of characterization can add the spectrum energy of black.

A useful next level is to add regional functions of RGB values.

All of the characterizations and/or corrections of the transformation from pixel values to emitted light, such as flare correction or characterization, can be usefully added in logical steps, based upon the descriptions above.

Characterization Versus Correction

For some of the above issues, such as flare correction, such correction would either be applied or not applied during presentation on any given display or projector+ screen, based upon the flare properties of that display or projector+screen. Thus, for presentation, the use or absence of any given correction is all that utilizes the characterization of that device. The characterization for the presentation display or projector+screen serves no other purpose than as a means for correction.

However, for mastering, a characterization of the flare, which implies the means of flare correction, can be considered independently of whether flare correction is actually applied to pixel values or not. The useful cases are: (1) a characterization of the flare without applying any flare correction; this provides information about the inherent flare seen on the reference display or projection screen when the image was mastered; (2) a characterization and a correction for the flare, wherein the correction is not applied to the pixel values of the master, but is applied when the pixel values are sent to the mastering screen); and (3) a characterization and a correction for the flare, wherein the pixel values of the master have had the flare correction applied.

In the third case, it would be potentially useful to be able to invert the flare correction, in order to be able to recover the uncorrected pixels, as with the uncorrected form of the pixels used in the master for the second case. However, although some of the processes described above have practical inversions, a complex process such as flare correction may not be easily invertible.

Thus it is potentially useful to convey which of these cases of correction and/or characterization are applied with respect to each issue described above. Further, if a correction is present in the pixel data, it is potentially useful to convey the inverse process to yield uncorrected pixels, if such an inverse process is feasible to describe and implement. It may also sometimes be best to send both corrected and uncorrected pixels, which is the only way to convey both cases when the inversion process is impractical.

Generic Characterization

It is also likely to be useful for manufacturers of reference displays and projectors (or neutral third parties, such as standards groups and industry associations) to provide a full characterization for a generic model. A generic room must also be assumed. In the case of projectors, a generic screen must also be assumed. Alternatively, additional generic rooms (e.g., changes in ambient lighting) and projection screens (e.g., changes in screen gain) can be modeled. This data can be made available to anyone using that model of display or projector, in order to provide a more comprehensive characterization when only a minimal characterization is available for a specific model in a specific room, or in order to provide a characterization where a specific model is not characterized or where a specific room or screen is not characterized.

Certain common models of monitor and projector are known to be most popular for use in mastering. Certain facilities are also known to use certain models, and such information can be useful in conjunction with a generic characterization.

The use of generic characterization(s) according to model of display or projector can also be extended to end-user presentations, in addition to professional mastering environments. In end-user presentation, the manufacturer, or a neutral third party, can afford to perform a reasonably extensive characterization, or set of characterizations, even if the end unit price for the display or projector is low, such as when there are large volumes of units sold.

For historical television masters, certain models and brands of Cathode Ray Tube (CRT) were most common for PAL, SECAM, and NTSC color mastering during various decades. Certain mastering facilities were also known to have used certain models and brands during certain periods. The spectra of these models and brands can therefore be utilized, although allowance should be made for some variation in calibration. Thus, such generic calibrations may be useful, but should not be completely relied upon in all cases.

Simple Versus Cross-Color Characterization

The ideal characterization would have independent primaries (usually red, green, and blue, but optionally including additional primaries as described herein) wherein each primary would have a known mapping (such as a pure gamma or video gamma) to the linear amount of light emitted in each primary's corresponding spectrum. This has been true at photopic light levels with high-end digital projectors, but is unlikely to be true near black with any projector or display (due to the addition of the ambient room spectrum).

Many displays and projectors, and the graphics cards used to send pixels to such displays and projectors, perform processing having intentional cross terms and matrix processing. Sometimes the matrix multiply process is performed correctly on linear light pixel values, and sometimes the matrix multiply process is performed incorrectly using non-linear (e.g., gamma-adjusted) pixel values. Other processing, such as chroma resolution reduction horizontally and/or vertically (e.g., 4:2:2 or 4:2:0 UV reduction in YUV representations) may be applied, and it is common practice to apply the resolution reduction filters and matrix multiply process to non-linear pixel values. This process cannot be inverted, due to the U and V resolution reduction.

Further, matrix processing, even if performed correctly on linear pixel values, will usually cause an amount of a given primary (for example, red, from red, green, and blue), to weight some amount of one or more of the other primaries (for example, green and blue as a function of red). If such processes are defined, they can sometimes be properly inverted. If such processes are not defined, then a full cross-color characterization is needed (involving a 3-D cross-color lookup table with 3-D interpolation in the case of three primaries). Such a characterization will yield the spectrum emitted by each combination of red, green, and blue pixel values (and optionally more than three primaries). Such a cross-color characterization has long been used by the present inventor (beginning in the 1970's) to characterize camera negative film, reversal film, and print film for motion pictures and still images with red, green, and blue inputs and outputs.

In the present invention, however, each combination of high-order bits of all primaries is preferably used to look up an emission spectrum (instead of just red, green, and blue outputs). The interpolation of the low order bits will be applied to interpolate the spectrum. For example, if the spectrum is defined at a precision of 5 nm, 4 nm, 2 nm, or 1 nm, there will be 80, 100, 200, or 400 values, respectively, to interpolate, spanning the range of 380 nm to 780 nm (sometimes stopping at a reduced range of 390 nm to 730 nm). Each wavelength can be interpolated independently. Thus, the historical (since the 1970's) "cross-color" and "3-dimensional lookup and interpolation" concepts are seen as 3-primary to 3-primary processes (or N-primary to N-primary, if they were to have been extended to more than three primaries). However, the present invention requires that the high order bits of 3-primaries (or N primaries if more than three) be mapped to spectra, and that the spectra be 3-dimensionally (or N dimensionally) interpolated. Again, this can be done independently for each wavelength. A 3-dimensional cross-color lookup table and corresponding interpolation can be seen as a 3-wavelength degenerate case (albeit with wide-bands at those wavelengths) of this concept (remember that the visible spectrum is typically defined for every 1 nm, 2 nm, 4 nm, or 5 nm between 380 nm and 780 nm). Thus, in this example, an N-primary mapping to spectral emission energy will result in 80, 100, 200, or 400 values for 5 nm, 4 nm, 2 nm, or 1 nm, respectively.

Such a cross-color spectral characterization provides the necessary characterization for those displays and projectors+screens which cannot otherwise be cleanly defined in terms of independent spectral channels. Even for cleanly defined displays and projectors, such a characterization may be appropriate at low light levels in order to properly define the spectrum and amount of light emitted for dark pixel values. Using such a characterization, the spectrum of the display or projector+screen can be recreated. This characterization process can be applied to both mastering and presentation.

The spectral lookup table is usually implemented using an enumeration of all values of some number of high order bits (e.g., the high three, four, or five bits). If there are three primaries, then the table of spectra is a 3-D table. If there are "N" primaries, then the table of spectra will be "N" dimensional. The low order bits are usually interpolated using piece-wise linear interpolation, although smoother curves (such as a spline fit) may be needed if there are insufficient high order bits to provide for piecewise linearity (making sure that negative energy values are clipped to zero energy). An example might be three color primaries of red, green, and blue, plus broad-spectrum white, thus being four "primaries". If four high order bits are enumerated for all sixteen possible values, then the total size of the lookup table is four bits times four primaries=16 bits=65536 (i.e., 64 k) table entries, each having between 80 and 400 entries (for 5 nm to 1 nm spectral precision, respectively).

It is best to obtain a display or projector setting which minimizes, or practically eliminates (except for darkest black) the cross-primary spectral energy. With a defined mapping of pixel values to linear light for each primary, the spectrum of emitted light can be simply obtained by using the pixel's primary values to linearly weight the spectrum of each primary, and then summing the resulting weighted primary spectra. This greatly simplifies the determination of the emitted spectrum as a function of primary color pixel values.

If cross-primary terms cannot be disabled, then the next best situation would be to have a known inversion, which can be implemented by a straightforward set of mathematical steps. In the absence of a practical and defined inversion, however, a cross-primary characterization will usually be required.

A hybrid is also possible, where a cross-primary table and interpolation is used for the lowest portion of brightness, such as below 3% of peak display or projector+screen white. For example, using red, green, blue and broad spectrum white, with three high bits of zero for all four primaries, but all other bits one (for all four primaries), might yield 3% of peak display or projector+screen white, then the next three bits (below the high three bits of zero) can be enumerated in each of the primaries with 12-bits (being 3 bits times 4 primaries) and interpolated to yield the dark spectra (from 3% of peak white down to maximum black) as a function of red, green, blue and broad spectrum white pixel values (wherein each has high order 3 bits of zero).

Automating the Characterization of Displays and Projectors+Screens

As technology advances and costs of complex electro-optics drop, it will become feasible to place inexpensive spectral radiometers in cameras, projectors and/or displays. Even simple red, green, blue cameras, which are becoming very inexpensive, provide substantial color and dynamic range information (using their red, green, and blue sensing spectra). Such cameras, and eventually even spectral radiometers, can be used not only for imaging, but for calibrating cameras, projector+screens, and displays.

It is feasible to automate the process of reference projector or reference monitor characterization. For example, the automated process could be run every morning for a particular reference setup.

It is also feasible to automate the process for characterizing presentation monitors or projector+screens. Some calibration can be accomplished on the fly while the display or projector+screen operates, by examining the spectra being presented for various pixel values which are occurring.

It is also practical to automate the examination and correction for the ambient surround during viewing, and prior to viewing.

While running automated characterization processes, after operating a calibration camera on a variety of useful moving images for a few minutes, a completely characterization of the behavior of the display, monitor, or projector+screen can be obtained in accordance with the description herein, which can then be used to build an accurate color model for the display, monitor, or projector+screen.

This methodology can be applied for reference monitoring and/or projection, as well as for presentation viewing, display, and/or projection.

It is further possible to apply electronic computation and sensors to every display and projector+screen to improve color fidelity. Measurements of the display for a variety of useful pixel colors in various regions of the display, as well as measurements of the surround, can be made. More than three color channels can also become commonplace for many types of display and projection technologies as costs decline, such as by adding a clear segment to a red, green, blue color wheel (which is already done with computer business presentation projectors). Greater dynamic range and higher bit depths per pixel are also likely to gradually become economical over time. Higher resolution can become more available and more affordable. All this will lead to the need for the methodologies and systems of the present invention in order to build a scientific and engineering basis for fully using these new capabilities, and for providing improved accuracy and precision compared to today.

Optimizing Orthogonality

Orthogonality is defined as being a property of mathematical functions or matrices wherein most or all cross-terms are zero. The search for independent primaries, which can each weight independent spectra, is a type of orthogonality. Even if a device exhibits cross-terms between primaries, and can only be characterized by a full high-order lookup and interpolation, it is possible to process the data to determine if portions of the ranges of values of primaries are orthogonal (and thus have no cross-terms within those ranges). If all of the cross-terms within such sub-range can be eliminated, the elimination process is equivalent to computing a transformation to a diagonal matrix, (typically implemented using eigenvalues and eigenvectors) using matrix or functional algebra, wherein the terms of the diagonal matrix then become the weights of each primary. For the matrix approach, the analytical process for determining the diagonal matrix, if it exists, is a similar type of computational process to matrix inversion. There are numerous mathematical toolkits which have been developed for determining if all or part of a diagonal matrix exists. The primaries after such a transformation are then orthogonal, and each primary then becomes a member of a mathematical "basis set". (Note however, that the terms "spectrum" and "spectral radius" as used with eigensystems are not related in their meaning to light spectrum as used herein.)

Even partial orthogonality is beneficial. For example, a transformed red primary might be isolated such that it weights an unchanging spectrum, even though green and blue interact with each other's spectra via cross-terms. For another example, the red primary might be sufficiently independent above a dark value (for example, 5% of peak white) such that it can be used to weight an unchanging spectrum for values between that value (e.g., 5%) and 100% of peak white, yet the red must interact having cross terms with green and blue below that value (e.g., 5%).

Matrix processing wherein any regions of the matrix have zero values after transformation can help simplify subsequent processing, as well as help in characterization and understanding of the relationship between the primary values and between the primary values and the resulting emitted spectra. It may also be useful to have a small threshold, below which any given cross term is set to zero (and thus ignored).

Thus, if any significant portion of the range of values of any of one or more of the primaries can be isolated (possibly via transformation) to weight an unchanging (or minimally changing) spectrum, the range requiring 3-dimensional or N-dimensional spectral lookup and interpolation can be reduced (often very substantially reduced). Also, it is common for the spectral energy of color primaries to be limited to only a portion of the 380 nm to 780 nm range, with zero energy at other portions. For example, a blue primary may have positive energy between 380 nm and 570 nm, but zero energy between 570 nm and 780 nm. In such cases, spectral regions with no energy for one or more primaries can be utilized to simplify processing for those regions with respect to other primaries. Cross-color terms may therefore be zero for certain spectral ranges, and nonzero for others. Thus, if the spectrum is divided into ranges, each range may have more or less complexity when going from amounts of primaries to the resulting emission spectrum. For example, the range of spectrum between 380 nm and 570 nm may require 3-dimensional or N-dimensional cross-color lookup and interpolation, whereas the range between 570 nm and 780 nm may be accurately and precisely determined with a simple linear matrix or even via simple linearized primary weights of independent primary spectra. Thus, while conceptually the characterization may differ for every 1 nm of spectrum, in practice ranges of wavelengths may be significantly simplified by the possibility of complete or partial matrix diagonalization for such ranges.

Given that the result of a combination of amounts of primaries is a spectrum, the process of diagonalization must be applied to amounts of wavelengths of spectra. The spectra may not lend themselves to such diagonalization. In the limit, the diagonalization processing (if possible) can be applied independently to each wavelength (e.g., each 1 nm). If such diagonalization yields a common result for all wavelengths, then full simplification into independent primary amounts of spectra has been achieved. Similarly, regions of wavelengths can be simplified via full or partial diagonalization by having common diagonalization results over a range of wavelengths (e.g., 570 nm to 780 nm). The general case, however, may find slightly different diagonalization processes at every wavelength. In such a case, the complexity of the diagonalization processes should be weighed against the use of a 3-dimensional or N-dimensional high-order-bits lookup and interpolation.

The goal of all such processing is to find the simplest practical method by which a given combination of values of primaries can yield the corresponding spectral emission. Within the constraints of interpolation accuracy, the 3-dimensional or N-dimensional high-order-bits lookup and interpolation provides the resulting spectrum without requiring further simplification. Many common cases may require 3-dimensional or N-dimensional high-order-bits lookup and interpolation, unless both the mastering and presentation display or projector+screen can be greatly simplified, such as by being the linear sum of linear amounts of spectra of three or more primaries. However, there also commonly exist such simplified scenarios above black (e.g., between 2% of peak white and peak white). Which implementation methods to use must be chosen with knowledge of primary independence versus cross-primary-color spectral influences. Any implementation that can be practically implemented, with defined accuracy, can yield the resulting spectrum from a given combination of red, green, blue, and perhaps additional primaries.

Note that for digital displays and projectors, the search for orthogonality and diagonal matrix (or even the search for transformations yielding some zero matrix terms) is equivalent to the search for the inversion of any cross-term processing which may be applied (but may also be hidden) within a graphics card's and/or a display's or projector's internal processors. If any orthogonal primaries exist anywhere within the display or projector (even if hidden, undocumented and inaccessible), for all or part of their range, the diagonal matrix search will find them. The resulting transformation matrix (or function), if it exists for all or part of the range of primary values, will then accurately and precisely describe the forward and inverse cross-term processing (for that range of primary values).

Note that matrix diagonalization (full or partial) is a linear process, as are all matrix processes, and that any non-linearities within the processes inside the graphics card, display or projector will inhibit diagonalization. Thus, it is valuable to gain an understanding of how to correctly linearize any pixel values and their resulting relationship to linear light, whenever possible. Non-linear relationships will inhibit the degree to which partial or full diagonalization can be achieved (thus requiring the 3-dimensional or N-dimensional lookup and interpolation of spectra, which can be applied directly to lookup and interpolate using non-linear pixel values).

Interpolating Variations in Spectral Precision

If one spectral measurement has one precision, for example 2 nm, and a color matching function has a different precision, for example 5 nm, then they will need to be interpolated in order to be integrated together. The simplest approach is piecewise linearly interpolation. For example, the intervening four values to linearly interpolate 5 nm data to 1 nm data are obtained using weights of 0.2, 0.4, 0.6, and 0.8 and 0.8, 0.6, 0.4 and 0.2 applied to adjacent wavelength energies. For 2 nm interpolation to 1 nm, linear interpolation only requires that an equal average weight of 0.5 be used for each wavelength neighbor at 2 nm intervals. Once both spectral data are interpolated to 1 nm, they can be integrated together by multiplying them and then summing over all wavelengths.

A smoother interpolation can also be used. Various spline fits are commonly used to smoothly interpolate spectral data, including "official" CIE recommended practices; other published recommendations exist. Care should be taken to clip negative values (if any) to zero when using higher-order (beyond linear) interpolation methods.

It is simplest if all spectral emission data and all color matching functions are specified at a common wavelength precision. However, if variations in precision are anticipated, then the precision must be signaled or implicitly known by context.

Augmenting Uniformly-Sampled Wavelength Energy with Spectral Spike Energy

A typical spectral energy sampling interpolation filter is usually applied optically on a wavelength-selecting grating within many spectral radiometers. Such a filter is usually "triangular" in its intended shape (as a function of wavelength), but is often a shape mixture of triangular and Gaussian in practice. Such a filter will spread some the energy of a spectral spike into several nearby wavelengths, beyond the immediate neighbors. An improvement of the present invention is to identify spectral energy spikes within the spectrum, and then to remove some or all of their energy from the uniformly-sampled wavelength spectrum. A list of the remaining spikes, and their corresponding energy (at least the portion which was not removed from the uniformly-sampled wavelength spectrum) can augment the uniform-wavelength spectrum. For example, if there are wavelength spikes corresponding to mercury (in a mercury vapor lamp) at 405 nm, 436 nm, 546 nm, and 578 nm, these can be given in a list with the corresponding energy of each, in addition to the uniform-wavelength spectral energy. Note that the wavelengths of spectral emission spikes are often known with very high accuracy (to a tiny fraction of a nanometer).

With display and projector+screen emission spectra, large spectral energy spikes should be avoided. However, if spectral spikes are present, they can be conveyed more accurately and precisely by partially or completely separating their energy from the broad uniformly-sampled spectral energy.

The color matching function spectral weightings are usually smooth. Once these color matching functions are smoothly interpolated to any arbitrary fine wavelength precision, and/or to specific precise and accurate wavelengths, specific spectral spikes can then be integrated precisely and accurately. The resulting values can be summed into the integral obtained from the uniform-wavelength spectral energy (having some or all of the spike energy removed) to obtain increased accuracy when applying any color matching function (via integration) to this spike-augmented spectral energy.

Note that spectral radiometers typically have limited accuracy in their wavelength calibration, usually at about ±1 nm (although this accuracy varies per instrument type and model). Further, this calibration may vary over time and normal jostling of the spectral radiometer. Such a variation is most problematic relative to spectral spikes. Further, the specific interpolation function may not yield completely uniform energy in spectral radiometers as the wavelength calibration varies slightly, due to imperfections in the optical (and possibly also digital) spectral smoothing filter(s). Thus, the segregation of spectral spike energy, as described here, can significantly reduce errors in spectral energy readings from spectral radiometers.

Augmenting Mastered Spectra with True Scene Spectra

Some regions of some original scenes may have an approximately known spectrum, or a spectrum which can be defined by a few simple parameters. For example, if a region of an image is know to be portraying a pine-wood fire in the dark, the spectral emission energy of a pine-wood fire is approximately known, and can be identified for the region of the flames. A warm-fluorescent overhead light may have a defined spectrum, including mercury green spikes and other characteristic spectral spikes. A daylight sky may have a defined color temperature, e.g., D50, which can define the spectrum of a normal sky at that color temperature. Thus, it is possible to augment any region of any image with spectral identifications which can be used to create natural actual spectra in a precise way, thus avoiding any dependence upon the spectra of the primaries of the mastering display or projector+screen. Note that some such spectra, such as flames and fluorescent lights, will naturally have spectral spikes, which can be defined separately as described above.

In addition, the color matching functions which are used by key personnel to view the mastering display or projector+screen can define the brightness level and chroma and hue of any color, including a natural color. Using these color matching functions, parametric natural colors, such as daylight as a function of color temperature, can be applied at the proper parameter value to yield the proper color appearance on the mastering display or projector+screen as viewed by the key person(s). Thus, a region (e.g., sky or flames) would appear correct on the mastering display when integrated with the color matching functions for one or more key people, but the definition could alternatively reference actual spectra (such as sky at a particular color temperature, or flames in a given circumstance, etc.). In this way, one or more spectral alternatives can be provided in addition to the colors described using the spectrum being presented on the mastering display or projector+screen.

Additionally, or alternatively, regions of an image can be initialized to defined spectra (e.g., daylight or flames) and then color balanced using a simulated color adjustment filter to alter the balance of spectral energy at various wavelengths. If colors are adjusted in this manner for defined-spectra objects (reflective and/or glowing) in the scene, then the altered spectrum can then be conveyed for those regions. This altered spectrum (like a redder fire or a bluer sky) can be conveyed directly, or via the natural spectrum plus the simulated color adjustment filter transmission as a function of wavelength. This original-object-based spectrum (possibly adjusted via a simulated color filter) for one or more regions in the image optionally can be conveyed in addition to the spectrum energy emitted by the sum of primaries from the mastering display or projector+screen. The amounts of the emission primaries from the mastering display or projector+screen are required to define the shading and color variations of such regions which have defined spectral information as augmentation. In the absence of the normal pixels from the primaries, the entire spectrum for such augmented region would need to potentially be varied per pixel, which is likely to be impractical (although possible under some useful circumstances). A more practical approach which can often be used is a smooth variation of spectra via regional weighted variation. While this may not work for detailed rapidly moving objects such as flames, it can work well for smooth regions of an image such as a sky. The object or light spectral information from regions would typically represent augmentation information, augmenting pixels defined in the mastering primaries, for optional use during presentation. However, regional spectral definition can be useful as a sole definition of the color of a region in some useful cases.

If spectral radiometric measurements are available for objects, object surfaces, radiant objects (like fire), or light sources within the original scene, any such measured objects or lights can be processed in this way. Thus, the known original spectra can be adjusted as if the entire spectrum is filtered and modulated by appropriate amounts of mastered pixels (in the mastering primaries), and then the result resampled using appropriate color matching functions and the spectral emission of the primaries of the presentation display or projector+screen.

This technique can be used for improving the accuracy and precision of color (both surfaces and lights), in addition to, or alternatively to, providing means to portray scene colors in creative ways. Displays or projectors+screens with extended color range or brightness range or extra color primaries can also benefit from such extended definitions of color spectra.

Augmented Spectral Effects and Other Effects

Additional spectral effects can be handled in a similar manner by defining regions having such effects. For example, if a surface in the image has fluorescent properties, then the region of that surface can be defined in terms of the spectral energy of visible light that is emitted given an amount of incident ultra-violet light. In this way, day-glow colors, optically-brightened paper and cloth, and other visual affects can be recreated during presentation with a specified ultra-violet light amount and corresponding defined spectral fluorescence.

In three-dimensional stereoscopic image presentation, iridescence can be defined for a region (like butterfly wings), such that the colors and illumination for each eye differ and sparkle and fluoresce as they do in reality.

Other spectral interactions of surfaces and lights can be reproduced during presentation based upon defining a region, and specifying the rules for the emission spectrum from the region. The color matching functions can then be applied to the resulting spectrum and the emission spectrum from the display or projector+screen (using matrix inversion) to create the intended appearance and the intended visual color and brightness effects which cannot otherwise be created solely by transforming color primary spectra.

This technique can also be used for accuracy and precision of color for these special situations (both surfaces and lights), in addition to, or alternatively to, providing means to portray scene colors in creative ways. Displays or projectors+screens with extended color range or brightness range or extra color primaries can also benefit from such extended definitions of color spectral effects.

Some such effects need not alter spectra but may define extensions to dynamic range or other useful alterations. For example, a sparkling dress will be limited in the maximum brightness of the sparkles to the maximum brightness on the mastering display or projector+screen. However, it the region of the dress is defined as having sparkle flashes to a much higher brightness than is available on the mastering display or projector+screen, any presentation having a higher brightness capability can render the sparkles with more accurate bright flashes, even if the other scene brightnesses and colors are directly related to the pixel brightnesses used during mastering. In addition, some forms of sparkling material may be spectrally colorful, and may thus generate not only very bright flashes, but also very colorful flashes, which may extend beyond the maximum saturated color range of the mastering display or projector+screen. Such extended color brightness for pure saturated colors during the sparkle flashes can be extended on presentation displays or projectors+screens having such an extended color range for high brightness saturated colors. This extended presentation range is enabled by defining the region as having such extended color range, even if such bright pure saturated colors are not defined in the mastered pixels (due to limitations of bright pure saturated color range on the mastering display or projector+screen). The extended range of colors and brightnesses for a sparkling dress can be defined using additional information to guide the presentation, in addition to an outline defining the region. If the actual range of brightness information is known, it can be added, although it may also sometimes be useful to indicate that the sparkles should use the full range of the presentation display.

Note that displayed sparkles may have an expanded size (e.g., due to lens flare and halation) to cover a larger area than the size of the original sparkles. Alternatively, it may be desirable in some circumstances to intentionally expand the size of sparkles in order to emit more light (due to the larger area of white) for each sparkle. However, another option is to intentionally reduce the size of sparkles, so that they have a fully bright extended dynamic range color and brightness, but only in a single pixel, or other useful smaller (or larger) size than the original. This concept can be further extended when a mastered image is upsized and presented on a display having higher resolution than the master, such that the final display resolution is used for the single-pixel (or other reduced size) bright sparkles. The size of sparkles significantly affects their texture appearance, in addition to their brightness and color.

There are many such useful resolution-altering effects, color-altering effects, brightness-altering effects, contrast-altering effects, and other defined effects (like fluorescence) which can be applied to regions using extensions beyond the limits of pixel values within the mastering spectral range and beyond the mastering dynamic range.

Many useful types of such regionally-defined extensions can be added to the pixel values (which define amounts of the mastering spectral emission energy). The two primary uses of such augmentation are to allow increased precision and accuracy as well as to extend the scene presentation information beyond the range of the mastering display or projector+screen.

Extended Range Mastering with Deferred Print Emulation

Some cameras, such as the Thomson Viper Filmstream camera, provide wide-dynamic range information during original photography. While such information is likely to be interpreted (via color adjustment) and the dynamic range is likely to be collapsed (via film print emulation), the original extended dynamic range is available in the original wide-range pixel values. Such wide-range original values may be conveyed or provided for use. One way of conveying them is to specify color adjustments and print simulation during mastering for use in presentation, but to convey the actual original pixels. Another method useful in particular with the present invention is to use a transformation to linear light in a floating point numeric representation (retaining the wide dynamic range), using OpenExr 16-bit half-float values, with scale factors for color and exposure balance, and a definition of the non-linear print simulation to use for each presentation environment (there may be several, and/or adjustment guidance may be provided).

If such wide dynamic range master pixels are retained, together with their defined print simulation and color adjustments used with the mastering display or projector+screen, the mastered image can be recreated. Further, in alternative presentation environments, defined alterations to the print emulation can be utilized, as appropriate. For example, a wide dynamic range display capable of higher brightness for white and darker blacks compared to the mastering display or projector+screen can use more of the original dynamic range for presentation than was available during mastering. The presentation on a wide dynamic range display or projector+screen may also utilize a higher effective gamma, deeper blacks, and allow peak white highlights to go much higher above normal scene white.

The print emulator can also be sensitive to the presentation display's or projector+screen's color range (e.g., color gamut and maximum saturated color range), and the ambient surround, and other factors which affect appearance to optimize presentation. The bright saturated colors may be extended for such presentation without adding any saturation to normal colors (such as face colors, wood textures, wall paint, and other typically low saturation colors which usually require accuracy and precision). However, saturated colors on flowers in the same scene may be set to utilize the full color saturation range of the presentation display or projector+screen.

Such optimization can aim for accuracy and precision, or it may aim for maximum aesthetic affects, or a combination. Further, personal variations and adjustments may be allowed, possibly within defined ranges (or possibly disallowed). For example, some people like scenes presented in warmer (yellower) color temperatures (such as is seen under tungsten lighting), whereas other people like bluer scenes and bluer whites (cooler color temperatures). Some such preferences could be allowed, while others may be inhibited by the creators of the image or show since such alterations may interfere with the intended aesthetics (which may be intentionally discomforting to convey important mood themes, or which may be intentionally comforting, and should not therefore be subjected to alterations due to personal viewing preferences).

Some types of shows are likely to best use accurate and precise scene color (like sports) versus other types of shows which may emphasize stage sets and face makeup (usually for aesthetically pleasing appearance) and yet other modified (unnatural) appearance for storytelling and mood (sometimes aesthetically pleasing, and sometimes intentionally disturbing).

In addition to, or as an alternative to providing the wide range pixels and one or more static or parametric transformations (typically including print emulation), it is also possible to send the wide range pixels in addition to the pixels that have been mastered (usually with a print emulation) on the mastering display or projector+screen. The image created on the mastering display or projector+screen often has a reduced dynamic range compared to the original pixels, such as the pixels that come from a wide dynamic range digital camera (like the Thomson Viper Filmstream camera) or that come from a digital scan of camera negative film. However, digital video typically does not provide much extension of dynamic range within the original image versus the presented mastered image.

As an alternative to duplicating pixels for both wide range and mastered (i.e., narrow-range print-emulated) versions, it may also be useful to duplicate the pixels only for some frames of some scenes and/or regions within frames. Certain objects within certain scenes can benefit from wide dynamic original information, and other objects in other scenes cannot. Thus, the addition of selective frames or regions within frames having wide range pixels in addition to complete frames of mastered (narrow-range) pixels can provide all or nearly all of the useful information available in the wide range pixels (by providing the wide range pixels only when they are likely to be useful).

An alternative hybrid method is also useful wherein wide range pixel data together with one or more presentation transforms for presentation are conveyed (or stored) for most regions of frames and/or for most frames, but wherein duplicate pixels are sent otherwise. In this way, pixels can be conveyed in some regions and/or some frames without requiring transformations of wide range data.

Combinations and duplications of these various approaches are also likely to be useful for various purposes.

Spectral Information Available During Original Photography

Much of the practices of still photography and motion picture photography are based upon alterations in scene colors during photography. For example, makeup is used to not only smooth and even the appearance of the skin, but it is also often designed to photograph well. Cameras and films are nearly always trichromatic (although a cyan fourth primary and other extra primaries are sometimes used). Film's spectral sensitivity function, and the subsequent dye amounts, vary as a function of exposure level. Digital cameras, however, usually have a consistent spectral sensing function, and some cameras (like the Thomson Viper) can produce an output of the linear light levels seen in these spectra. It is rare, however, that the spectral sensing functions are linearly transformable into any color matching functions used for modeling human vision. The nearly ubiquitous alteration is that most cameras and films sense a deeper wavelength of red than does human vision. This results in artificially increased color saturation in some situations, but also results in substantial color hue alterations compared to vision.

Thus, it is useful to distinguish between photography as a creative and interpretive tool, intended to create an appearance not matching the scene being photographed, versus use of photography to accurately and precisely capture the colors of the image being photographed. There is also a middle ground, wherein the scene appearance during original photography is mostly as intended, but may be altered somewhat during mastering.

There are partial augmentations often available to the information contained in the trichromatic pixel values from cameras and digital film scans. For example, the type of lighting is usually known, such as 3100K Tungsten, Warm Fluorescent, Daylight at D55, etc. In the case of fluorescent light, the mercury green wavelength line will be present, and this knowledge can be useful when attempting to understand the appearance of colors in the scene. Also, the camera's spectral sensing functions may be known. Further, the scene may contain a view of the sky at a known color temperature (such as blue sky at D90, which is a 9000K equivalent having daylight spectrum).

Some matte (i.e., not shiny) objects may have known spectral reflectance, which can be used in conjunction with the lighting spectra to provide the spectrum seen for that object's surface.

Spectral Radiometry During Original Photography

A spectral radiometer can be used during original photography to measure the spectral emission of various important objects and surfaces within the scene. Such information can augment the pixel values from the camera in defining original color.

It is also possible to imagine a high resolution moving image camera that can capture the full spectral radiometry of every pixel in every frame, plus a low resolution spectral measurement of the surround. In this way, the full characterization of the scene in front of the camera, or of a display or projection screen (if such a camera is aimed at a display or projection screen), is continuously being captured for every pixel for every frame. However, given that such a camera is not currently practical, we can begin by considering steps in this direction. For example, lower resolution spectral radiometry, and slower frame rates, or measurements once per scene, can be used with present equipment. We can also begin by adding additional spectral bands, equivalent to addition color primaries, wherein numerous spectral bands would yield spectral radiometry in the limit, as the number of bands increases.

Figure 7:
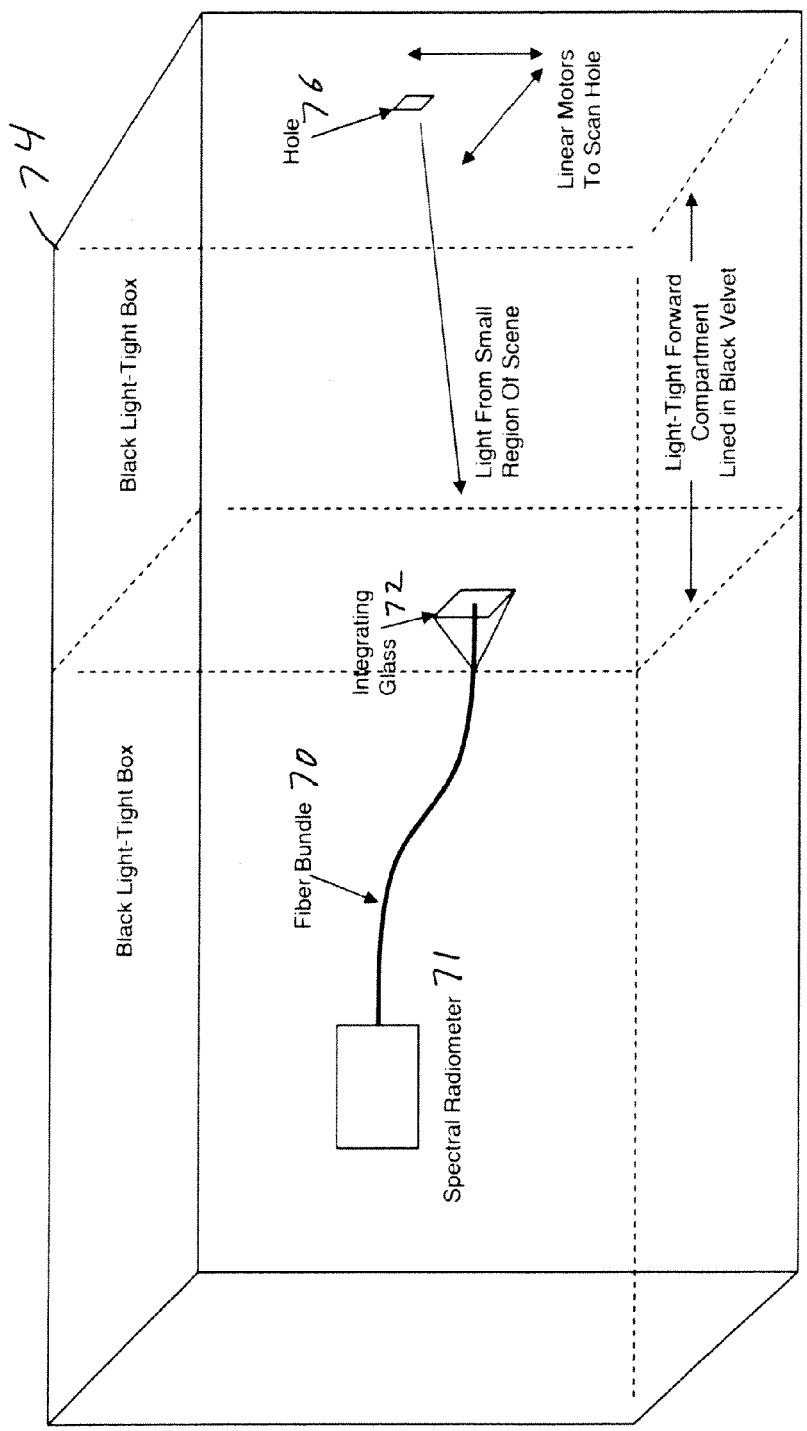
FIG. 7 is a diagram of one embodiment of a scanning spectral radiometer.

It is possible to adapt a spectral radiometer to make it into a practical scanning spectral radiometer. For example, FIG. 7 is a diagram of one embodiment of a scanning spectral radiometer. A spectrally-neutral (or one accurately characterized for spectral transmission) fiber-optic bundle 70, coupled to a spectral radiometer 71 and to a diffuse light integrator (such as a frosted and/or milky glass, also spectrally neutral or characterized accurately for spectral transmission) 72, can be used to create the sensing position within a black light-tight box 74 (for example, a box lined in black velvet or the like). A small square hole 76 can then be placed at some defined distance from the sensing position defined by the integrating glass 72. The size of the square hole 76, the size of the integrating glass 72, and the distance between them, define the size of a "pixel" in the scanning spectral radiometer. The square hole 76 can be moved via linear actuators to scan across and down a scene (i.e., to scan as would pixels in a camera).

On a fast spectral radiometer, such as one capable of measuring a normal brightness scene in less than a second, an example scan size of 128 pixels, configured as 16×8 pixels, can be scanned in about two minutes. If the "pixel" is two degrees (a common size for spectral radiometers using lenses to focus on a spot), then the 16×8 pixels will span 32 degrees by 16 degrees. The scene or set used during original photography can be scanned by such a scanning spectral radiometer.

The amount of data in 128 spectral samples is negligible compared to pixel data from still and moving image digital cameras. Such spectral data can be considered as being a type of "meta-data" (which just means data that describes the scene being photographed).

Alternate configurations can be designed using lens elements and other scanning mechanisms. For example, scanning could move the fiber bundle 70 and integrating glass 72. Another configuration might use rotating mirrors or other common mechanisms which are used for optically scanning an image.

Extending this design, a fast high resolution scanning spectral radiometer based upon this or other pixel scanning concepts can be created which could capture higher resolution at faster speeds. Further, it is possible to design such a scanning spectral radiometer to fit right into the still or moving image camera, such that a reduced resolution version of the image can be continuously captured, at a reduced frame rate, during original photography.

Several spectral scanning frames per second at tens of thousands of pixels in resolution is still practical to convey. Further, there is significant coherence in the spectral pixels, in that they will be regionally and temporally similar to each other, in the same way that normal (usually trichromatic) pixel values are regionally and temporally similar to each other. Thus, digital image compression can be usefully applied to spectral scan data pixels, as it is to normal (usually trichromatic) pixels.

Note that spectral radiometry scans can extend beyond the visible wavelength range between 380 nm to 780 nm, and can potentially also see ultraviolet (near and optionally far) and infrared (near and optionally far). Such extra non-visible spectral energy has a variety of potential uses, including helping to understand fluorescence as well as to help identify and define the materials and paints in the scenes (some materials can be identified by their spectral signature).

Spectral radiometry scans can also be aimed at light sources within the scene, or be used with a fish-eye lens, or by taking multiple views via different viewing locations and/or different viewing aims. A spatial spectral radiometric map can be made of all or part of the entire original scene at the time of original photography. Note that a lighting sphere is sometimes used on movie sets to photograph a lambertian (i.e., matte and diffuse) map of illumination, a specular (i.e., shiny) map of illumination, and a reflective (i.e., mirror sphere) view of the illumination environment in the center of (or at other locations within) the scene. As an alternative or in addition, a panoramic photograph from the location can be made of the environment (with particular interest in the lighting environment). These illumination maps have been used in conjunction with wide-range image capture to help re-light synthetic computer-generated simulated portions of the scene such that they match the photographed portions (these combined scenes are called Computer Generated Image, or CGI, composites). The present invention extends all of these concepts to the use of spectral radiometric pixel scans, such that not only illumination levels of the environment can be estimated, but the spectra of all illuminants can also be gained in the context of the scene environment. Such light spectra can augment a basic knowledge of directional and diffuse ambient light location and/or direction (which can usually be inferred from the ball measurements) for use in understanding the spectra of objects within the scene. Any spectrally-neutral gray object, for example, will usually reproduce the sum of the spectra of the illuminating light sources. As another example, a round ball covered with fluorescent paint will fluoresce on its right side if there is a significant amount of ultra-violet light coming from one or more light sources on the right side of the scene.

Adaptive Spectral Mappings

The spectral mappings used for color matching functions, and the resulting color, can be varied adaptively to the circumstances of presentation and mastering in numerous ways, as follows:

The spectral and color mapping can be a function of pixel value, pixel hue and saturation, etc.

The spectral and color mapping can vary regionally within the image frame.

The spectral and color mapping can be specified to be a function of extra data (like bit planes), which function can also optionally adapt to viewers and the viewing environment and the presentation display or projector+ screen. Thus, the spectral and color mapping can be a function of the presentation device, and the presentation environment (e.g., ambient light and ambient room color).

The spectral and color mapping can be a function of a single specific viewer, or a group of specific viewers (even a color-deficient viewer or viewers).

The spectral and color mapping can be a function of world-regional preference. For example, some cultures like more saturated colors, including face skin tones, other cultures like colors less saturated, or like face tones to be more pink, or more salmon, or more gray (for example). This is reflected in the color processing preferences of national television systems (and the associated electronic cameras, camera settings, and telecine systems, and telecine adjustments), where the television preferences of some nations use more saturated colors, and some use less saturated colors, or different hues for face skin tones, than the television preferences of other nations.

The spectral and color mapping can be a function of preferred color temperature for white (which may optionally also a function of the color temperature of neutral in the ambient surround).

The spectral and color mapping can be a function of the size of the screen (either absolute, visual angle, or both).

The spectral and color mapping can be a function of image presentation brightness level.

The spectral and color mapping can be a function of the size of relatively-constant color regions (see histogram and reduced-resolution methods described below).

The spectral and color mapping can be a function of the distance away from the screen as well as of the intended center of view (e.g., centering in the middle of the face of a speaking person in a movie). Further, a likelihood that the eye will wander the scene (a characteristic of some scenes and not others) can also be considered.

Combinations of the above.

These concepts can be integrated into an overall conceptual and practical framework for mastering and presenting accurate and precise color.

System and Method Overview

Figure 8A:
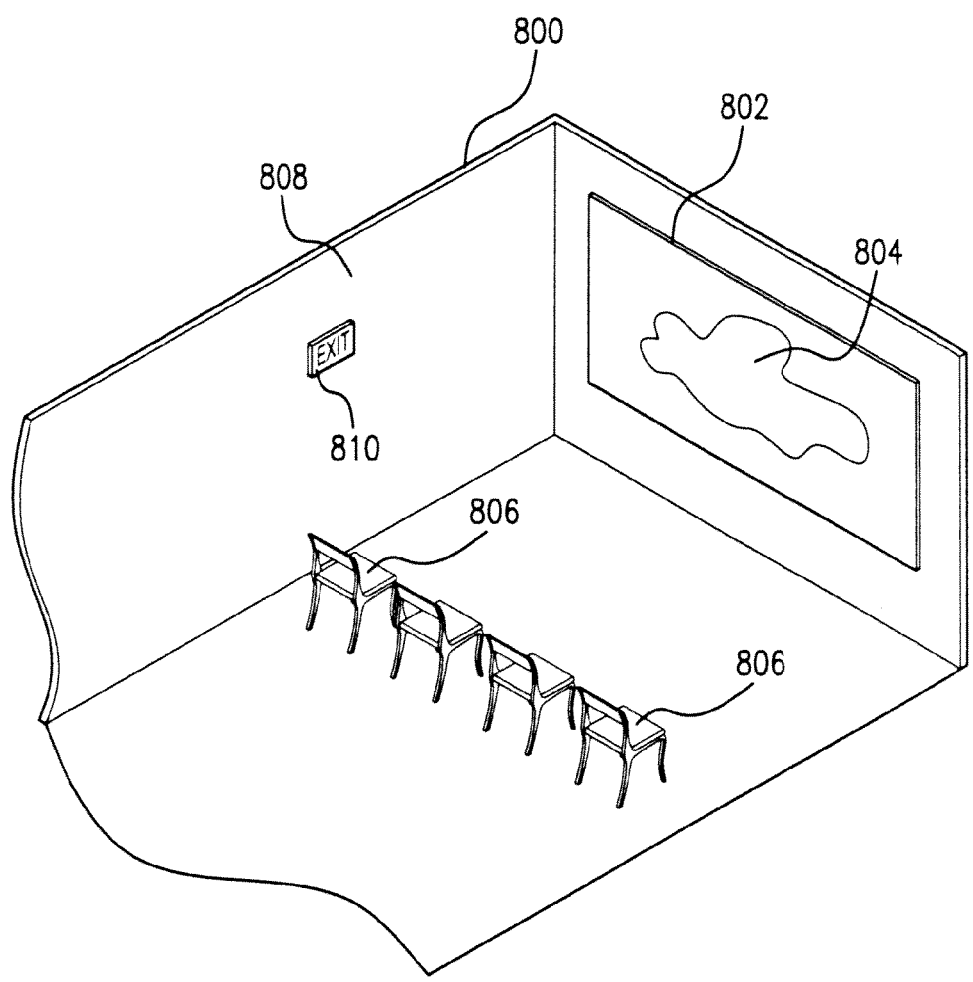
FIGS. 8A-C are a diagram showing an overview of the system and method of the present invention.
Figure 8B:
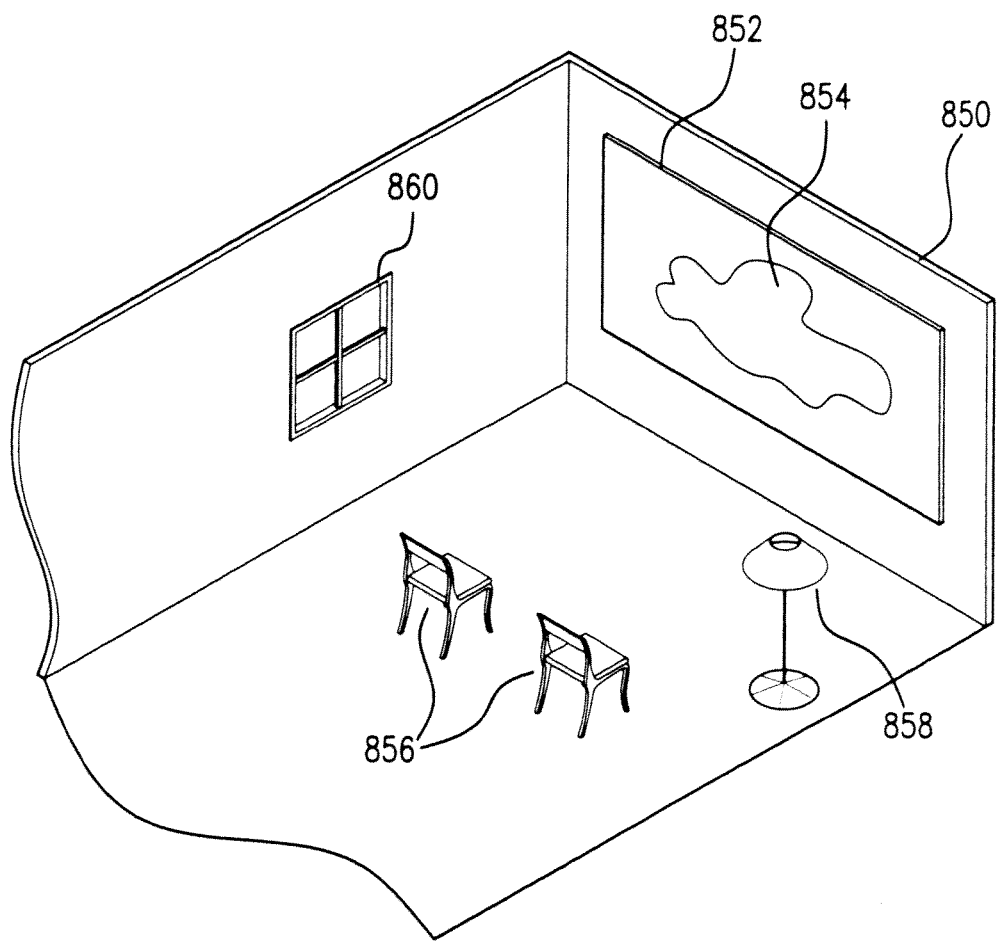
Figure 8C:
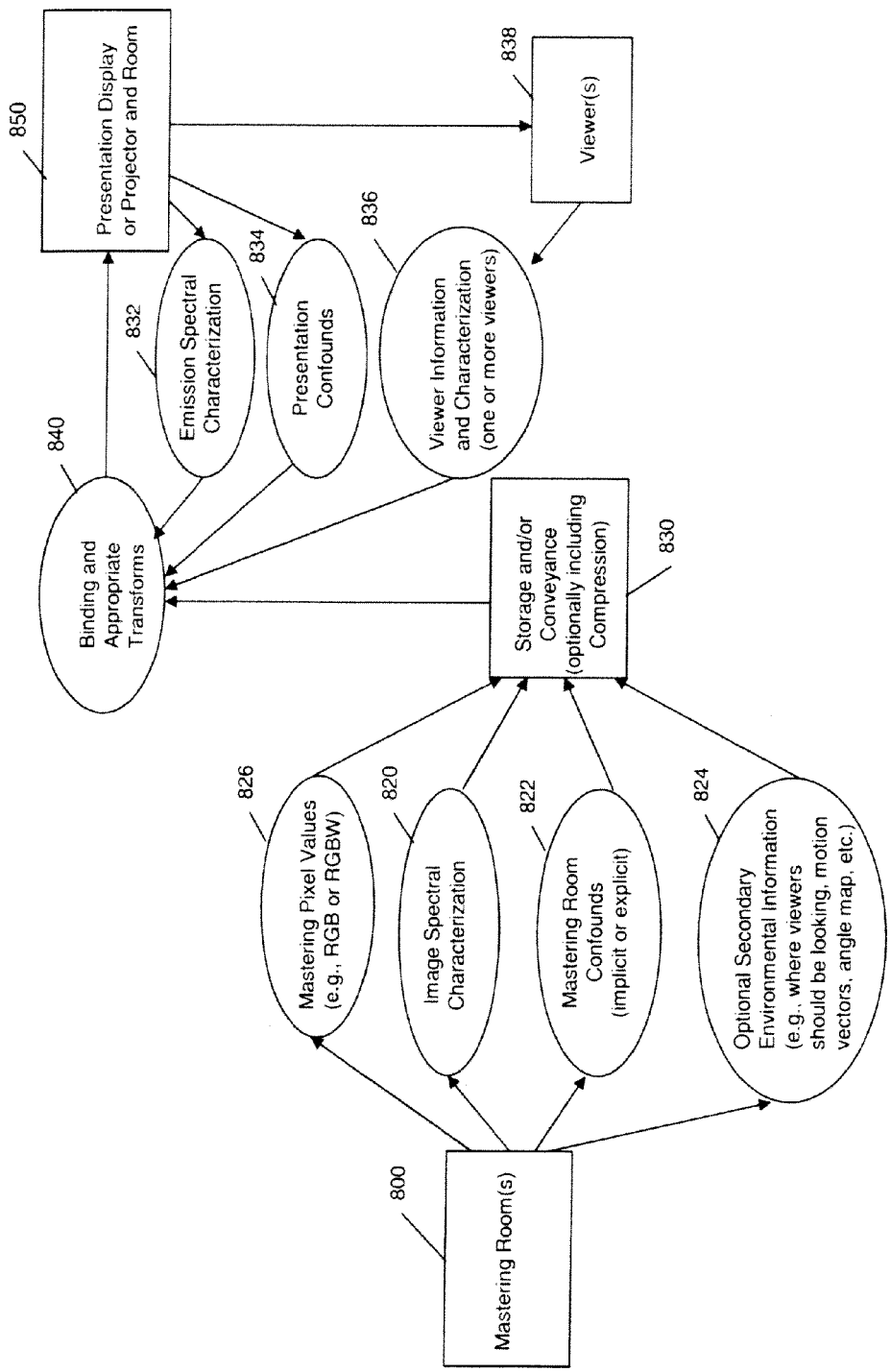

An overview of the system and method of the present invention is shown in FIGS. 8A-C. FIG. 8A shows an example of a mastering room 800 with a viewing screen 802 on which an image (an arbitrary shape, in this example) 804 is projected. Viewers within the room 800 may be seated at different positions 806 at different angles to the screen 802. A number of different mastering room characteristics will affect the display and perception of color on the viewing screen 802. For example, there may be red seats 806 or walls 808 in the mastering room, and light scattered back from such surfaces will affect the colors on the screen. The contrast range of the displayed image 804 may also be affected due to the presence of large bright areas on the screen, resulting in light scattered back onto the screen 802 from the room. There may also be light spill coming from the projector lens or reflections from the projector booth window glass (not shown), or from other sources, such as an "EXIT" sign 810 in the room 800.

FIG. 8C is a diagram showing the types and flow of data for accurate and precise reproduction of color in accordance with the present invention. The spectral characteristics 820 of the image 804 as displayed on the mastering room viewing screen 802 are measured and the spectral and/or contrast confounds 822 are either measured (explicit) or determined (implicit, such as by measuring these characteristics once for the room environment, and then assuming them to remain approximately constant, or by knowing characteristics of the materials or configuration of the room). In addition, optional "secondary" environmental information 824 may be measured or determined, such as a knowledge of where a person is being directed to be looking at the screen 802, the size of the screen in their field of view, each viewer's macular size and shape (or an average size and shape over a given population), an angle map, and motion vectors (see the discussion of Eye Tracking and Viewing Center Processing below). The mastering pixel values (e.g., RGB or RGBW) 826 for the displayed image 804, along with the corresponding spectral characteristics 820 and confounds 822 of the image and any optional secondary environmental information 824, may be stored (e.g., on film, tape or disk) or conveyed (e.g., by digital transmission), in original or compressed form, as color image information 830.

To sum up, this aspect of the invention for the accurate and precise reproduction of color comprises measuring or determining the spectral characteristics 820 of the displayed mastering room image, measuring or determining the spectral and/or contrast confounds 822 of the mastering room, optionally measuring or determining secondary scene information 824, and conveying or storing the color pixel values 826 representing the image plus the spectral characteristics of the image, the spectral and/or contrast confounds of the mastering room, and any optional secondary scene information. In one embodiment, the spectral characteristics of the image 820, the spectral and/or contrast confounds 822 of the mastering room 800, and any optional secondary scene information 824 are represented as a spectral map, with map frames corresponding to one or more image frames. Alternatively, each "class" of characteristics may be kept as separate data sets or mappings, so that they may be selectively applied or omitted.

FIG. 8B shows an example of a presentation room 850 with a viewing screen 852, such as a CRT or flat panel display or a projector and screen combination, on which the image (an arbitrary shape, in this example) 854 from the mastering room source is displayed or projected. Viewers within the presentation room 850 may be seated at different positions 856 at different angles to the screen 852. In addition, the ambient environment may have characteristics that affect the displayed image, such as extraneous lights 858 or windows 860 (e.g., in a home setting), or the room color and size (e.g., in a theater).

Again referring to FIG. 8C, in accordance with the teachings of this invention, the presentation spectral characteristics 832 of the image 854 as displayed on the presentation viewing screen 852 are measured or determined, and the spectral and/or contrast confounds 834 of the presentation room 850 are either measured or determined. In addition, optional "secondary" environmental information 836 may be measured or determined, such as a knowledge of the viewing characteristics and/or preferences of the viewers 838, the size of the screen in their field of view, each person's macular size and shape (or an average size and shape over a given population), angle of view with respect to the screen 852, etc. In one embodiment, the spectral characteristics of the presentation image 832, the spectral and/or contrast confounds 834 of the presentation room 850, and any optional secondary scene information 836 are represented as a spectral map, with map frames corresponding to one or more image frames. Alternatively, each "class" of characteristics may be kept as separate data sets or mappings, so that they may be selectively applied or omitted.

The presentation spectral characteristics 832 of the image 854 as displayed on the presentation viewing screen 852, the spectral and/or contrast confounds 834 of the presentation environment, and any optional secondary environmental information 836 may then be combined 840 with the conveyed (or replayed, from a stored form) color image information 830, comprising Mastering pixel values and the corresponding spectral characteristics and confounds of the image and the optional scene information, through appropriate color transforms. The transforms (discussed below) modify the color representation (i.e., the primaries) of the conveyed image to account for the measured and determined characteristics of both the mastering room 800 environment (including viewers) and the presentation room 850 environment (including viewers 838) to more accurately and precisely convey the original, intended colors of the mastering room image 804 to the particular viewers of the displayed image 854 in the presentation room 850.

In essence, each display primary color is transformed (such as by linear or non-linear weighting) by application of the mastering room spectral and/or environmental information (such as in the form of a spectral map) and the presentation room spectral and/or environmental information (such as in the form of a spectral map). In some cases, presentation room spectral and/or environmental information may not be available or not used, and thus the transform will be based on the mastering room spectral and/or environmental information conveyed or stored with the image pixel data as a self-contained spectral mapping. Conversely, in some cases, mastering spectral and/or environmental information may not be fully available or not used, and thus the transform may be based solely or primarily on the presentation room spectral and/or environmental information. For example, even if mastering room spectral and/or environmental information is unavailable, it may be useful to transform the image pixel values to particular adjusted color values based on such presentation room factors as viewer age (to take into account variance of color perception with age), viewing center (the portion of the image intended to be of most visual interest), color of the viewers' macula, and the size of the presentation image.

By deferring the binding and mapping of color representation onto a presentation device until actual use of such color representation, presentation-device independence is achieved without the need of a device-independent intermediate representation.

Generalization of how a Color Gamut Relates to Spectral Mapping

The concept of a "color gamut" implies the use of a single set of color matching functions. For example, the CIE 1931 chromaticity color gamut of a trichromatic RGB system is defined by the triangle connecting the chromaticity coordinates of each of the three primaries. Colors are considered "out of gamut" if they lie outside of the triangle (for trichromatic linear systems) defined by the chromaticities of the primaries. However, the gamut as defined according to CIE 1931 2 degree chromaticity differs from the gamut defined according to the CIE 1964 10 degree chromaticity, since the x_bar2, y_bar2, z_bar2 color matching functions of CIE 1931 differ significantly from the x_bar10, y_bar10, z_bar10 color matching functions of CIE 1964. Further, the CIE 170-1:2006 modified colorimetric observer provides cone fundamentals to serve as spectral mappings for color matching functions, but the spectra of these cone fundamentals are a continuous function of viewer age (in the range 20 yrs to 80 yrs) and angular width of the color being viewed (in the range 1 deg to 10 deg).

Thus, color gamut, as a concept based upon chromaticity, cannot be easily generalized for use with the present invention, since the present invention generalizes the use of spectral mapping functions for use in color matching for presentation.

In practice, a conversion of one color based upon a set of color primaries R1, G1, B1, each primary having an emission spectra, into a similar color based upon another set of color primaries, say R2, G2, B2, each having a differing spectra from R1, G1, B1 respectively, involves a matrix transformation using integration of the emission energy spectra with the spectral mappings of the color matching function(s) being utilized for the transformation. The resulting values of each pixel in terms of color primaries R2, G2, and B2 are "out of gamut" when any one or more of their values (the amounts of R2, G2, B2, and/or other primaries, if more than three) goes negative. This concept for the limits of gamut is not based upon chromaticity coordinates, and does not require a single set of tri-chromatic color matching functions (e.g., it does not require CIE 1931 x_bar, y_bar, z_bar). The color matching function at every pixel may differ in the transformation between pixel colors using R1, G1, B1, and pixel colors using R2, G2, B2. The gamut limit can be defined independently as the range of positive values for the amount of each primary for each pixel, even if each pixel utilizes a different set of color matching spectral functions.

It is often easiest to clip to the gamut by clipping negative R, G, B, (and/or other primary values if more than three) to 0.0, such that all values are 0.0 or above. However, a "soft clip" is also feasible, wherein the other primaries (two or more) may be altered when one or more of the amounts of primaries nears 0.0. Thus, the slope of change of the one or more primaries, as they near zero, gradually smoothly moves toward zero as the pixel's color nears the gamut limit. Simultaneously, the other primaries can smoothly move toward their gamut limited values (usually a pure color, whether dark or light). The soft clip can be controlled by the smallest primary (nearing zero) being lifted artificially in proportion to the amounts of the largest one or more primaries, as well as in proportion to the color purity (spectral narrowness) of those one or more primaries.

Thus, whether hard-clipped to zero, or soft-clipped smoothly to zero, the use of zero for one or more primaries is the most useful concept in the present invention to define the concept of the limits of color gamut.

Hue and Saturation, LAB, and LUV Beyond CIE 1931

As with gamut, systems for hue and saturation, based either on LAB or LUV, also cannot be generalized, since both LAB and LUV are defined in terms of CIE 1931 XYZ and/or chromaticity (xy). Basing LAB or LUV on CIE 1964 does not provide much useful extension, since CIE 1931 and CIE 1964 only represent two possible spectral mapping functions out of many useful such spectral mapping functions, for example, as defined in continuous functions of age and viewing angle by CIE 170-1:2006.

Thus, a better concept for hue and saturation for use with the present invention is to define the ratios of one or more larger primaries to one or more smaller primaries. Consider again the trichromatic example of R2, G2, B2 spectral emission primaries, which could utilize a varying color spectral mapping function when transforming from R1, G1, B1 spectral emission primaries. The resulting R2, G2, and B2 may be evaluated with respect to each other, to form a variety of ratios, such as R2/G2, R2/B2, R2/(G2+B2), R2/(R2+G2+B2), (R2+G2)/(R2+G2+B2). Such ratios and others can be useful in determining both hue and color saturation. Also, a variety of maximum and minimum functions and their ratios, such as Max(R2,G2,B2), combined with Max(R2,G2,B2) divided by Min(R2,G2,B2), can be useful in indicating color saturation and hue. Such formulae can also be generalized to more than three primaries. Such formulae yield useful measures of hue and color saturation which are independent of color matching functions (i.e., not dependent upon CIE 1931 nor CIE 1964). Note that broad spectrum white and gray primaries will be truncated differently, as will wide versus narrow color primaries when there are more than three primaries.

Another approach is to utilize a generalization of the types of hue and saturation systems which are based upon LAB and LUV and CIE 1931, by utilizing a generalization of spectral color matching functions, such as CIE 170-1:2006, which is a function of age and viewing angle. In this way, each pixel, or each region within a frame, and/or each sequence of frames, can potentially have an independent set of color matching functions. The hue and saturation for a given pixel, or region of pixels, can then be determined with respect to their spectral color matching functions. For example, the white point spectrum of tungsten light at 3200K is well known, as is the white point spectral definition of D50, D55, D60, and D65 (not the correlated color temperature definition which is based upon CIE 1931 color matching functions). These spectra can define a white point for any spectral color matching functions by integrating those spectral color matching functions with these one or more white point spectra. Hue can then be defined as a direction from that white point in the chromaticity space defined by each such spectral color matching function, for any such spectral color matching function, and saturation can be defined as a distance from that white point. This need only be three dimensional, since the adaptive color spectral matching functions, such as those defined in CIE 170-1: 2006, although variable with respect to age and viewing angle, are still three channels (long, medium, and short) for any given age and viewing angle. Further generalizations of the spectral color mapping functions, beyond CIE 170-1: 2006, for example to adapt to specific individuals, can also be utilized. This concept can also be generalized to more than three primaries, including maximizing the broad-spectrum white (or gray) primary for the white point.

Note that scotopic vision, using the "rods" in the eye, does not convey color information, and thus may form a gradual desaturating factor at ever lowering light levels. However, the use of this information differs between mastering and presentation. During mastering, low light levels will be perceived as desaturated for a given spectra (usually composed of the sum of the spectra from three or more primaries). During presentation, the color saturation may be artificially altered in the mesopic region to increase or decrease saturation to adjust for different viewers, different displays or projectors, different overall scene brightness on such displays or projectors, and/or differences in ambient lighting surround. Such alteration may attempt to recreate accurate color saturation (presented and/or perceived), or alternatively may be used to intentionally increase or decrease saturation with respect to that perceived during mastering (e.g., for a person who perceives low brightness as having less color saturation than perceived by average viewers of their age).

Note also that negative amounts of primaries (three or more) can be preserved with various numeric representations, such as 32-bit floating point, or signed integers, or OpenExr 16-bit half float data. Any intermediate process which uses signed pixel values for primaries can retain negative values to preserve out-of-gamut colors. However, final presentation cannot make use of negative amounts of light via negative amounts of primaries. An altered representation of the final presentation, by altering the ambient surround color, and/or by altering the white point of the presentation, may be able to bring negative values up to zero or to positive values.

Of course, altering the spectra of the three or more primaries, and/or altering the color matching spectral functions being utilized for a given pixel (or for a given frame or region within a frame) can affect whether the amounts of each one or more of the primaries will remain positive, or whether one or more would become negative.

Wavelength Precision of Spectral Color Matching Functions

Many color matching systems, such as CIE 1931 2 degree, CIE 1964 10 degree, and CIE 170-1:2006, are defined at 5 nm intervals. The actual data for CIE 1964 10 degree and CIE 170-1:2006 is the 1959 Stiles and Burch 10 degree data using 49 viewers, which is based upon wavenumber, which is a measure of spectral color represented as frequency, which is the inverse of wavelength. The 5 nm data for all of these color matching systems are interpolated from the original wavenumber data, since uniform wavenumbers are different from uniform wavelengths. Data interpolated to 1 nm, and even 0.1 nm, is available. However, there are various common interpolation algorithms to smooth and interpolate the data. A smooth spline fit seems to be the most common method of interpolating between wavelengths. It is likely that data at 1 nm, or perhaps even finer, will eventually be needed. At present, much original spectral color matching function data is only available at 5 nm, and even that is often not justified by the original samples (such as the even sparser wavenumber data upon which CIE 1931 is based).

Given that spectral radiometers often provide their data in 1 nm, 2 nm, and 4 nm intervals, and that color matching functions are often specified in 5 nm intervals, the common precision at present is 1 nm. Thus, by interpolating all spectral emission and matching function data to 1 nm, integrals can be easily computed (via discrete integrals using the sum of multiplications) for use in spectral color matching conversions.

For example, 5 nm color matching data, such as CIE 170-1:2006 data, can be spline-interpolated to 1 nm, and 4 nm spectral radiometric data can be spline interpolated to 1 nm. The resulting pair of 1 nm values can be multiplied, and the results summed over all wavelengths between 380 nm and 780 nm to yield the required scalar values for use in linear color matrix transformations. These matrix transformations, which are linear operators, can then be applied to amounts of primaries expressed in linear light (usually best expressed in floating point) in the form of a matrix (which will be 3×3 if trichromatic, such as RGB).

Non-Unique Mappings to More than Three Primaries

More than three primaries can offer an increased range of colors (called a color gamut using specific color matching functions such as CIE 1931 x_bar y_bar z_bar). Within the range of colors available for any three primaries of such a gamut, however, there are many possible combinations of the four or more primaries which can result in a given color according to any given set of color matching functions (e.g., for CIE 1931, for CIE 1964, or for any of the range of color matching functions available using CIE 170-1:2006).

A key principle of the present invention is that broad spectrum emitters should be maximized whenever they are available. This principle, combined with the appropriate set of color matching functions, allows a unique optimization of four or more primaries.

If there is a fourth primary, it is recommended that the fourth primary be a broad-spectrum white for mastering, presentation, or both.

Figure 9:
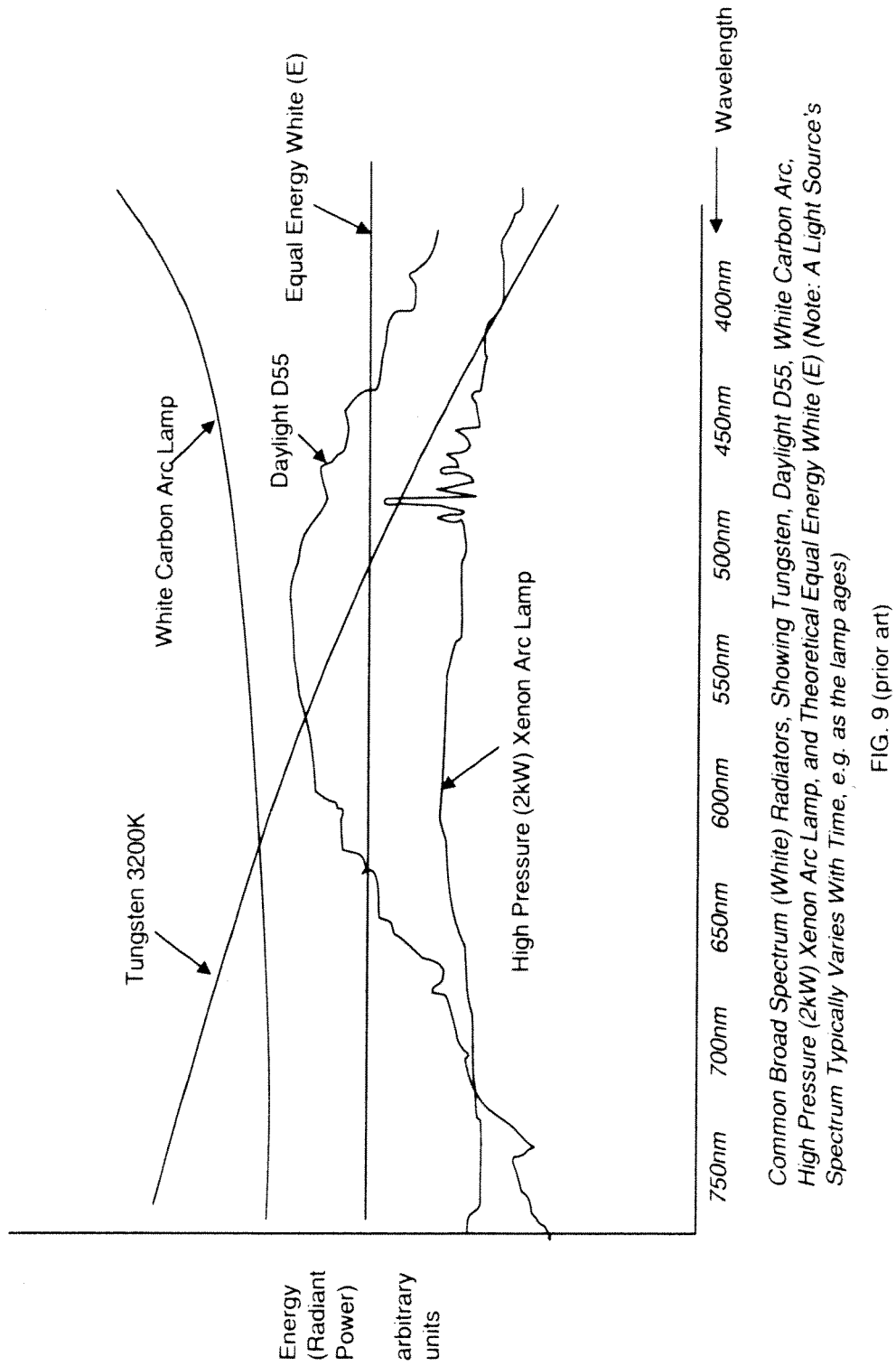
FIG. 9 is a graph showing the spectral output of common broad spectrum (white) radiators compared to the theoretical equal energy white (E).

All color matching functions are normalized to equal energy. This is equivalent to saying that the integration of the color matching functions is equal, in energy units, with a uniform spectral energy theoretical white known as "E" (the equal energy white). Thus, an E uniform white will not vary with color matching functions, since they are all normalized to be the same when applied to E. In human vision, all viewers will perceive an identical spectrum as matching itself. Thus, also, E will always match itself. If a white light source is as close as possible to E in spectral energy, it will be reproduced accurately between mastering and any subsequent presentation. See FIG. 9, which is a graph showing the spectral output of common broad spectrum (white) radiators compared to the theoretical equal energy white (E). However, E does not exist in practice, and the most uniform broad spectral emitters are daylight (at around D60), tungsten (at 6000K, although usually much more yellow at 3200K), and Xenon (in the approximate range of D50 to D65 using correlated color temperature, although Xenon has some spectral energy non-uniformity, as does daylight). Other broad spectral emitters also exist, but those just mentioned are the most commonly available broad spectrum white light sources. Note also that UHP lamps are also being used in conjunction with liquid crystal projection (often retro-reflective), and DMD micromirror projection (also often retro-reflective).

Figure 10:
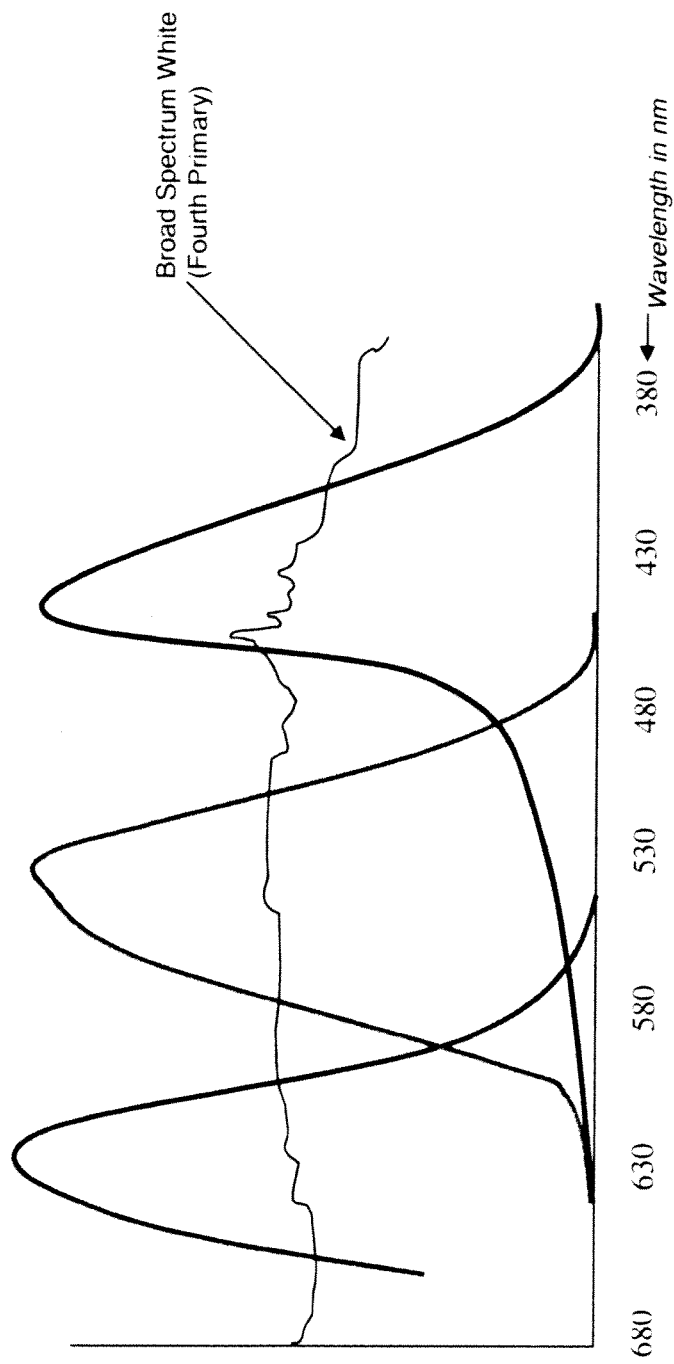
FIG. 10 is a graph showing the spectral characteristics of one selection of RGB primaries and a broad spectrum white source (e.g., a high pressure 2 kW xenon arc lamp).

Thus the present invention recommends, if there are four or more primaries, that the fourth primary be broad spectrum white, in addition to red, green, and blue. See FIG. 10, which is a graph showing the spectral characteristics of one selection of RGB primaries and a broad spectrum white source (e.g., a high pressure 2 kW xenon arc lamp).

A narrow spectral emitter, such as a laser, will exhibit the highest degree of variation with respect to variations between individuals, and variations between color matching functions (e.g., variations due to changing the age and viewing angle parameters of CIE 170-1:2006). A broad spectral emitter will minimize differences between individuals as well as differences of age and viewing angle, and will therefore be most accurate in reproducing color when this broad spectral primary is maximized and all narrower primaries are minimized. Face skin tone has low color saturation, and therefore could be most accurately reproduced for all viewers under all viewing conditions using one or more broad spectrum primaries, while minimizing the narrower and more colorful primaries.

Figure 11:
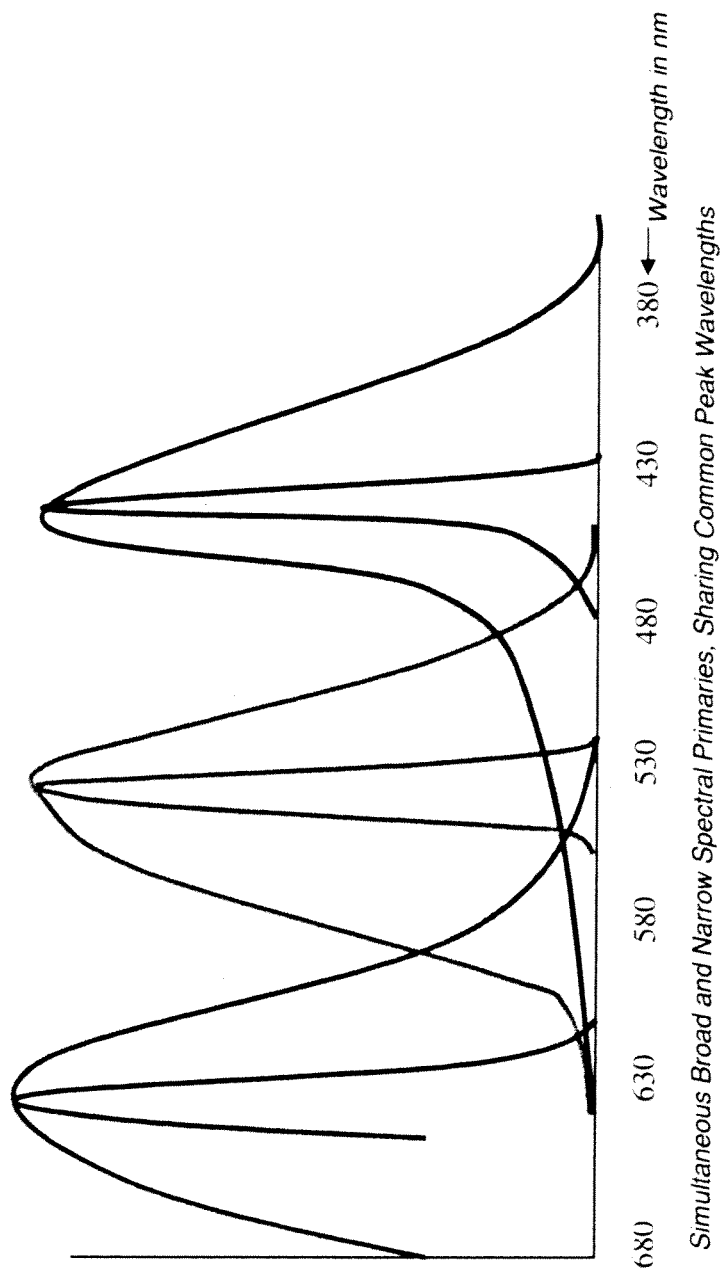
FIG. 11 is a graph showing an example of one narrow and one broad primary for each of red, green, and blue.

One can also conceive of levels of width and narrowness in normal red, green, and blue primaries, as well as with other useful primaries such as deep red, yellow, cyan, and blue-violet. FIG. 11 is a graph showing an example of one narrow and one broad primary for each of red, green, and blue. When there are more than three primaries, the color range of the widest primaries should be utilized fully, and the narrower primaries should only be used at the edges of the color gamut (at the most colorful). For example, one could imagine three red primaries, one fairly broad and desaturated being a pink color, one a normal fairly broad red similar to a red produced by a Xenon lamp and motion picture film yellow and magenta dyes together, and one a narrow red which is only used for producing a saturated red or other saturated colors such as saturated orange (e.g., combined with a narrow yellow) or saturated magenta (e.g., combined with a narrow blue-violet).

In addition to narrowing primaries about a relatively common peak wavelength, it will also sometimes be useful to have narrow wavelength primaries at slightly longer and slightly shorter wavelengths. For example, a broadband red primary having a peak at 690 nm might be augmented by three narrowband red primaries at 730 nm, 690 nm, and 640 nm. Utilizing this method will yield very saturated colors when the narrow primaries are emphasized (with associated variations in perception of these narrow primaries between individuals), but most colors which are not as saturated will be mostly (or entirely) composed of the broad spectrum primaries (red in this example), and will minimize interpersonal variation and yield the highest accuracy and precision in conveying colors.

Utilizing the rule that broad spectrum primaries are always maximized, any number of primaries can be uniquely combined, under any variation of color matching functions, to produce the most accurate color which minimizes interpersonal variation, and minimizes variation due to viewing angle and personal age.

Note that the broadest spectrum primary should be optimized first, such as broad-spectrum white (which will appear gray at low brightness). Then the wider-spectrum primaries (such as wide-spectrum desaturated red) should be optimized next, and then gradually the narrower primaries should be utilized. For saturated colors, this process will automatically yield almost no broad spectrum white nor broad spectrum primaries. For normal colors, which make up the majority of most real scenes, the broad spectrum primaries, especially broad spectrum white, will be the dominant primaries.

Figure 12:
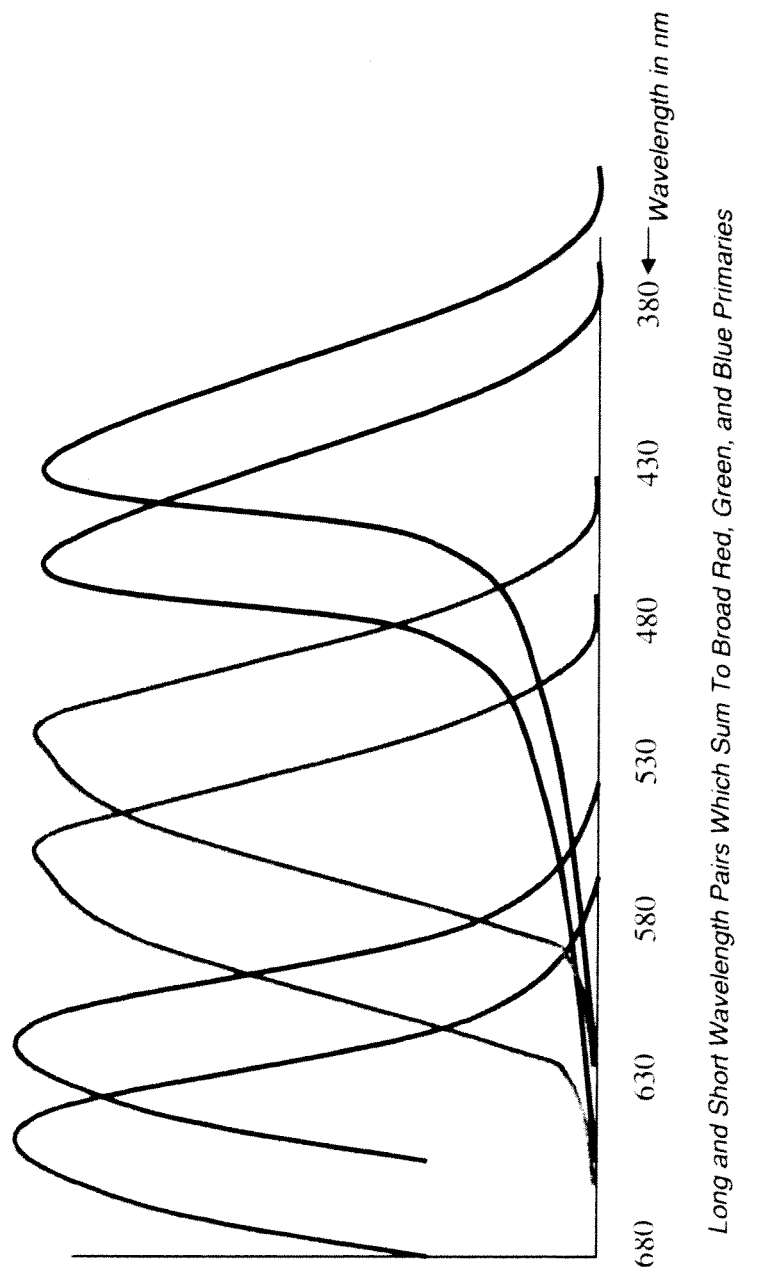
FIG. 12 is a graph showing dual R, G, B primaries.
Figure 13A:
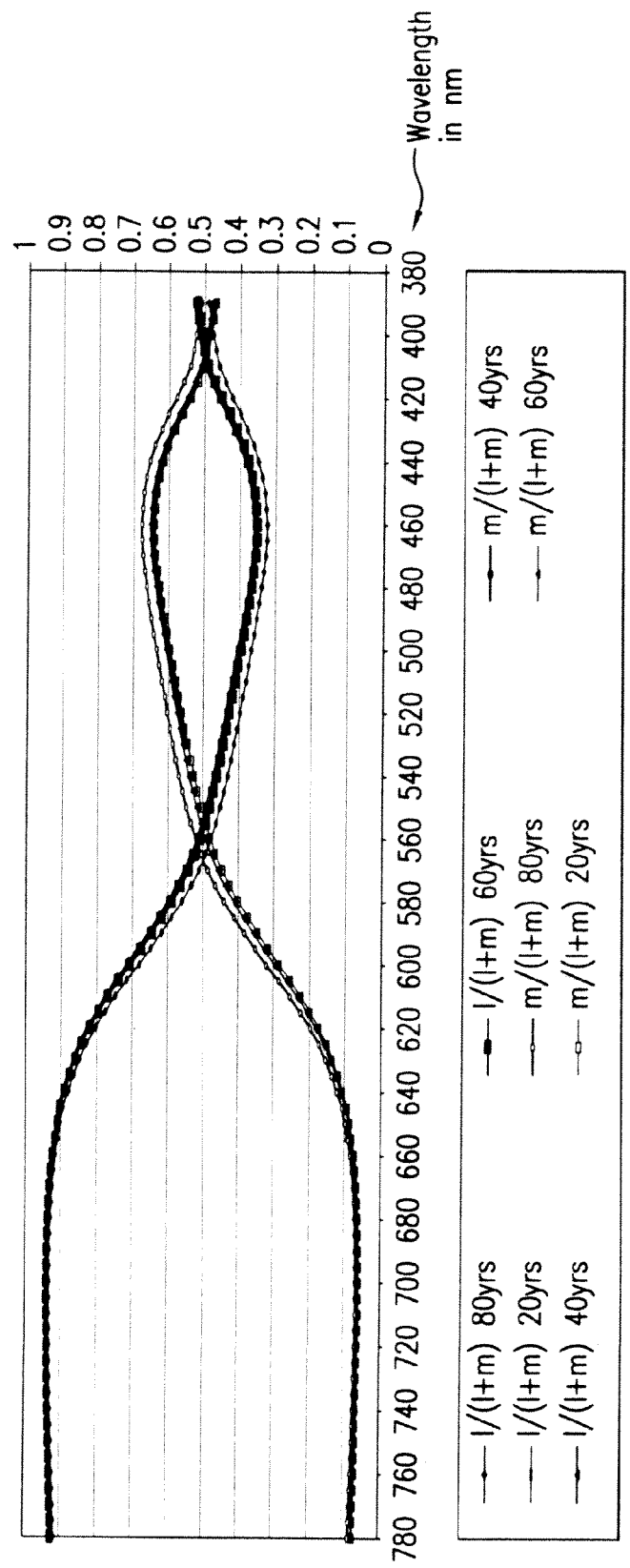
FIGS. 13A-13C are graphs showing cone fundamental ratios long/(long+medium) and medium/(long+medium) (top), $long^2/(long+medium)$ and $medium^2/(long+medium)$ (middle)), and abs(delta(long))/(long+medium) (bottom), showing variation as a function of age for 20 years, 40 years, 60 years, and 80 years for 2 degrees.
Figure 13B:
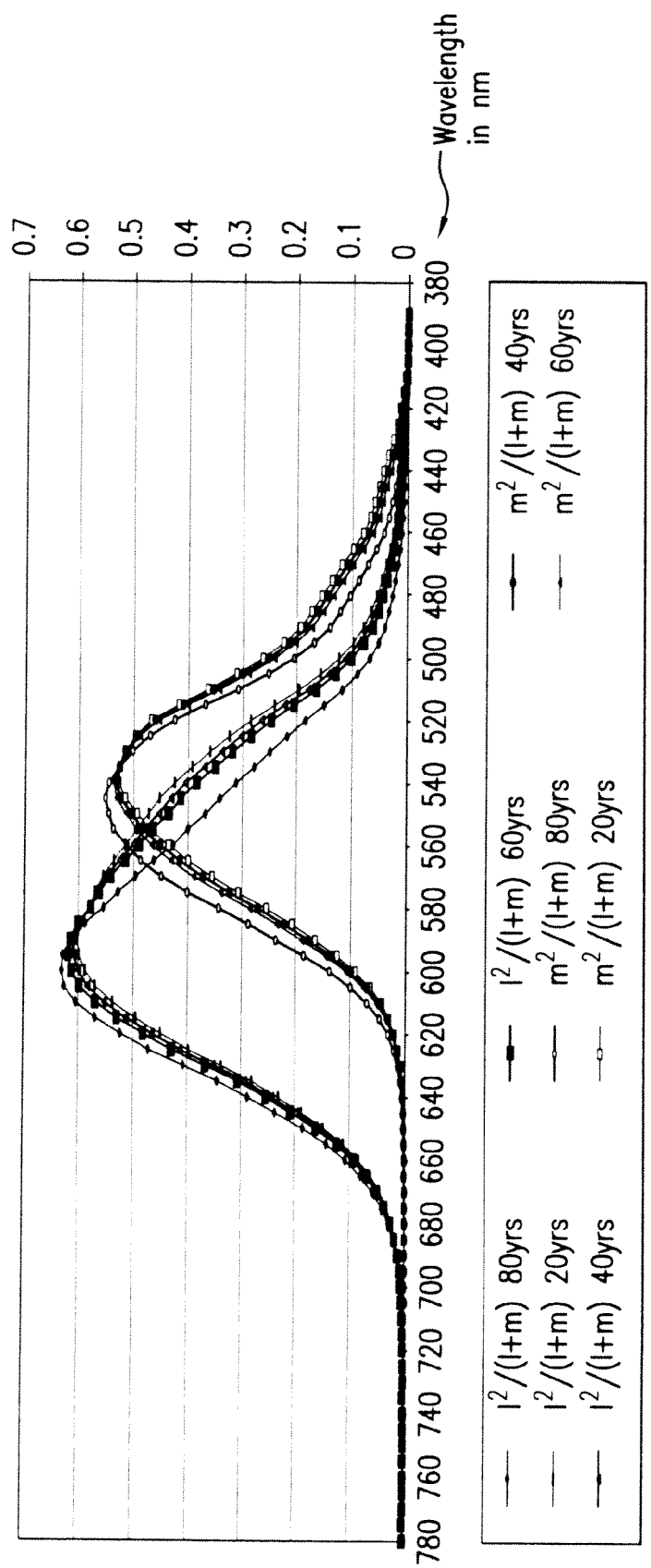
Figure 13C:
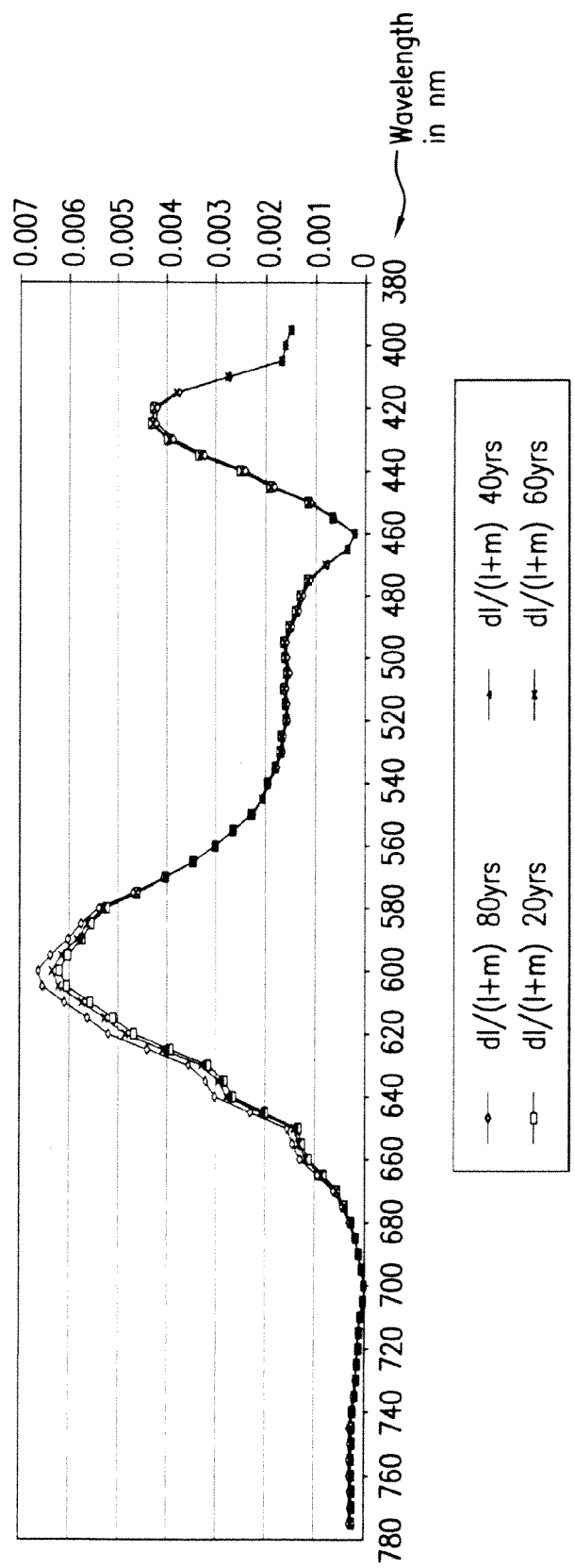
Figure 14A:
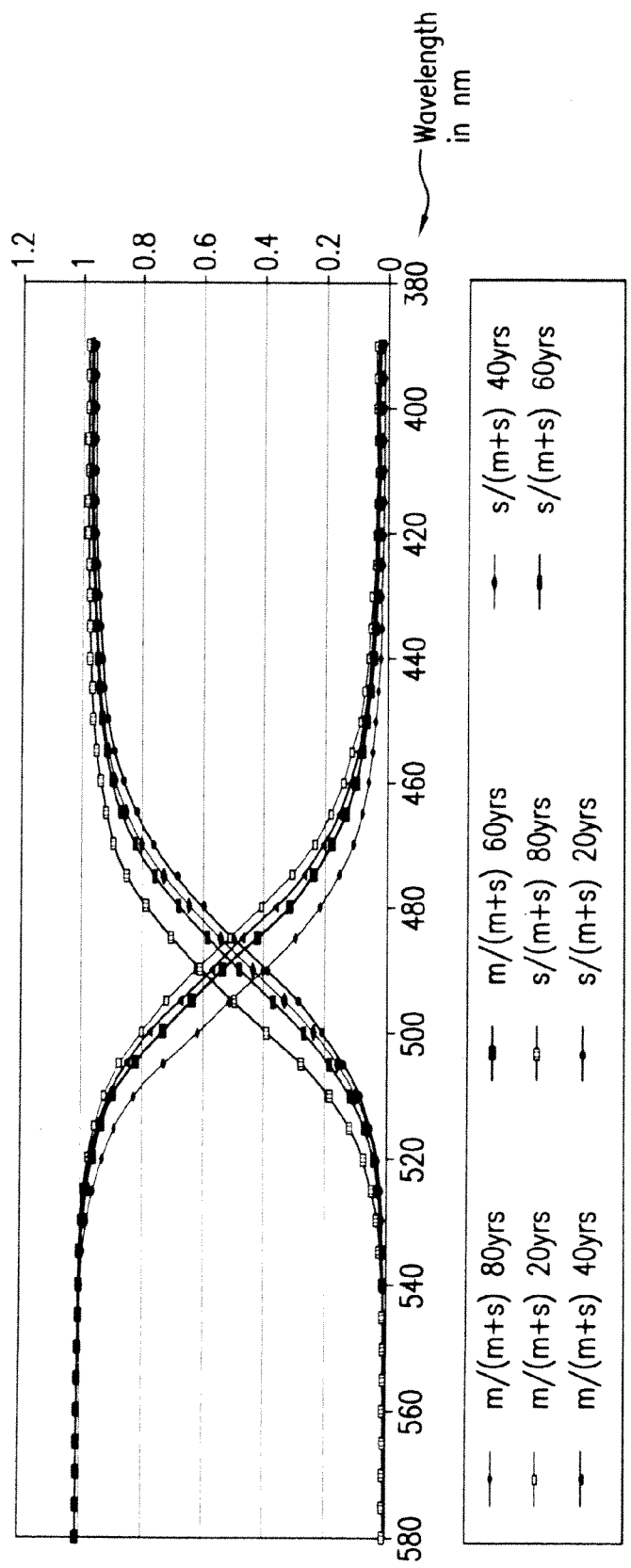
FIGS. 14A-14C are graphs showing cone fundamental ratios medium/(medium+short) and short/(medium+short) (top), and $medium^2/(medium+short)$ and $short^2/(medium+short)$ (middle), and abs(delta(medium))/(medium+short) (bottom), showing variation as a function of age for 20 years, 40 years, 60 years, and 80 years for 2 degrees
Figure 14B:
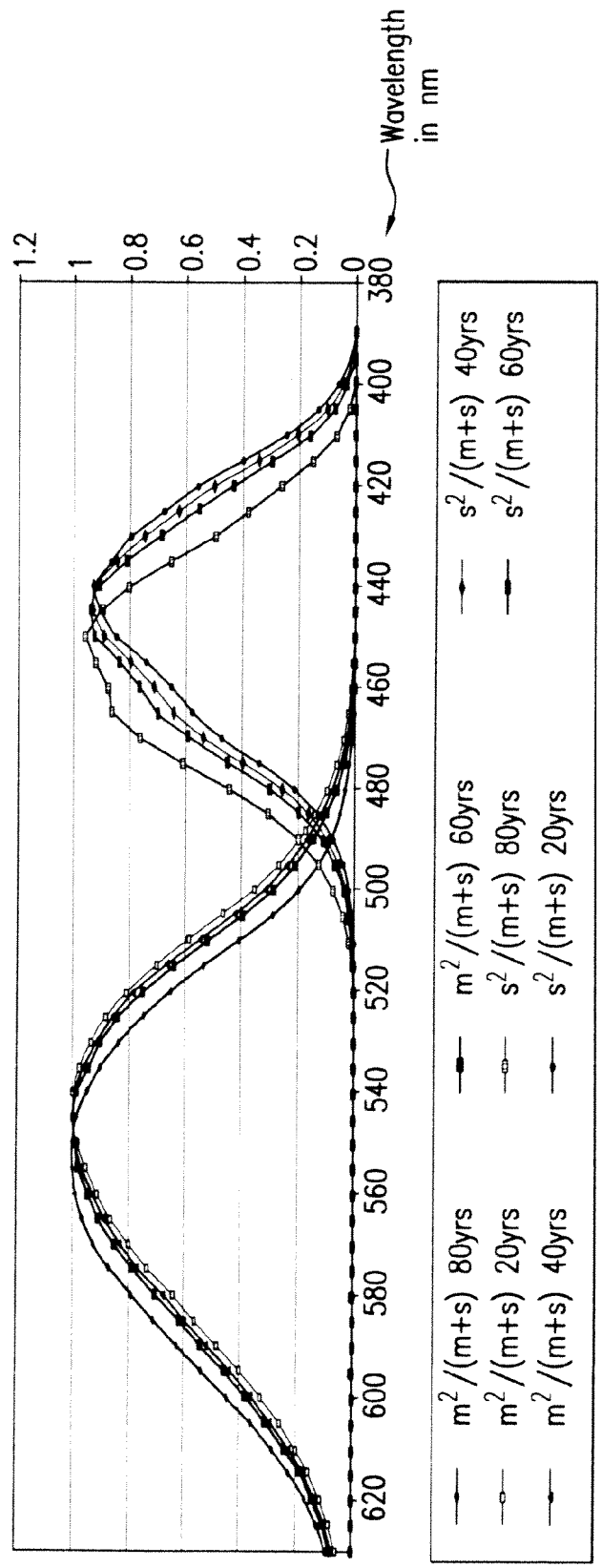
Figure 14C:
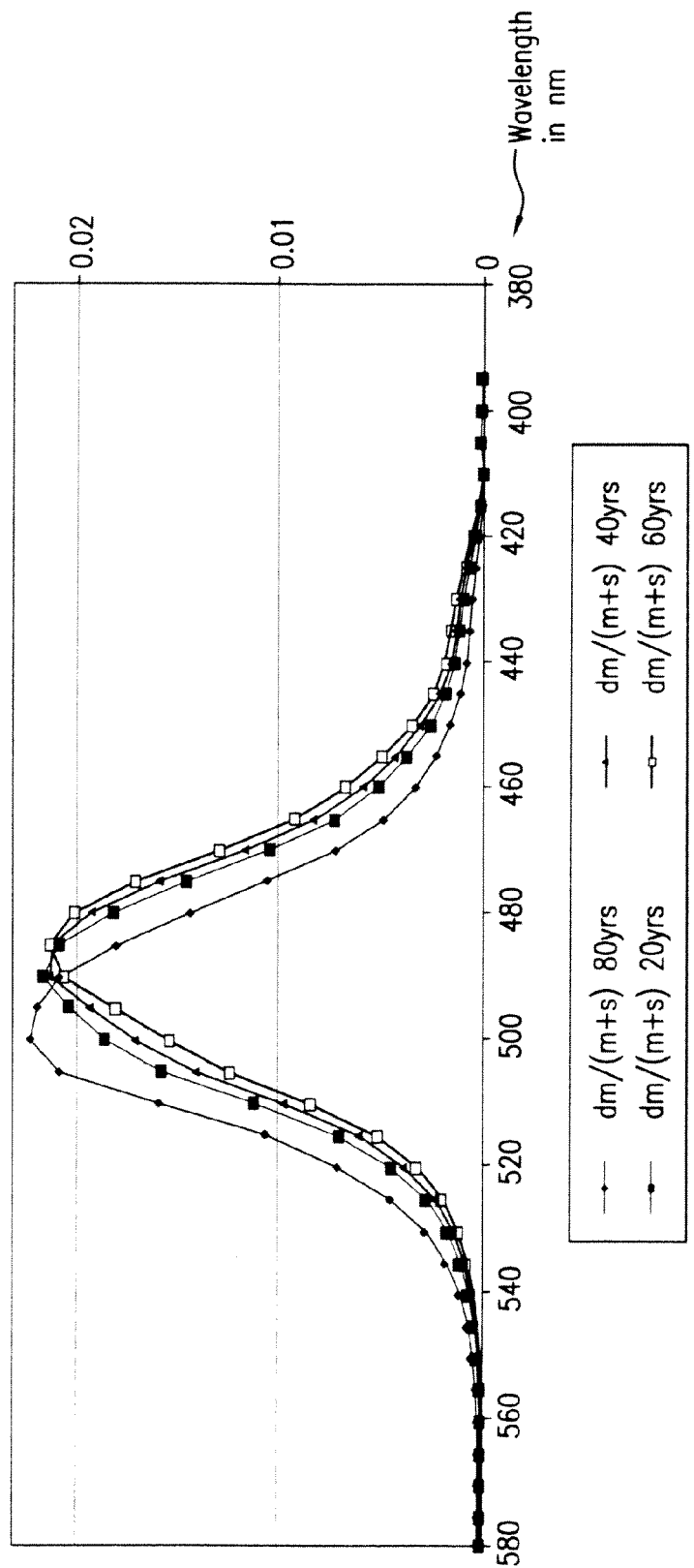
Figure 15A:
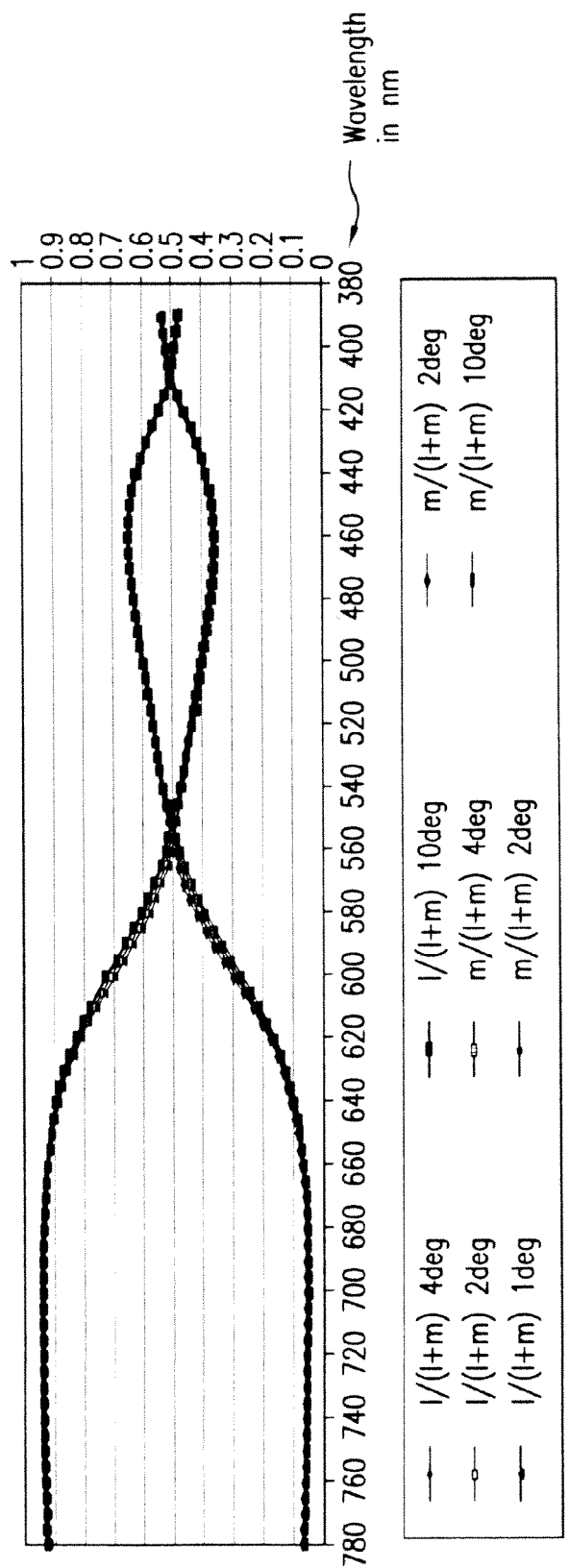
FIGS. 15A-15C are graphs showing cone fundamental ratios long/(long+medium) and medium/(long+medium) (top), and $long^2/(long+medium)$ and $medium^2/(long+medium)$ (middle), and abs(delta(long))/(long+medium) (bottom), showing variation as a function of angle for 1 deg, 2 deg, 4 deg and 10 deg for 35 yrs.
Figure 15B:
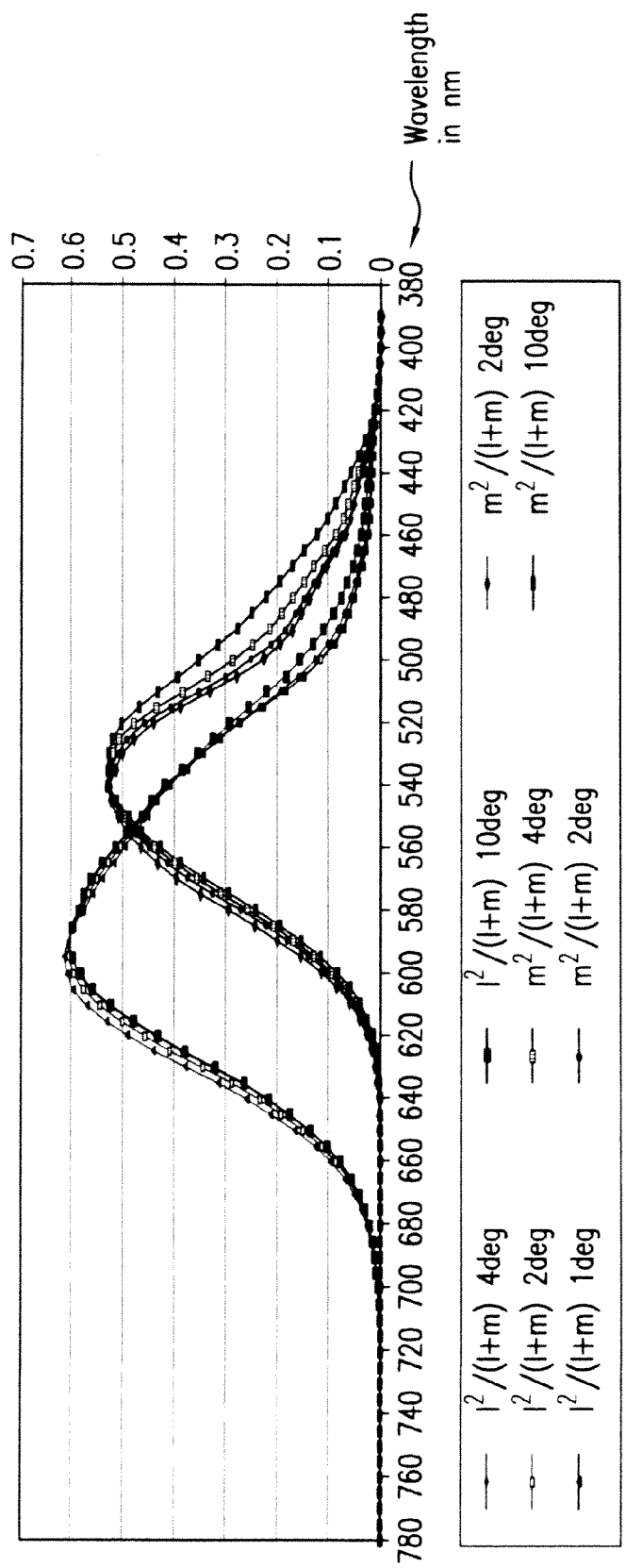
Figure 15C:
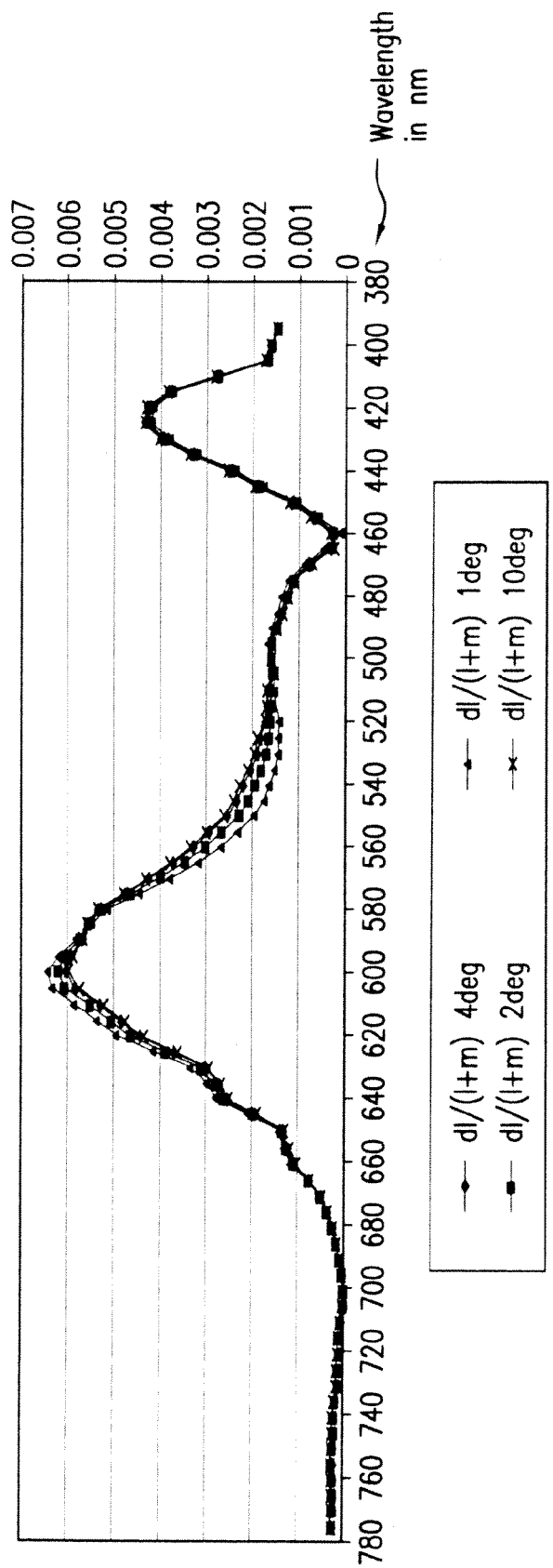
Figure 16A:
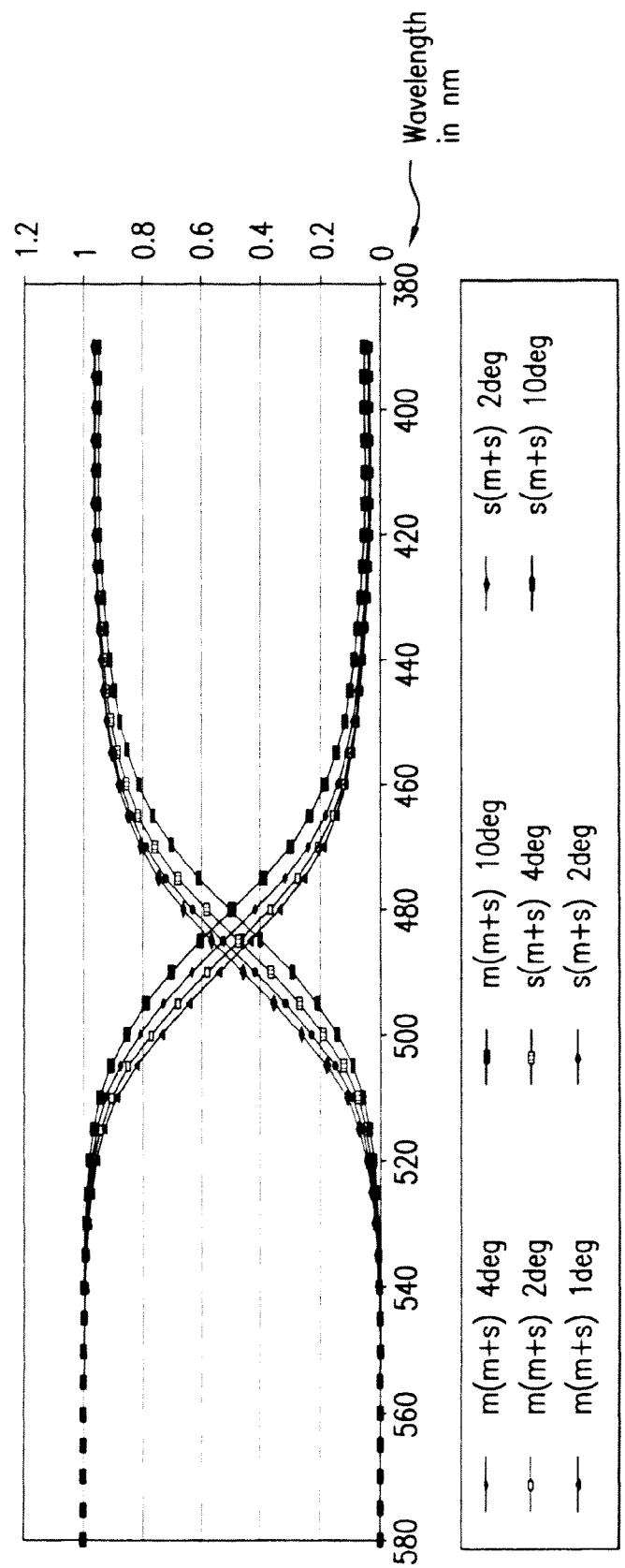
FIGS. 16A-16C are graphs showing cone fundamental ratios medium/(medium+short) and short/(medium+short) (top), and $medium^2/(medium+short)$ and $short^2/(medium+short)$ (middle), and abs(delta(medium))/(medium+short) (bottom), showing variation as a function of angle for 1 deg, 2 deg, 4 deg and 10 deg for 35 yrs.
Figure 16B:
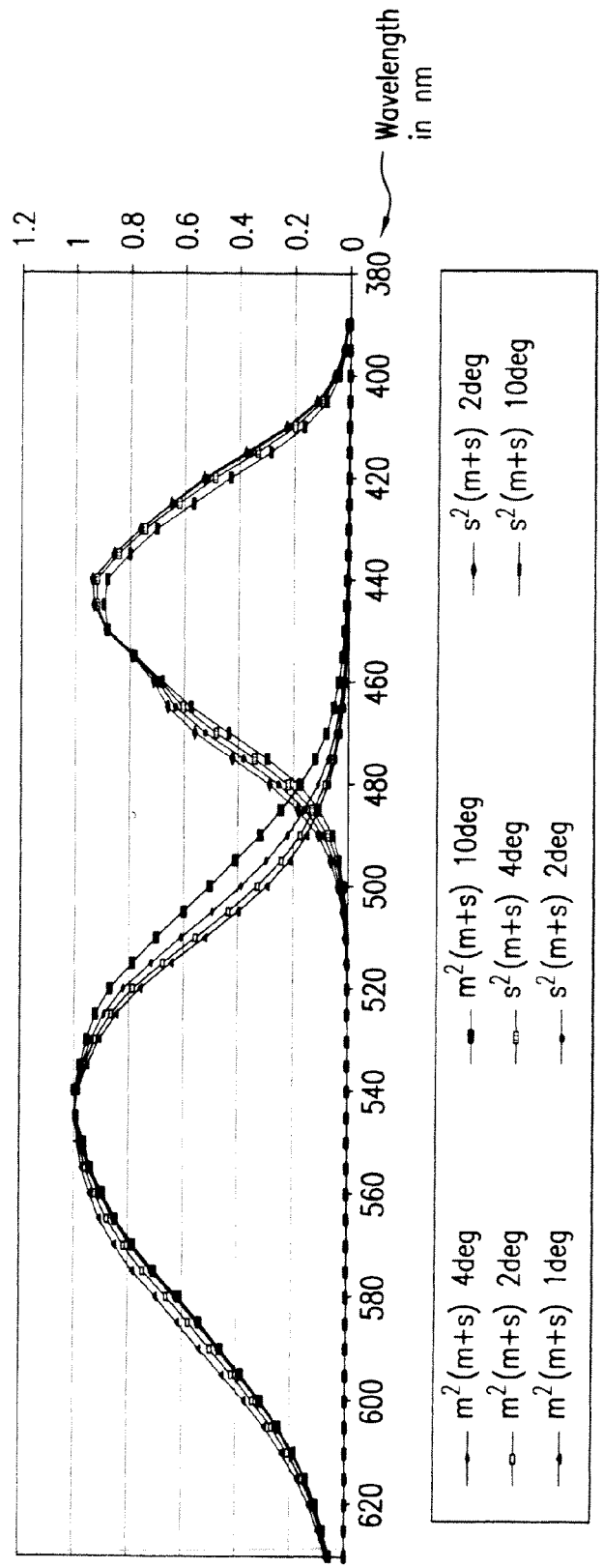
Figure 16C:
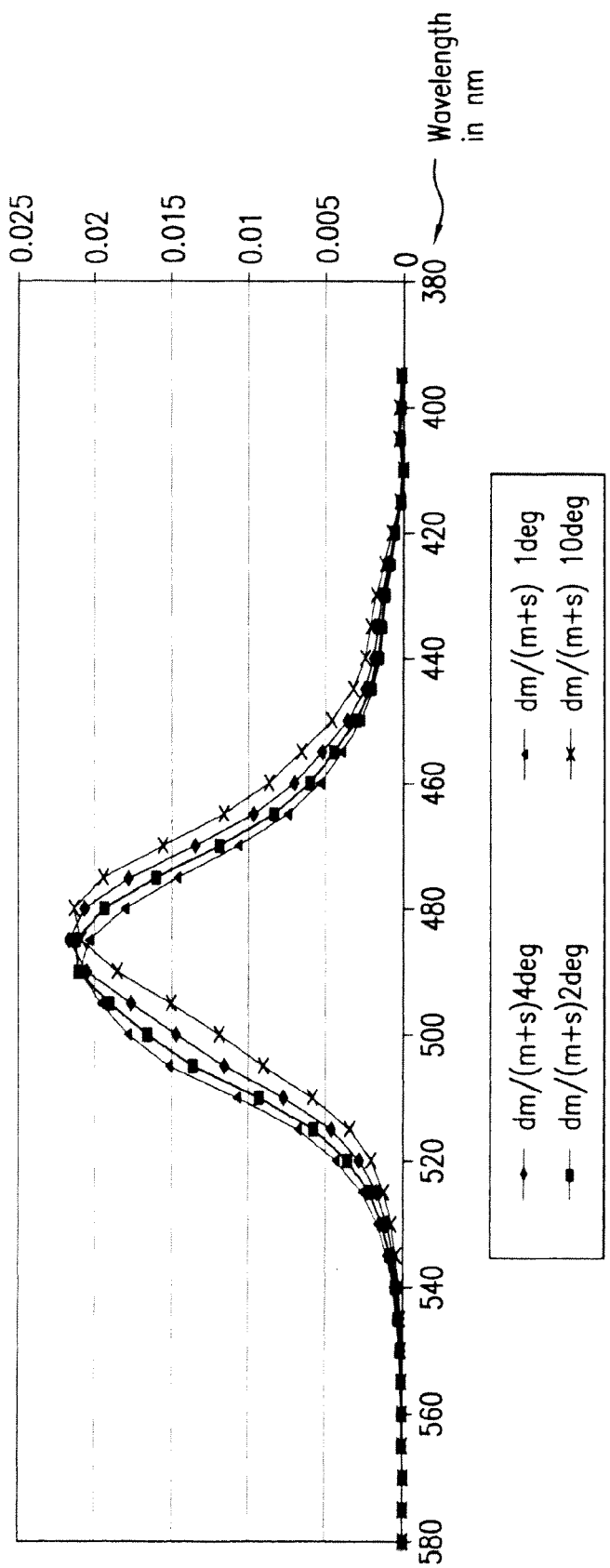

Another useful approach is to use two medium-spectral-width primaries which smoothly sum to a wider primary when both are active together. For example, a fairly wide moderate saturation deep red with a peak at 700 nm might pair with a fairly wide moderate saturation orangish-red with a peak at 600 nm to yield an effective broad spectrum red with a peak at 650 nm. If dual greens and dual blues are similarly used, the rule would be to utilize the maximum of these six (three paired) primaries by maximizing whichever is the lower of the two primaries in each pair while still producing the intended color using the appropriate color matching functions. See FIG. 12, which is a graph showing dual R, G, B primaries.

This concept of paired sub-primaries can be extended to matched groups of three or four per red, green, and blue primary, as well as continuously extending across the spectrum including deep red, yellow, cyan, and blue-violet.

Any number of primary constructions are possible and practical with more than three primaries using the optimizing principle of maximizing the resulting spectral breadth, and minimizing peaks (although peaks will be necessary, and will be large even though minimized, when creating saturated colors). Conceptually this is also equivalent to maximizing the valleys, or low energy points, across the visible spectrum between 440 nm and 730 nm (although long deep-red wavelengths from 730 nm to 780 nm and short blue-violet wavelengths from 440 nm to 380 nm are not important to maximize, and may even be best to minimize due to significant interpersonal variation in these spectral ranges).

Note that such configurations can simulate color television primaries via configurations of primaries which yield red, green, and blue primaries which match those defined using CIE 1931 xy chromaticity points for each. This would be done using integration of spectral combinations with CIE 1931 x_bar y_bar and z_bar and then to maximize all broad spectrum primaries while obtaining the specified red, green, and blue primary x y chromaticities. The maximum breadth of each such primary can be utilized. However, it is also possible, even with trichromatic television systems, to utilize broader spectrum primaries, including broad spectrum white, based solely on CIE 1931 xy chromaticity for that pixel (as long as the pixel is not fully saturated at the edge of the triangle bounded by the chromaticities of the red, green, and blue primaries).

Similarly, the "P3" primary chromaticities, as defined for Digital Cinema projectors (as a guideline for range of chromaticities) can be simulated for red, green and blue primaries. However, when CIE 1931 XYZ (with a 2.6 pure gamma) is utilized for Digital Cinema, then each CIE 1931 xy chromaticity can be achieved using the maximum possible of the broadest spectra, and only the minimum necessary narrow spectral primaries to achieve a particular xy chromaticity.

With all systems based upon CIE 1931, however, there is no provision for interpersonal variation, no variation for age, and no variation for viewing angle, thus limiting the potential accuracy and precision. However, the use of the broadest spectra to achieve any color will optimize accuracy and precision, within the limitations due to having colors specified in terms of CIE 1931.

Normalization of Matrices

Use of CIE 170-1:2006 cone fundamentals as color matching functions requires normalization. As mentioned above, color matching functions are normalized such that their integrals with equal-energy illuminant "E" are all identical, and usually set to 1.0. This is the same as saying that the area under each curve is equal, and is usually set to 1.0.

When integrating any color matching functions with actual display or projector+screen emission spectra, it usually beneficial to apply normalization to the resulting matrix. This is true for all color matching functions, including CIE 1931 x_bar y_bar z_bar, CIE 1964 x_bar10 y_bar10 z_bar10, as well as all variations of cone fundamentals l_bar m_bar s_bar from angular and age settings using CIE 170-1:2006.

Since the color matching functions are normalized to equal area, which is usually 1.0, any additional normalization is effectively being applied to the scale of the spectral energy of the display or projector+screen. It will usually be appropriate to set the display or projector+screen to maximum white, with all primaries set to their maximum value (including when there are more than three primaries). This will represent the "native white" for most displays and projectors, and will usually be r=g=b=1.0 (or r=g=b=integer maximum, such as 255, 1023, 4095, etc.). The native white may differ from the aesthetic white point, requiring that one or more of the primaries be reduced below its maximum value to create the brightest white that can be made at the aesthetic white point.

Normalization of the mastering display or projector+screen can be performed independently of normalization of the presentation display or projector+screen. Conceptually, only one normalization is actually taking place, since mastering reference normalization and presentation normalization are concatenated with each other in practice. By conceiving of the normalization in this way, normalization should be designed using the maximum possible value of the mastering spectra (which is usually measured at the maximum for all primary values of the mastering display or projector+screen) integrated with the color matching functions, concatenated with the inverse matrix of the presentation display or projector+screen spectra, again measured at the maximum value of the display or projector+screen. The resulting transformation matrix should then be normalized to whichever presentation primary is largest for the presentation display or projector+screen.

This procedure can be altered somewhat if the mastering display or projector+screen is limited to only using pixel values which are limited to the highest brightness of the aesthetic white. In this case, the maximum brightness aesthetic white proportions of the primaries can be utilized in the normalization process, using the maximum presentation white of the presentation display or projector+screen.

Note that this renormalization process will be required for every variation of color matching functions. Since the present invention proposes optionally utilizing continuously varying color matching functions, normalization must also be continuously performed. This will usually be implemented as a normalization maximum (of each primary's maximum sum) and then a corresponding divide applied to the matrix. The divide can be implemented equivalently by a reciprocation, followed by a multiply of each matrix term, which is usually faster on most computers. Whether interpolating matrices over the image, or re-computing the matrices in a smoothly varying way across the image, the renormalization will be required for every pixel. If the affects of the changing color matching functions on the resulting colors are determined to be smaller than some threshold of perception, then a coarser renormalization can be used as a computation reduction. However, renormalization at every pixel is, in general, required when using color matching functions which vary over regions of the image.

Note that many cases of mastering and presentation spectra will be sufficiently similar that normalization may be nearly constant. In the case where mastering and presentation spectra are identical, normalization will be unity, and will not be affected by variations in color matching functions. In the case where normalization is nearly constant, a range of color matching function variations can be tested, and whichever has the highest value for one or more primaries can be used for normalization. Variations in normalization when varying color matching functions can then be ignored, and the single normalization can be used for all matrices and all pixels over the entire image.

A determination of whether a single normalization can be utilized can be made using the amount of variation in the normalization when varying over the range of color matching functions which will be used in a given presentation circumstance. If the normalization maximum variation is small, given the mastering and presentation spectra and circumstance (such as age settings and angle variations), then a constant normalization can be utilized. Note that the maximum variation in normalization can be tested quickly and efficiently, and even performed once per frame if necessary. Thus, each frame can be potentially tested over the range of color matching functions and circumstances of that frame, to save computation with respect to renormalization (which may in general be required at every pixel) if normalization variation for that frame is small. Similarly, normalization variation can be tested within regions of the image, or over multiple frames, shots, or scenes. However, per-pixel renormalization is efficient enough with current digital processors that these normalization optimizations will often be unnecessary.

At the other extreme, some combinations of mastering spectra, presentation spectra, and color matching function variation could potentially lead to moderately large changes in normalization. If such large variations are determined for a frame or scene, it may be desirable to limit the range of normalization. A significantly changing normalization indicates a significant level shift in the reproduction of maximum mastering white (whether display or projector+screen white, or aesthetic white) over variations in color matching functions (given the presentation spectra). It may be best to reduce this level shift (such as scale the amount of change in normalization by half). If such cases of large normalization changes are encountered, it may be helpful to gain intent or guidance about how best to handle renormalization from the manufacturer of the particular display or projector+screen, or from industry groups related to imaging standards or guidelines.

It is anticipated that large variations in normalization will not occur with most normal mastering and presentation spectra combinations, under normal variations in color matching functions as recommended by the present invention.

Conceptually, normalization is based upon reproducing the mastering device white or aesthetic white (if pixel values are limited in their maximum to maximum aesthetic white). In general, this will yield one of the presentation device primaries as being maximum, although it is possible that more than one primary will be maximum. By varying the color matching functions over their entire useful range (such as varying CIE 170-1:2006 between 20 years and 80 years in five year steps, with each age further varying from 1 deg to 10 deg, in ½ degree steps), the maximum primary can then be determined for each such setting. It can also be determined if the maximum primary switches to a different primary, or whether more than one primary are at their maximum at a given setting. Given the maximum primary, the normalization is then determined.

Note that this normalization concept is based upon the maximum possible brightness of white available during mastering (whether device maximum white or aesthetic maximum white on that device) and the maximum white available during presentation. Intentional brightness alternations below these maxima during presentation are not considerations with respect to normalization (although they could optionally be concatenated with the normalization scale factor for implementation efficiency).

Note that this normalization methodology is the same whether there are three or more than three primaries. However, this methodology requires that the maximum mastering display or projection+screen brightness of white be set by having all primaries at maximum, or of aesthetic white by having at least one primary set at maximum. This methodology further depends upon the maximum presentation display or projector+screen native white, having all primaries set at maximum. Adjustments to alter the white at presentation versus mastering will usually be simplest if applied as scale factors subsequent to normalization. However, a higher white brightness can be achieved under conditions of altering the white point if the alternation of the white point is included in the normalization. In general, the alteration of white point is also a function of color matching functions, which can vary over the image according to the methods of the present invention. However, such optional white point alteration need only affect normalization if it is desired to gain the incremental brightness increase which may then be available.

Hue Distinction

Using CIE 170-1:2006 cone fundamentals under variation of age and viewing angle (note that other cone fundamentals may also be used), it is possible (and novel) to use ratios of these cone fundamentals to show hue sensitivity at various wavelengths. This is shown at the top of FIGS. 13A-13C through 16A-16C using the quantities:

long/(long+medium)
medium/(long+medium)
medium/(medium+short)
short/(medium+short)

In addition, the use of a weighting of these ratios by their corresponding numerator cone fundamentals yields another useful measure of hue sensitivity. This is shown in the middle of each figure. This weighting makes each numerator be the square of its fundamental as follows:

$long^2$/(long+medium)
medium2/(long+medium)
medium2/(medium+short)
short2/(medium+short)

The greatest hue distinction sensitivities are at the highest slopes of these quantities. The greatest hue variation as a function of age and viewing angle can also be seen in the variations of these ratios. The ratio of absolute value of the delta numerator to the denominator is also shown at the bottom, indicating the wavelengths having the greatest change as follows:

abs(delta(long))/(long+medium)
abs(delta(medium))/(medium+short)

Note that the following have the same magnitude but opposite sign, thus the absolute value of the delta ratio is identical:

abs(delta(medium))/(long+medium) [not shown, this is identical to abs(dl)/(1+m)]
abs(delta(short))/(medium+short) [not shown, this is identical to abs(dm)/(m+s)]

These various functions (described here and shown in FIGS. 13A-13C through 16A-16C) can be used directly to compute hue distinction and hue variation as a function of age and viewing angle.

These functions can indicate hue sensitivity or variation for a given wavelength or range of wavelengths.

Spectral Notches to Reduce Variation

Certain wavelengths vary more with viewing angle and age, and between people. Variation can be somewhat reduced by reducing the spectral energy at one or more of these sensitive wavelengths. For example, a notch filter in the cyan at 490 nm with a width of ±15 nm (which shows a large medium versus short cone fundamental variation with a person's age) can reduce interpersonal variations at this sensitive wavelength region, and can reduce overall variation by a small amount. Other sensitive regions, such as 610 nm, 470 nm, and 420 nm, may also benefit from spectral notch filters. Such reduced spectral energy in sensitive regions can slightly benefit both mastering and presentation, by somewhat reducing interpersonal variation in both circumstances. Note that some spectral regions, such as 550 nm (which varies significantly as a function of angle), are very sensitive, yet this wavelength falls in the center of the green primary, and thus energy reduction is not generally available.

Note also that the use of one or more such spectral emission notches will somewhat (usually slightly) reduce variation, independent of whether other aspects of the present invention are utilized.

Note further that spectral energy spikes or other increased energy at sensitive wavelengths during mastering or presentation will have the opposite affect, and will exaggerate interpersonal variation, as well as variation as a function of viewing angle.

Flat Uniform Energy Regions to Reduce Variation

As can be seen from FIGS. 13A-13C and 14A-14C, there are wide spectral regions between 580 and 660 nm and between 420 and 550 nm which are sensitive to age. Further, as seen from FIGS. 15A-15C and 16A-16C, there are wide spectral ranges from 510 nm to 650 nm and from 420 nm to 530 nm which are sensitive to viewing angle. Given that these bands represent most of the visible spectrum, only broad-spectrum white, as close to the E equal energy white as possible, is essentially invariant with respect to viewing angle and age.

As with broad-spectrum white, any flat uniform energy portion of any primary, including red, green, and blue primaries, will reduce variation. Variation is reduced when any primary is designed to be relatively flat, having relatively uniform energy, over any of the sensitive wavelength regions.

The principle of spectral notches at sensitive wavelengths, and of relatively flat regions at sensitive wavelengths, applies to red, green, and blue primaries as well as to optional additional primaries such as yellow, orange, cyan, yellow-green, etc.

Localized Wavelength Sensitivity

A useful way to determine the amount of spectral energy at various nearby locations in a sensitive wavelength region is to integrate the spectral emission energy with two or more narrow spectral functions. For example, in order to determine the local wavelength variation in the amount of energy in the region near 520 nm, narrow spectral functions could be used that are 4 nm wide at 524 nm, 520 nm, and 516 nm. The difference between the three integrated values would give an indication of the amount of spectral emission energy change that can occur in this sensitive wavelength region due to changes in color matching functions near this wavelength (for example, as a function of age and/or viewing angle). Such tests can be performed at any number of critical wavelength regions. This, in turn, can be used to guide accurate and precise color processing by indicating the significance of the affect of age and/or viewing angle and/or other interpersonal variations in color matching functions.

Application of Flat Regions and Spectral Notches to Color Paper Prints

The use of flat regions or spectral notches in regions of high sensitivity can be applied to color paper prints in addition to digital displays and projectors. The paper, the dyes/inks, and the light source can each utilize the principles of flat regions and spectral energy minimization in regions of high sensitivity to reduce inter-person viewing variation. Further, specific adjustments could be made to inks, paper, and/or light sources for individual color matching functions. For example, a specific paper could be selected based upon determination that such paper is better for a particular viewer. Similarly, different inks or dyes could be selected for different people. Also, one particular light source, possibly with color balancing and spectral notching filters, might be better for one person than for another. Thus, a characterization of a person's actual color matching functions could be utilized to select among choices for optimum presentation of color to that person. In the absence of a specific person's characterization, or in addition to it, a general specification could be made based upon the size of the image (e.g., the size of the color paper being printed, such as 8"×10"), a typical viewing distance (e.g., 15" from the eyes), and a typical position (and therefore brightness) of the light source, and possibly light type (thus implying the spectrum) which is illuminating the color paper print. Further, the person's age can be used (such as with CIE 170-1:2006 cone fundamentals as a function of age and/or viewing angle, used as color matching functions) instead of an actual personal characterization of the individual. Thus, many improvements in accurate and precise color presentation are possible with color paper prints, in addition to displays and projectors+screens.

Spectrally-Adjustable Glass

It is also possible to use spectrally-adjustable transmissive optical elements, such as glass or glasses (or any glass in the intervening path), which can adapt to the viewer, and/or which can adapt to the surround. For example, a spectrally-adjustable transmissive Liquid Crystal Display (LCD) panel may be used. Such an optical element can be applied to viewing of paper prints, to light sources used to illuminate paper prints, to displays, and to projectors+screens.

Energy Tradeoff when Using More than Three Primaries

If a display is made up of light emitting cells, each emitting a specific spectral color of primary, then the amount of emission energy available for each primary will be the area proportion of the cells of that primary times the energy of that light emitting cell. For example, using triads and three primaries of red, green, and blue, each cell would have a third of the area. The peak white would then be the full red, green, and blue, each of which have a third of the area. Another common pattern is a stripe of red, a stripe of green, and a stripe of blue, each occupying one third of the area.

If there are two greens, one red, and one blue, in a Bayer pattern square tile, then the maximum brightness peak white would be two greens, one red, and one blue. Note that this might result in a greenish white.

If one of the cells is white, one red, one green, and one blue in a four-tile, then peak white would be a quarter of the area of white, plus one quarter of the area for each of red, green, and blue. The maximum pure red is limited to a quarter of the area, whereas it could be one third of the area (4/3 as much light) in the case of only three primaries of red, green, and blue having equal emission cell area. Thus, the maximum white can be traded off against the maximum brightness of pure colors (typically red, yellow, orange, green, cyan, blue, and magenta). Such configurations can be considered and enumerated in detail to optimize the presentation on a display having light emitting cells.

Color filter cells over a white backlight are also common, such as with Liquid Crystal Displays (LCD's). LCD's behave similarly to light emitting cells in that the color primaries partition the light from the backlight into independent areas (usually for each of red, green, and blue primaries, often in vertical stripes).

Other types of displays include Digital Micromirror Devices (DMD's), also called "micromirrors", which modulate white light (usually having a broad spectrum) from a white lamp. The modulated light can be split into colors using a color wheel. If this is done, there is a tradeoff between a three-segment wheel of red, green, and blue, or a four segment wheel of white, red, green, and blue. The peak white will be increased somewhat in this configuration versus red, green, and blue in thirds. The same tradeoff exists as with adding a white light emitting cell to red, green, and blue light emitting cells, except that the time is divided instead of the area.

A "three-chip" micromirror projector splits a white light source (usually having a broad spectrum) into red, green, and blue bands, which are then modulated independently on the three chips, and then recombined for registered presentation on the screen. If a fourth channel is added wherein some of the original white light is tapped off and modulated, this tapped-off white light is taken from the red, green, and blue primaries.

In all of these cases, the production of a white reduces the maximum brightness of saturated colors. Note that film, with yellow, cyan, and magenta dyes, provides white with minimum deposition of dyes, thus being clear film. The yellow, cyan, and magenta colors are single-dye colors, and thus have more brightness than red, green, and blue colors, which require dye pairs (each of which absorbs some light). Thus, a similar tradeoff exists with projected color film (either still or moving film).

This tradeoff of maximum saturated color brightness versus maximum broad-spectrum white (assuming that the white can be broad spectrum) is a design parameter of any display or projector. The range of brightnesses, particularly the maximum brightnesses of saturated colors, becomes a design consideration when adding a broad spectrum white.

It is herein recommended that any fourth "primary" be broad-spectrum white, at whatever proportion of the light energy is considered best. For example, a given display configuration might select 30% of the peak white for the maximum broad spectrum white, where the peak white is that white maximum plus the maximum of red, green, and blue primaries. Note that a four-segment color wheel (white, red, green, and blue) with a micromirror is likely to yield a maximum of the white segment which is about 65% of the white that results from also adding maximum red, green, and blue. Such a configuration may be convenient for practical implementation, even though 30% of peak white might be adequate for the broad spectrum white "primary".

By using a broad spectrum white as a fourth "primary" (up to the maximum amount of that broad-spectrum white), interpersonal-variations are minimized, and color accuracy and precision are optimized. Even above that white's maximum, wherein red, green, and blue primaries are added, the spectrum is still smoother than if it were to have been made solely of red, green, and blue primaries, thus still providing an improvement in color accuracy and precision.

With more than four primaries (or more than three, if no broad spectrum white is used), additional colors can be added at yellow, cyan, deep red, and deep blue, as well as broad and narrow spectral versions of all color primaries (including red, green, and blue).

Similar tradeoffs exist for any number of primaries due to light emission area, proportion of time on a color wheel, or dichroic color band split proportions. Thus, the range to maximum white, and to maximum brightness of saturated colors, is determined by the specific configuration of primaries, especially if there are more than three.

The guidance of the present invention is that broad spectral emitters are maximized at any required saturation using color matching function spectral weightings which are properly optimized (as described in the present invention).

Color Appearance

The techniques and formulae of color appearance modeling are continually evolving. A solid model has been developed by the CIE in CIECAM02 (CIE Color Appearance Model 2002). This and most other models are based upon average viewers and do not take into account any viewing angle issues, nor do they take into account the age of viewers. The concepts of the present invention can likely be applied to color appearance models to significantly improve their accuracy and precision.

Further, it is potentially possible and useful to characterize each person's interpersonal variations (to the degree possible) with respect to color appearance modeling parameters. As with age and viewing angle, which are averages, an individual's specific parameters can provide an improvement. The same is likely true for color appearance modeling parameters.

The most fundamental ingredient of color appearance models is their ability to provide an adaptation to a change in white point. This is usually done via a transformation to cone fundamentals, which is nearly always (in published color appearance models) approximated using a matrix transformation from CIE1931 XYZ tristimulus values.

Cone fundamentals, such as from CIE170-1:2006 (when used, the specified CIE 170-1:2006 cone fundamentals are used as color matching functions), allow direct von-Kries white-balance for color adaptation to white, by scaling by the integration of white with the cone fundamentals, and then multiplying by its inverse (e.g., dividing all colors' integrations with cone fundamentals by the level of white integrated with the same cone fundamentals). Note that this is adaptive to changing cone fundamentals (e.g., by varying them as a function of age and/or viewing angle and/or individual person differences). Note also that the use of a matrix transformation from CIE 1931 x_bar y_bar z_bar to cone fundamentals will generally be inaccurate, and that the integration of actual spectra with the actual cone fundamentals will produce a consistently more accurate and precise result for color adaptation to white. Further, the capability of CIE170-1:2006 to adapt to average age and viewing angle allows further improvement in von-Kries white-balance color adaptation. Further, according to the present invention, the cone fundamentals of CIE170-1:2006 can change with angular distance from the center of view, such that the white-point adaptation can be variably applied at every pixel (since the cone fundamentals vary at every pixel).

Note that the changing white-point color adaptation model CAT02 using narrower cone fundamentals, including negative values, can be applied to the spectra for performing white point color adaptation. However, CAT02 is not defined as a function of viewing angle nor average age. It is anticipated that improvements upon the von-Kries cone-fundamental color adaptation models for changing white point, such as CAT02, and the Hunt-Pointer-Estevez model, might eventually be able to take into account viewing angle and average age, and thus improve their precision and accuracy. The use of a spectral methodology, as described in the present invention, provides a framework for conveniently adopting any such improvements, should they occur.

Another fundamental and significant color appearance parameter is the color of the surround. In more complex color appearance models, the surround itself is divided into the proximate surround (i.e., close proximity surround), the surround, and the background. It is possible to determine an individual's variations, or an average of a known group of individuals, in color perception to a particular surround configuration. It is further possible to measure the current surround. In viewing environments, such as movie theaters, where the surround does not change, the surround can be measured once, and that measurement applied subsequently. In home viewing, however, daytime and night-time illumination is often gradually (or suddenly, in the case of turning on a room light) changing. It is possible to augment any display to have it look in various directions at the room surround with various colorimetric sensors (e.g., positioning sensors at the display corners looking in 45 deg solid angles at various directions). In such a way, the current surround, including close proximity, medium surround, and room ambient background, can be continuously measured (or measured fairly often, such as once per minute, but applying a gradual change function with the same duration for the adaptation, such as changing gradually over a minute).

Thus, another optional aspect of the present invention is the augmentation of presentation displays and projectors with colorimetric and photometric sensors aimed in various directions around the room and around the image screen to provide appropriate ambient brightness and color information for use in color appearance models.

Given all of the potential variations, it may be beneficial to have some mastering rooms have a variety of displays and ambient surrounds, and/or a highly adjustable display or projection and ambient environment. Using such variations, the appearance may be adjusted to be as intended, and the formula and/or parameters for achieving this appearance under these alterations can be conveyed along with the images. Of course, in practice, there are so many possible variations that it would be difficult to check and possibly adjust them all. Thus, this process must rely on color appearance models, which can approximate most of the required adjustments. Some scenes, under some alterations of viewing conditions, can be checked and adjusted. Using this sparse sampling of corrections and adjustments, a model of the appropriate overall adjustments can be developed which can then be conveyed with the images.

In practice, composites and regional color modifications may be complex to convey in this manner, requiring that such scenes be conveyed with linear light as seen in the mastering environment. Simplified formulae and/or parameters for presentation under presentation viewing conditions which differ from mastering can be sent to guide such alterations. Alternatively, a generic set of formulae and/or standardized parameters can be applied for appropriately altering the presentation to retain approximate equivalence.

Adjustments to the Age of Viewer's Color Matching Functions

One application of the present invention will be to utilize a specific person's age and/or color matching functions (which may vary from the average of their age). Also, a group average of specific individual color matching functions can be used, or the group's average age can be used to select a color matching function during presentation. However, it is also possible to adjust the apparent viewing age to differ from a person's actual age or actual color matching functions. For example, if a key person during mastering is 30 years old, but a given viewer is 45 years old, a useful option is to allow selection of color matching functions that have a different average age than 45 years. The affect of such an arbitrary adjustment to color matching functions will be dependent upon the change is spectra between mastering and presentation. Some amount of experimentation would be needed under given conditions of the age of any given viewer(s), presentation spectra, the age of key mastering personnel, and mastering spectra, in order to determine a useful variation to color mastering function age during presentation. After some amount of experimentation and selection, an adjustment and selection trend may become apparent which could then be used consistently without further experimentation.

One useful test data point would be to apply the color matching functions of one or more key mastering personnel (or a blend for several such mastering personnel) for presentation, instead of using color matching functions for the viewers of the presentation. This would then attempt to duplicate the colors presented to one or more of the key personnel during mastering.

Such alterations are likely the subject of testing and experimentation, since no simple rules are feasible given the unpredictable affects of different mastering and presentation spectra on variations in color matching functions. However, it is likely that some consistent alterations will be useful for some viewers under some viewing circumstances.

The basic premise of the present invention, however, is to provide techniques to accurately and precisely reproduce the colors of the mastering display, as they are seen by a viewer during presentation. Thus, it will often be better to adjust color appearance parameters (such as saturation, gamma, contrast, or white point) rather than altering color matching functions. When using such intentional appearance adjustments, the resulting appearance alterations will deviate away from accurate and precise color reproduction, but will be of an intentional and directly-controlled nature (such as increased or decreased saturation based upon viewing preference). Such alterations may be best performed under guidance for such alterations provided by key personnel during mastering. For example, a cinematographer may indicate that it is the intention that color saturation can be decreased somewhat (e.g., as much as 10%) but not increased, or that contrast may increased somewhat (e.g., as much as 20%) or decreased by a smaller amount (e.g., as much as 5%). Note, however, that viewing surround and absolute screen brightness significantly affect the appearance of these affects (i.e., as modeled by color appearance modeling).

Multiple Versions

In addition to a "final" version of a mastered image sequence, it may also be useful to retain and optionally convey altered versions for various purposes. For example, a separate version might be made for presentation on a high brightness (i.e., wide dynamic range) display. Such a wide dynamic range image is likely to be prepared with a deeper black and a higher effective gamma than a normal dynamic range presentation, in addition to possibly containing extra bright regions which were significantly less bright on a normal brightness display.

As another example, a separate version might be made for a smaller screen than a larger screen. Such altered versions are commonplace with respect to widescreen versus narrow-screen displays (narrow screen presentations of widescreen shows are also called "pan and scan" versions). Such altered versions are also standard practice in that digital cinema releases are mastered differently from digital video releases (such as high-definition and standard-definition DVD or broadcast masters). A digital cinema master is made for a higher contrast presentation (e.g., gamma 2.6 and 1500:1 black to white ratio) and a wider color gamut (i.e., more saturated red, green, and blue color primaries with a D60 typical white point) than does digital video (e.g., gamma 2.2 and 400:1 black to white ratio with less saturated Rec709 red green and blue color primaries with a D65 typical white point). Thus, the practice of keeping different pixel sets, representing different versions of image sequences, applied to different contrast ranges and color gamuts, is commonplace.

The practice of creating different pixels sets for different uses can be extended for other variations in presentation. If a single set of pixels can be used, with variations in processing (such as a different gamma transform or a different color saturation level), then the resulting master could serve multiple purposes from a common pixel set. Even with digital image compression, the pixels are the dominant largest portion of the data, so such repurposing would efficiently use storage space and/or bandwidth.

A hybrid of various specified transformations from a common pixel set for some regions of the image and/or some frames in a show, can be mixed and matched with regions and/or frames with independent pixels. In this aspect of the present invention, some of the compactness benefits are retained where common pixels can be used for multiple variations, while retaining the complete freedom of variation available with independent pixel sets.

Film output concurrent with digital cinema release in current practice is another potential application of common or partly common pixels with mostly independent transformations. Multiple film print types or brands might be used in different parts of the world (e.g., Kodak Brand Vision, Kodak Brand Premier, and Fuji brands of prints). Large screen release (such as Imax 65 mm film with image noise reduction and sharpening) may occur simultaneously with normal digital and 35 mm film release. A 4096-horizontal resolution release may be concurrent with a 2048-horizontal resolution release, although the 2048-horizontal reduced resolution can be defined via a transformation, and need not exist as independent pixels. Similarly, a 1920-horizontal HDTV release can also be defined as a transformation (whereas present practice is to create a separate master). A variation in white point can be defined as a transformation, as can a variation in dynamic range, maximum brightness, color saturation, presentation gamma, and many other useful and desirable variations. Another significant example is guidance concerning optimal presentation in a dark surround versus a high-ambient surround versus low-ambient surround. Guidance from key personnel can provide information, or even restrictions, concerning the acceptability or availability of various useful or desirable or possible adjustments.

If each of the cinematographer, colorist, and director used different displays/projectors with differing spectra, then each will be independently processed, and each spectra can be conveyed, identifying who it is that used the given spectral-attribute display or projector.

Colorfulness is a function of absolute brightness, as well as to some degree the darkness of the surround. Intent may be conveyed by the cinematographer, colorist, and/or director, such that in one case the colors might be the correct hue, but have as high of a saturation (colorfulness) as possible at the highest brightness possible. In another case, bright colors should be presented with approximately the same colorfulness as when they were mastered, adjusted for absolute brightness and/or surround during presentation.

Absolute mastering brightness is useful information, since it can be compared with presentation brightness. Further, there is some evidence that larger screens (farther away) at an equivalent subtended angle are perceived as brighter than smaller screens (closer) at equivalent subtended angle, and equivalent measured brightness. Thus, absolute size of the screen is potentially useful information in addition to subtended viewing angle and absolute brightness.

The ICC color standard provides for metadata slots to convey "hints" about colorimetric intent. However, there is little or no guidance about how to use these hints, which are generally left up to each maker of color paper printers to interpret (nearly always undocumented, even if any use is made of the hints). However, conceptually certain hints can be provided by the cinematographer, colorist, and/or director about colorimetric intent. For example, it might be the intent to make a scene as colorful as possible, within the limits of brightness and color gamut of a given display (although gamut usually refers to range of chromaticity as defined in CIE 1931 or CIE 1964, but has been generalized herein). Another intent might be to preserve natural appearing color, possibly together with information about the type of scene (tungsten indoors, daylight outdoors on a sunny day, daylight hazy but panoramic, etc.). This might yield different absolute measures of color saturation at different brightnesses in order to appear approximately the same. There are known similar affects with respect to the viewing surround, and a person's adaptation (morning versus evening viewing, having been outdoors in bright sunlight just previously, etc.). It should be noted that such issues are generally called "color appearance modeling", which is still only a fairly approximate model, and is known to vary significantly between individuals. However, some amount of processing is certainly feasible for both absolute presentation brightness and ambient surround. The intent may also be to be as accurate as possible in measured color being presented, independent of absolute brightness and ambient surround, which is also a meaningful approach in some cases.

Another useful intent is whether or not it would be beneficial to attempt to present a show at the same absolute brightness as was used during mastering. It has been common for movie masters to be made on a CRT at 25 fl, for intended digital projection at 14 fl. Similarly, it has been common for movies mastered at 14 fl using digital projection to be viewed using CRT displays at 25 fl. While the projector would not normally be able to increase brightness to 25 fl (although there are many useful cases of high brightness projection), certainly the CRT presentation could be darkened a little down to 14 fl (although the CRT image will usually be smaller and have less viewing angle, which might require some adjustment in order to have equivalent appearance and colorfulness).

Similarly, with the color of the ambient surround, there can be a perceived alteration in the color of the image on the screen. For example, if a room has warm-colored (slightly yellowish or reddish) walls, and tungsten (warm) lighting, an image mastered in a cooler mastering environment (e.g., D65 video surround) will appear very blueish (cool). Similarly, if an image is mastered in tungsten surround, and is presented in a room filled with ambient daylight (and perhaps light blue walls), the image will appear very reddish yellow (warm) even if it is intended to be slightly bluish or daylight colored. Note that some mastering is done in a dark surround, where the white-point of the mastering display or projector becomes the dominant factor relative to overall color sense. It is common practice to master to a given white point, which is implicitly known by presentation displays and projectors. However, if an exact measurement is made of the white point (and its spectra), then this provides more detail which can be conveyed to the presentation projector or display system. If the mastering ambient surround color differs from the white point of the mastering display or projector, then this will affect perception during mastering, as it will during presentation. It is also feasible to convey the ambient surround used in mastering, preferably spectrally (although basic CIE 1931 chromaticity, or other chromaticity, will usually be adequate). Thus, the color of the ambient surround is another optional factor in affecting the perceived presented color versus the absolute presented color. Another approach is to specify the master as being made only for correct absolute color, and specifying the correct color balance of the surround (e.g., D65 viewing, or D50 viewing or 3200K viewing), thus relying on those who set up the viewing environment to set it up to match this surround viewing color requirement. Similarly, the absolute brightness level of the surround, or a dark surround, can be a significant perceptual factor in addition to the color of the surround, and can be similarly handled.

While it usually will not be practical in many situations to control the brightness of the ambient surround, the color of the surround could be adjusted by providing illuminated surround in the presentation display or projector. It is possible and practical for an illuminated surround to provide a known ambient color, or alter the existing ambient color to create a known ambient color (e.g., add cool blue light to an otherwise warm red room). If the resulting ambient surround color is not the same as the mastering ambient surround, and/or the white point of the mastered show, it may still provide a partial adjustment in the correct direction, then requiring less correction.

It may be beneficial to provide for a presentation mode which presents the image "as cinematographer and/or director intended". It will also be beneficial to provide information about whether the cinematographer and/or director allow customization. If customization or variation is allowed, the nature and range of variation can also be provided. The variation range can be accurately described using concepts and computations within the present invention.

Conveying Personal Color Perception Information

It is now common that key rings contain electronic transmitters with buttons used to unlock and lock home security and car security systems. The concept of such devices can be extended such that such devices give a periodic transmission of appropriate personal information. If a presentation display or projector were equipped to receive such information, individual color perception information could be provided automatically. Use of signal strength, of GPS location (perhaps extended for high location accuracy and precision), or other methods can be extended to indicate a person's location when viewing an image, and to indicate a person's presence in a given room. Infrared technology, such as is common with television remote controls, could also be used.

Such information can also be communicated via a connection to a remote control or to a display or projector. For example, a computer card (such as PCMCIA), a memory stick, or a digital disk carrying data (such as DVD or CD) can be entered into the remote control, the display, or the projector to provide accurate and precise personal color perception information. The preference settings in a display or projector can also be used (e.g., a "settings" group of menus is often available in television sets).

Personal preferences can also be provided. For example, a given person may like warmer (yellower) color temperatures, whereas another person may like cooler (bluer) color temperatures for the white and gray point of scenes. It is therefore useful to establish presentation settings partially based upon personal preferences Note that gamma and white point are controlled via display settings menus on some personal computers (although the actual gamma often does not match, or else the gamma varies with brightness, meaning that it is not an actual gamma at all). Also, the white point is set in terms of the average display and in terms of CIE 1931 chromaticity.

It is possible and practical to characterize individual viewing color matching functions. Such characterization can be done in the home or at the office. It is feasible to include special emission color spectra (e.g., via an internal special projector) within a display/projector for use in determining color matching functions for each individual. Such determination can be made in the presence of a person's surround, if done in their own home under daytime, dusk, and nighttime viewing conditions, further helping to characterize not only their color matching functions, but their perception of colors in their actual surround (for use in color appearance modeling). Special displays or projectors could also be set up in television and computer stores, wherein a person may obtain an up-to-date (since it gradually changes with age) characterization of their personal spectral mapping functions (such as every five years after the age of 20). It is feasible to obtain information as often as every day, or even every hour or minute, to account for adaptation (e.g., coming in from outdoors). Visual personal color perception information could be gathered at a visit to the eye doctor. A person could match spectrally-different patches using a variable sum of 3 or more primaries (e.g., red, green, and blue), thereby yielding specific color matching functions for that person. Note that this is how CIE 1931 was originally developed.

It would also be useful to provide visual acuity in the personal information. With such information, it would be possible when appropriate to boost high detail, based upon viewing distance, and based upon visual acuity.

There are many personal preferences that can be usefully conveyed in addition to information needed for accurate and precise presentation of color and brightness. Some people like bright images, others like less brightness. Some people like flash frames, others do not. Levels of color saturation, the level of contrast, the maximum image brightness, etc., can be part of personal preferences. Flare correction for people with flare in their vision is also possible to a limited degree. Families are more likely to have similar color vision parameters, or are more likely to wear glasses, so preferences for a family may be based on measured parameters for one member.

Some displays already adapt to ambient room light levels. Such adaptation can take into account the persons preferences and measured visual parameters as well.

There are regional preferences for color appearance (and other appearance parameters), which are probably cultural and not genetic. Personal preferences will automatically embody regional preferences, when those regional preferences are held by a particular person. An example of regional television color preference is the variation in camera color settings and makeup-color variation in different countries around the world for different kinds of shows (like talk shows and news-person presentation versus drama or comedy).

Preferences can be carried with each person, and altered over time, using personal data means (e.g., a personal computer or data store). Preferences can be complex and context sensitive. For example, a person may like calm appearance, low color saturation, low brightness, and minimal scene cuts, when winding-down for sleep. However, for family movie viewing after dinner, or for sports viewing during a holiday afternoon, high brightness and accurate color may be desirable. A person's or group's moods of the moment also may affect preference, such as the desire at a given time to watch a scary or suspenseful movie with appropriate moods, or to watch a romantic light comedy, or an artistic drama.

There is thus a broad range of useful information, both characterizing technical data for accurate and precise color presentation, as well as describing preferences, which may be used for color modeling and presentation.

Eye Tracking and Viewing Center Processing

Figure 17:
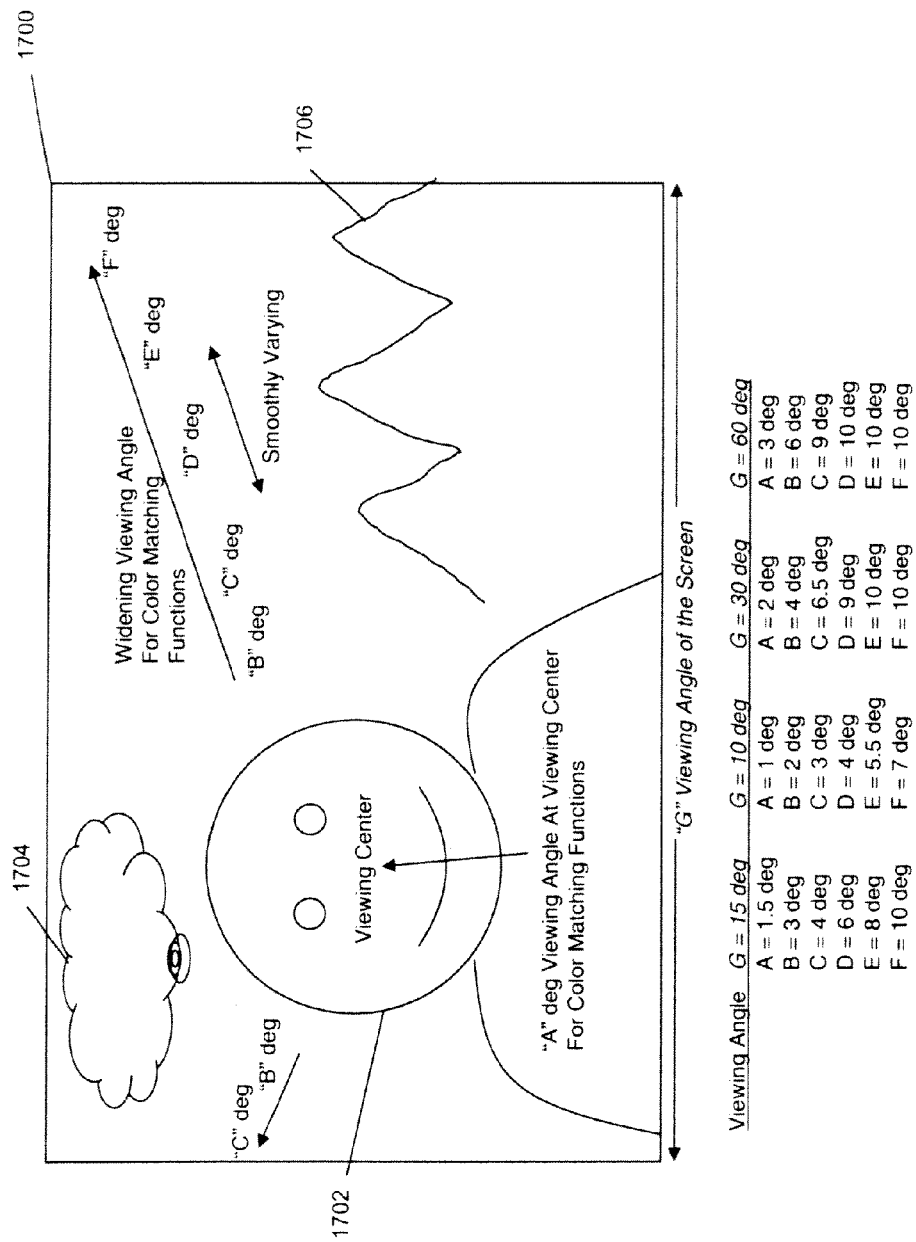
FIG. 17 is a diagram of an image 1700 showing different angular values that may be selected for color matching functions based on various viewing angles.

The eye has a yellow macular pigment over the fovea. Each person's yellow pigment is a bit different in size and shape, but the average size and shape is known. The pigmented area is near round at about 1.5 degrees of viewing angle. It rolls off gradually at its edges (i.e., blends thinly to nothing at its edges). Using a knowledge of where a person is being directed to be looking, and the size of the screen in their field of view, each person's macular size and shape, or an average size and shape over a given population, can be taken into account when selecting color matching functions to model the person's color sensing. The 2-deg and 10-deg color matching functions are just generalizations of this characteristic. Having a more accurate 1-deg to 10-deg model of this, with lens-yellowing-age adjustment, such as CIE-170-1:2006, can improve this model. However, a knowledge of where someone is being directed to look (using eye tracking tests, for example, or by knowing that the eye is being directed by the director to a given person's face or a given object in the scene) can improve the color sensing model. The perceived color "nulls-out" the perceptual difference of the macular pigment in the visual cortex, so that a constant color is perceived as constant, even though the l, m, and s cones are not sensing the same amount of signals under the macular pigment as outside of it. Using these factors, new color matching functions for l, m, and s can be made based upon design principles which expand upon those described in CIE-170-1:2006. For example, FIG. 17 is a diagram of an image 1700 showing different angular values that may be selected for color matching functions based on various viewing angles G for the image (see table at bottom of FIG. 17) and the viewing center. Here, the viewing center is a person's head and upper torso 1702; the narrowest color matching function A is selected for pixels nearest the viewing center. For regions further away from the viewing center, such as a distant cloud 1704 or distant mountains 1706, wider angled color matching functions B-F may be selected.

When using eye tracking, the average and standard deviation for a group a viewers can be used to determine how consistent the viewing center is. If eyes are wandering the scene (either intentionally by director/cinematographer intent, or unintentionally), then a relatively common viewing angle (e.g., 2 deg) should be used everywhere in the color matching functions. Even in this case, the angle parameter at the frame edges can be widened some, since eyes will never be pinned on a frame edge (left, right, top, bottom) within a created show. If eyes are consistently looking at or near the viewing center (either intended or unintended, but usually intended), then the angle parameter of the color matching functions can be gradually widened at angles away from the viewing center, as well as at the frame edges. In non-narrative applications, such as color video surveillance, then a consistent angle (e.g., 2 deg) can be used everywhere, or optionally the frame edge can have a small gradual increase (e.g., 4 deg) within a small amount (e.g., 10% of screen height and width) of the frame edge.

If automatic eye tracking (average over a number of viewers) is used, the eye movements should be adjusted to change precisely at scene cuts. The data should also be heavily smoothed within each shot. An angle map can be used, which can be softened by blurring, or which may be generated algorithmically based upon angular distance from the center of view. The angle and center should change gradually over time, as well as within regions of each frame.

Motion vectors and confidence values can be used (see, for example, U.S. Patent Application No. 60/921,644 entitled Flowfield Motion Compensation For Video Compression by the present inventor) to help determine information about a scene. For example, 1 deg viewing is not needed if a region is moving 2 deg per frame. Thus, regions of high motion and high confidence may wish to use 4 deg viewing, or even wider, since the point of focus is devoid of sharp details (due to motion blur), and thus color perception would naturally utilize a wider color region.

Motion vector/flowfield displacement length between frames can be useful for selecting the viewing angle parameter, since fast motion (large displacement length) implies larger color sense, because small detail cannot be focused during fast motion. Since motion vectors may be continuous or discontinuous over regions of the image, their use with respect to the angle of color matching function should be chosen to correspond to high motion using large angles, and low motion with a stable viewing center using small angles for the color matching functions.

Such an angular map (macular, non-macular) may be conveyed along with compressed or uncompressed data as additional information, optionally including center of viewing. The angular map can be scaled to an absolute size in viewing angle during mastering for one or more of the director, cinematographer, and colorist. The angular map can also be scaled by actual presentation viewing angle (or an average or estimate if there will be multiple viewers) when used to adjust the angle parameter of color matching functions. Alternatively, the angular map can be created solely at presentation from no additional information, from the viewing center and presentation viewing angle (or estimate, if multiple viewers), or from other additional information, if available. Optionally, an additional function of the original viewing angle data may also be conveyed, to indicate how it should be scaled (wide screen and wandering views, versus intense centered views), when the angular size differs during viewing versus mastering. Whether or not the angular map affects color is dependent upon the spectral changes during presentation versus during mastering. If the spectrum does not change (from mastering to presentation viewing, as in the days of the ubiquitous CRT), then there will be no affect.

Encoders for image compression can usually afford more computation than decoders. Pre-processing and analysis is thus possible in the encoder, with the resulting angle maps being sent for use by the decoder (as well as having uses within the encoder).

The angle map can differ for each hue, but must change smoothly between hues. For example, if one hue covers a large region of a frame, then a 10 deg color matching function would be most appropriate for that hue, even if there are small detail regions in other hues near the center of view. See the discussion below concerning the use of histograms to identify the regional extent of each hue.

The angle map can then use angular variations of the CIE 170-1:2006 spectral color matching functions (which are called "cone fundamentals" in that document). There can be thousands of variations as a function of age (20 years and below, up to old age, such as 80 years, continuously) and viewing angle (from 1 deg to 10 deg, continuously). Using the RGB (or more than three primaries) spectra against the appropriate age cone fundamentals, the specific viewing angle used can be continuously varied per-pixel. While the specific color matching function can be altered for each pixel, nearby and adjacent pixels should only vary a little and smoothly. This can be accomplished by filtering (and therefore blurring) the picture down to one or more low resolutions (corresponding to one or a variety of viewing angles between 1 deg and 10 deg). If each pixel in the low resolution image corresponds to two degrees of subtended viewing angle, then this would correspond roughly to 2-deg color matching. These low resolutions (for one or more of the variety of viewing angles) can then be upsized back to full resolution to yield soft (blurred) images. The local color of each pixel can be compared to the soft images from one or more of the viewing angles to determine how similar it is (via color differences which are insensitive to luminance variation, such as abs(u1−u2)+abs(v1−v2)). These difference channels can then be smoothed by filtering (and therefore blurring) them to low resolutions, and then upsizing back to full resolution to yield soft (blurred) difference channels. The difference channels can then indicate how similar each color is to the color of its neighborhood for each of the candidate viewing angles. For example:

Start with the largest, e.g., 10 deg.
If similar, and thus small differences exist, use the 10-deg color matching functions.
If not similar, check smaller sizes (e.g., 9 deg, 8 deg, etc.), down to where the differences become small (if they do), e.g., 2 deg.
If the differences stay large, then use 1 deg color matching functions.

Note that continuous functions must be used since color mapping functions must be smooth and continuous when applied to similar colors and nearby pixels having those colors of the image. However, each pixel can use a very different color matching function versus its neighbors if that pixel has a very different color versus its neighbors. It is only necessary that the colors to which the matching function is being applied vary continuously with respect to similar colors which are nearby.

Note that this results in a matrix for the components of each color matching function (one matrix per viewing angle, for example). The matrices can be locally parameterized using piecewise-linear or spline-fit or other smooth functions for each matrix term. This way, a small number of color matching functions can still be smoothly applied (as long as the viewing angle blur is also smoothly determined) via interpolating this small set of matrices with smooth curves (or even with piecewise linear).

Note that this process only affects color mastered with one spectra and presented with another. If the same spectra is used to reproduce the colors as was used to master them, this is a unity matrix for all parameters (e.g., for all viewing angles), since the integrations for the RGB (or more than three primaries) source spectra will be equal to the integrations with the same spectra for presentation.

An alternative to using CIE 170-1:2006 to vary angle is to gradually interpolate CIE 1931 2 deg x_bar y_bar z_bar into CIE 1964 10 deg x_bar10 y_bar10 z_bar10, and use the continuously interpolated spectral mapping functions for continuously varying viewing angle. Other color matching functions, both past and future, can also be utilized, as well as color matching functions determined for specific individuals (or group averages).

Use of Regional Color Histograms for Determining Viewing Angle as a Function of Color The blurring method of discovering whether a given pixel's color is common to a wide angle of view in its surrounding has the disadvantage that a small brightly-colored object having a widely-disparate color will move the average away from the predominant color, which might otherwise match a given pixel. A solution for this in addition or as an alternative to blurring is to utilize a color histogram for each region of the image. A color histogram can be made luminance independent. Color matching extent should be on the basis of hue and saturation, and not on brightness, since an object of a given constant color might have lighting, texture, and shadows wherein luminance varies widely, but the color remains constant. For example, one could use u' v' based upon CIE 1964 10-deg or u' v' based upon CIE 1931 2-deg color matching functions. One could also use one or more luminance-independent "opponent" color models based upon the CIE 170-1:2006 cone fundamentals.

In order to utilize a color histogram, the histogram must also be a function of location within the image. For example, a low resolution (such as a resolution corresponding to 1 deg) down-filtered version of numerous histograms (e.g., 1000 histograms which span all active colors, and/or all possible colors) could be used. A given pixel's color could then be compared with the histogram buckets associated with its color and with similar colors, using a function (such as linear rolloff weighting) of distance. If a large proportion of nearby pixels (such as half of them within a 10-degree region of ±5 degrees) fall into histogram buckets having the same or similar colors, the location-based histogram would show that large numbers of nearby pixels might share a given pixel's color (or a similar color). Thus, these pixels should use 10-degree color matching functions. The choice of viewing angle for the choice of color matching function should be a continuous function of the amount of the similar colored nearby pixels, and their nearness. The nearness can be interpolated from the test pixel's location to yield an approximately accurate distance to the histogram buckets of the low-resolution histogram image. It is important that all functions utilized be smoothly varying with both distance and color-similarity, including the fineness and interpolation methods related to otherwise-discrete histogram buckets.

The histogram method is computationally most efficient and smoothest if the current frame (or still frame) uses a fairly large memory. Thus, a fairly high resolution histogram array, corresponding to regions of the image should be used (for example, such as ⅛ of full resolution, both horizontally and vertically, having 1/64 as many pixels as the full resolution image), with a moderate number (as large as is feasible to fit in memory) of buckets (for example, such as 32 hues and 32 levels of saturation, being 1024 hue/saturation bins). This example would require 1024/64 or 16-times as much memory as the original image frame, which is practical on today's computers. Linear or higher-order interpolation should be used when comparing a given test pixel with both with the locations and color similarity of nearby histogram locations, color, and hues.

The histogram method and the blur/low-resolution method can be used separately, or can be combined using min/max to see which is the better match to a particular pixel's color, or by using a weighted average. Median filtering is also potentially helpful over small regions to find the majority color in that region. Median filtering combined with small regions and combined with hue and saturation ranges can find majority colors independently of brightnesses.

Novel Aspects

Novel aspects of the present invention include (but are not limited to) the following:

At least one implicit or explicit spectral interpretation of at least one color primary which is not linearly transformable into spectral mappings CIE 1931 x_bar, y_bar, nor z_bar nor CIE 1964 x_bar10 y_bar10 z_bar10, nor primaries (such as rgb) represented as weighting in either of these two CIE spectral mappings.

Linearly or non-linearly weighting the amount of such spectral mappings (e.g., pixels as OpenExr or other linear representation, or non-linear pixels as video gamma, or pixels as log or quasi-log, or other non-linear pixel representations).

Storing such information as one or more files for one or more frames (not necessarily one to one files to frames), including storing as compressed image data (still or moving).

Interpreting at least one primary color via a spectral mapping (usually across 380 nm to 780 nm) which is self-contained with the color data, where such data includes one or more image files also containing pixels in one or more primaries (at least one of which is interpreted via a self-contained spectral mapping), or where such data is within compressed bitstreams and/or bitfiles, decodeable into pixels which can be interpreted as a linear or non-linear weighting of primaries (at least one of which is interpreted via self-contained spectral mapping).

Mapping three or more primaries for image pixels (a primaries), mapped into a+1 or more spectral weights (b weights) (e.g., 5 nm or 1 nm bands), each weight then integrated with b−1 or fewer sets (c sets) of m presentation and n perceptual weights, resulting in c presentation primaries (where c is at least 3).

Multi-dimensional interpolation of spectral weights to account for variations due to brightness during creation, and/or intermediate processing, and/or mastering, and/or final distribution presentation, including (but not limited to): applying steeper gamma when using higher brightness displays; applying darker blacks when using higher brightness display; using knowledge of a particular display, or a particular model or family of displays, and the associated spectral emission for use with the spectra associated with the image, to yield an optimized presentation for each color; taking into account the surround/ambient viewing conditions; applying matrix transforms by processing the spectra of the primaries, but not by transforming the primaries themselves, and then re-integrating these spectra with presentation primary spectra when needed (this allows the number of bits (and number of bins) to be minimized (keeping them above the noise floor) in order to improve lossless compression, since there need be no cross-terms (which greatly increase the number of lossless bins)).

When using more than three primaries, use of one or more broad spectrum emitter channels in mastering and/or presentation, maximizing the energy given the broad spectrum emitters.

Adjusting displayed colors based on personalized spectral vision information (trichromat information), or on averaged (over a group or subgroup) personal spectral vision information. Personal spectral vision information may be pre-defined and stored (e.g., in a credit card like device, or a storage device carried on a person) so that it may be transmitted to a particular display system.

Augmenting uniformly-sampled spectra with specific energy spikes, each of specified wavelength and energy, removing their energy from the uniformly-sampled spectra.

Augmenting pixel-values defined in mastering primary spectra with object (reflective and/or luminous) or light spectra for regions of the image. Similarly, augmenting with spectral effects in such regions (such as fluorescence from UV wavelengths to spectra and colors on fluorescent surfaces).

Programmed Embodiments

Some or all aspects of the invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (which may include volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

I claim:

1. A method for accurate and precise representation of color for a series of master images, each master image being representable by pixel values representing a plurality of color primaries, including:
    (a) displaying each master image on a source display in a source environment;
    (b) measuring, or determining from previous measurements, spectral characteristics corresponding to at least one portion of at least one master image as such master image is displayed on the source display in the source environment; and
    (c) conveying information, directly or after intermediate storage, to a transformation environment, the information including the color pixel values representing each such master image plus the spectral characteristics corresponding to each such master image, the conveyed information being suitable for transforming the color pixel values of each such master image to generate a corresponding presentation image for display in a presentation environment on a presentation display distinct from the source display by applying the spectral characteristics corresponding to such master image to the color pixel values of such master image such that the resulting corresponding presentation image approximates the color of such master image when displayed on the source display in the source environment.

2. The method of claim 1, wherein the transformation environment is the presentation environment.

3. The method of claim 1, further including:
    (a) assigning one or more rules to one or more master images, each of the one or more rules embodying intention information relating to a preferred presentation on the presentation display of the one or more master images after transformation to corresponding presentation images; and
    (b) conveying the one or more rules, directly or after intermediate storage, to the transformation environment in a form suitable for altering, in a pre-defined way, the presentation on the presentation display of the one or more master images after transformation to corresponding presentation images.

4. The method of claim 3, wherein the one or more rules embody intention information relating to at least one of presentation brightness, colorfulness, extended color gamut, extended dynamic range, ambient surround brightness, white point, presentation contrast, maximum black-to-white ratio, viewing angle, or off-angle viewing.

5. The method of claim 3, further including selecting and applying at least one of the one or more rules based on one of presentation context or viewer choice.

6. The method of claim 1, further including conveying a set of color pixel values representing each such master image plus the spectral characteristics corresponding to each such master image, wherein each set member comprises a version of the master image having at least one presentation characteristic unique to that version.

7. The method of claim 6, wherein at least some set members share common pixel values for some regions of the corresponding master image.

8. The method of claim 6, further including generating at least one additional version of at least one such master image from a set member, wherein the at least one additional version has at least one presentation characteristic unique to such additional version.

9. The method of claim 6, further including conveying intention information, directly or after intermediate storage, to the transformation environment, the intention information relating to a preferred presentation on the presentation display of at least one of the set members after transformation to corresponding presentation images.

10. The method of claim 1, further including generating multiple versions of each such master image from the conveyed information, wherein each version has at least one presentation characteristic unique to that version.

11. The method of claim 1, further including:
(a) measuring or determining spectral and/or contrast confounds in the presentation environment of the presentation display that affect displayed presentation images;
(b) determining and applying a correction for the spectral and/or contrast confounds to further transform the color pixel values of at least one master image as part of the generation of a presentation image corresponding to such at least one master image.

12. The method of claim 1, further including compressing at least some of the information before conveyance.

13. The method of claim 1, further including:
(a) defining one or more regions of at least one master image, each such region having a selected visual appearance;
(b) specifying one or more rules for a desired presentation visual appearance for such one or more regions;
(c) conveying the one or more rules, directly or after intermediate storage, to the transformation environment in a form suitable for augmenting, in a pre-defined way, the presentation on the presentation display of the one or more master images after transformation to corresponding presentation images so as to approximate the desired presentation visual appearance specified by such rules.

14. The method of claim 13, wherein the selected visual appearance includes one of resolution-altering effects, color-altering effects, brightness-altering effects, contrast-altering effects, fluorescence, iridescence, sparkles, and radiant objects.

15. The method of claim 1, wherein the spectral characteristics corresponding to each such master image are conveyed distinct from the color pixel values.

16. The method of claim 1, wherein transforming the color pixel values includes applying a color matching function that varies with each pixel as a function of the color of each pixel.

17. The method of claim 1, wherein the step of transforming the color pixel values includes applying a color matching function that varies with each pixel in a regionally-varying manner.

18. The method of claim 1, further including:
(a) measuring a black spectrum for at least one master image displayed on the source display in the source environment; and
(b) conveying the black spectrum, directly or after intermediate storage, to the transformation environment in a form suitable for transforming the color pixel values of each such master image.

19. The method of claim 1, further including:
(a) selecting a white point reference color; and
(b) displaying selected master images on the source display in the source environment with a reference border having the color of the selected white point reference color.

20. The method of claim 1, further including:
(a) selecting a neutral gray reference color; and
(b) displaying selected master images on the source display in the source environment with a reference border having the color of the neutral gray reference color.

21. The method of claim 1, further including:
(a) characterizing the flare of the source display;
(b) conveying the flare characterization to the transformation environment;

(c) measuring the flare of the presentation display; and
(d) transforming the color pixel values in the transformation environment as a function of the conveyed flare characterization of the source display and the measured flare of the presentation display to reduce the effects of the flare of the presentation display.

22. The method of claim 1, further including:
(a) receiving personal color perception information associated with a viewer;
(b) transforming the color pixel values of each master image as a function of the personal color perception information associated with the viewer to generate a corresponding presentation image; and
(c) displaying the presentation image to the viewer on the presentation display.

23. The method of claim 22, wherein the personal color perception information is stored in a portable storage device.

24. The method of claim 1, wherein the presentation display includes spectrally-adjustable transmissive optical elements.

25. The method of claim 1, wherein the conveyed spectral characteristics corresponding to each such master image are integrated with one or more selected color matching functions and implemented in the form of one or more corresponding transformation matrices.

26. The method of claim 25, wherein a subset of the one or more transformation matrices is associated with one or more color primary.

27. The method of claim 25, wherein the one or more color matching functions are selected as a function of one or more of: camera spectral sensing functions, effective viewing width angle of a color region of the master image, effective viewing width angle of a color region of the presentation image, the relationship of a color region to the viewing center of one or more viewers of either the master image or the presentation image, the age of such one or more viewers, the relative size of the angle of view of the source display versus the angle of view of the presentation display, the absolute brightness and color gamut of the presentation display, and inter-personal variation of color perception of such one or more viewers.

28. The method of claim 1, further including:
(a) measuring or determining spectral characteristics of at least one presentation image; and
(b) integrating the spectral characteristics of such presentation image with one or more selected color matching functions to generate one or more corresponding transformation matrices.

29. The method of claim 28, wherein a subset of the one or more transformation matrices is associated with one or more color primary.

30. The method of claim 28, wherein the one or more color matching functions are selected as a function of one or more of: camera spectral sensing functions, effective viewing width angle of a color region of the master image, effective viewing width angle of a color region of the presentation image, the relationship of a color region to the viewing center of one or more viewers of either the master image or the presentation image, the age of such one or more viewers, the relative size of the angle of view of the source display versus the angle of view of the presentation display, the absolute brightness and color gamut of the presentation display, and inter-personal variation of color perception of such one or more viewers.

31. The method of claim 1, wherein the spectral characteristics are represented as a spectral map, further including integrating two or more spectral maps to generate one or more corresponding transformation matrices.

32. The method of claim 31, wherein at least one spectral map represents an associated color matching function.

33. The method of claim 1, further including:
(a) measuring or determining spectral and/or contrast confounds in the environment of the at least one image displayed on the source display;
(b) determining a correction for the spectral and/or contrast confounds; and
(c) applying a correction for the spectral and/or contrast confounds to transform the color pixel values.

34. The method of claim 1, further including:
(a) measuring or determining secondary scene information for the environment of the at least one image displayed on the source display;
(b) determining a correction for the secondary scene information; and
(c) applying a correction for the secondary scene information to transform the color pixel values.

35. A method for representation of color for a series of wide dynamic range master images, each wide dynamic range master image being representable by pixel values representing a plurality of color primaries, including:
(a) displaying each wide dynamic range master image on a source display in a source environment;
(b) applying a transformation to each wide dynamic range master image to define a narrow dynamic range master image;
(c) defining color adjustments for each narrow dynamic range master image;
(d) conveying information, directly or after intermediate storage, to a presentation environment, the information including the defined color adjustments, each wide dynamic range master image, and each narrow dynamic range master image, the conveyed information being suitable for generating a corresponding presentation image for display in the presentation environment on a presentation display distinct from the source display.

36. A method for accurate and precise representation of color for a series of master images, each master image being representable by pixel values representing a plurality of color primaries, including:
(a) displaying each master image on a source display in a source environment;
(b) measuring, or determining from previous measurements, spectral characteristics corresponding to at least one portion of at least one master image displayed on the source display in the source environment;
(c) determining a black spectrum for at least one master image displayed on the source display in the source environment;
(d) conveying information, directly or after intermediate storage, to a presentation system within a presentation environment and distinct from the source display, the information including the color pixel values representing each such master image, the spectral characteristics corresponding to each such master image, and the black spectrum;
(e) determining the black spectrum of the presentation system;
(f) correcting the color pixel values representing each such master image using the conveyed spectral characteristics and the conveyed black spectrum to yield the spectrum of each color pixel value at the time of display of such master image on the source display in the source environment;

(g) adjusting the corrected color pixel values representing each such master image based on the determined black spectrum of the presentation system to generate a corrected master image; and
(h) mapping the corrected master image to a presentation system color space to utilize for presentation.

37. A method for compensating for age-related yellowing of image sensing in the human eye in presenting a series of images, each image being representable by color pixel values representing a plurality of color primaries, including:
(a) applying multiple color matching functions to transform each image, each color matching function encompassing a different viewing angle and selected and applied as a function of both the viewing center of a viewer and the presentation display viewing angle with respect to display of the series of images on a presentation display from the point of view of the viewer, wherein at least one color matching function is selected to compensate for age-related yellowing of image sensing in the human eye; and
(b) displaying each transformed image on the presentation display.

38. The method of claim 37, wherein the viewing center is an average viewing center determined by automatically tracking the eyes of one or more viewers with respect to a display of the series of images.

39. The method of claim 37, wherein regions of each image farther away from the viewing center are transformed by one or more color matching functions encompassing a wider viewing angle than the color matching function encompassing the narrowest viewing angle.

40. The method of claim 37, wherein color matching functions are selected and applied separately for each color primary.

41. A method for transforming a color image comprising pixels representing at least a primary colors, including:
(a) for multiple sets of a primary colors, mapping the pixels of each set of a primary colors to a corresponding set of b spectral weights, where b equals at least a+1; and
(b) for each set of b spectral weights, integrating such b spectral weights with corresponding c sets of m presentation weights and n perceptual weights measured in or determined from an environment in which the color image is displayed on a source display, where c equals no more than b−1 but is at least 3, resulting in multiple sets of c target presentation primaries corresponding to the multiple sets of a primary colors, where a, b, c, m, and n are integers.

42. The method of claim 41, wherein the spectral weights are multi-dimensionally interpolated to account for variations in brightness of the pixels in the color image arising from at least one of source display system characteristics and source environment characteristics.

43. The method of claim 41, further including assigning a recommended presentation usage to each of the multiple sets of c target presentation primaries.

44. The method of claim 43, further including utilizing the recommended presentation usage assignments to select a set of the c target presentation primaries for a specific presentation environment.

45. The method of claim 41, further including selecting a set of the c target presentation primaries for a specific presentation environment based on characteristics of the specific presentation environment.

* * * * *